(12) United States Patent
Takayama et al.

(10) Patent No.: US 12,367,906 B2
(45) Date of Patent: Jul. 22, 2025

(54) MAGNETIC RECORDING CARTRIDGE INCLUDING MAGNETIC RECORDING MEDIUM HAVING A VARIATION IN WIDTH

(71) Applicant: Sony Group Corporation, Tokyo (JP)

(72) Inventors: Takahiro Takayama, Tokyo (JP); Minoru Yamaga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 29 days.

(21) Appl. No.: 18/286,273

(22) PCT Filed: Feb. 15, 2022

(86) PCT No.: PCT/JP2022/005885
§ 371 (c)(1),
(2) Date: Oct. 10, 2023

(87) PCT Pub. No.: WO2022/230308
PCT Pub. Date: Nov. 3, 2022

(65) Prior Publication Data
US 2024/0203455 A1 Jun. 20, 2024

(30) Foreign Application Priority Data
Apr. 30, 2021 (JP) ................. 2021-077716

(51) Int. Cl.
*G11B 5/78* (2006.01)
*G11B 5/65* (2006.01)
(Continued)

(52) U.S. Cl.
CPC .............. *G11B 5/78* (2013.01); *G11B 5/65* (2013.01); *G11B 5/70* (2013.01); *G11B 5/73* (2013.01);
(Continued)

(58) Field of Classification Search
None
See application file for complete search history.

(56) References Cited

U.S. PATENT DOCUMENTS

2005/0260458 A1  11/2005  Hirai
2007/0009768 A1  1/2007  Takeda et al.
(Continued)

FOREIGN PATENT DOCUMENTS

JP  2005332510 A  12/2005
JP  2007048427 A   2/2007
(Continued)

OTHER PUBLICATIONS

International Search Report from corresponding PCT application PCT/JP2022/005885, dated Apr. 26, 2022.

*Primary Examiner* — Craig A. Renner
(74) *Attorney, Agent, or Firm* — K&L Gates LLP

(57) ABSTRACT

A magnetic recording cartridge is provided and includes a magnetic recording medium having a base layer; and a reel, in which a loss modulus at 65° C. of the base layer is 0.40 GPa or less, the magnetic recording medium is wound around the reel, and when a variation in width is measured over an entire length of the magnetic recording medium after storage at 65° C. for 360 hours, a sign of variation in width Δout on an outer side of winding is different from a sign of variation in width Δin on an inner side of winding, and the variation in width is 0 ppm at any position of two portions sandwiching a center line of the entire length of the magnetic recording medium in a case where the entire length of the magnetic recording medium is divided into four portions by dividing into four equal parts.

13 Claims, 23 Drawing Sheets

(51) Int. Cl.
  *G11B 5/70*    (2006.01)
  *G11B 5/73*    (2006.01)
  *G11B 23/027*  (2006.01)
  *G11B 23/107*      (2006.01)

(52) U.S. Cl.
  CPC ........ *G11B 5/73927* (2019.05); *G11B 23/027* (2013.01); *G11B 23/107* (2013.01)

(56) References Cited

U.S. PATENT DOCUMENTS

2019/0259417 A1    8/2019  Kagawa et al.
2022/0172743 A1*  6/2022  Kumagai et al. .... G11B 23/107

FOREIGN PATENT DOCUMENTS

JP        2019179585 A    10/2019
JP        2021064432 A     4/2021

* cited by examiner

FIG. 4
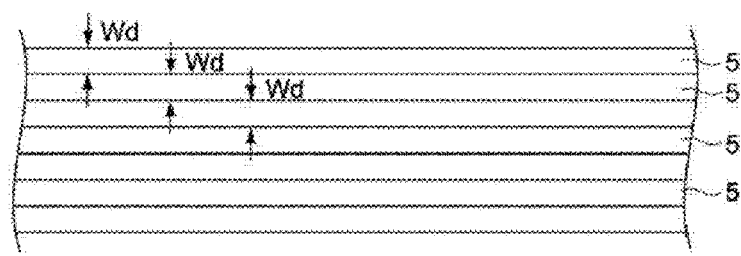
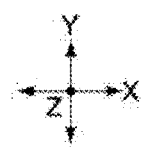
FIG. 5
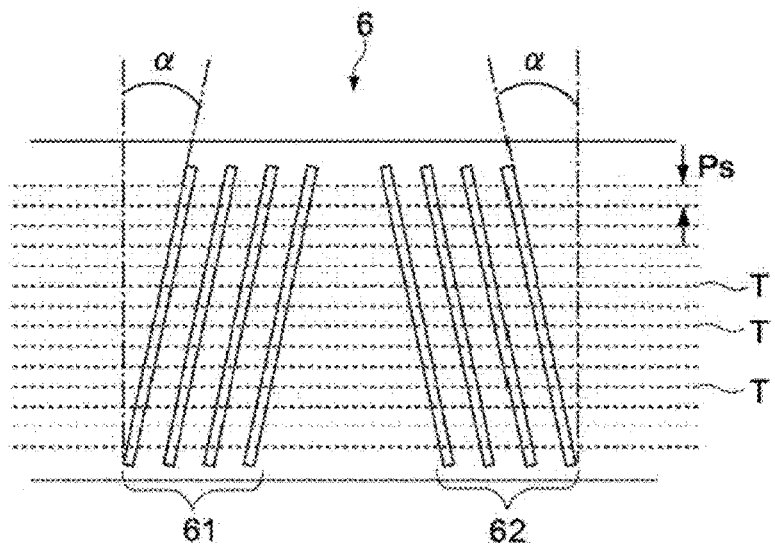
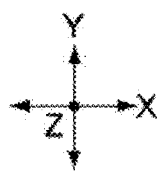

FIG. 11
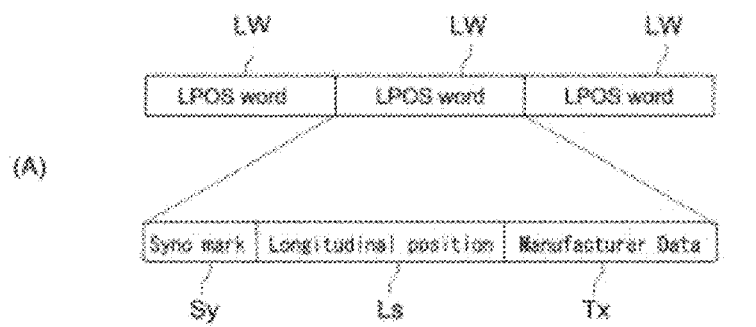
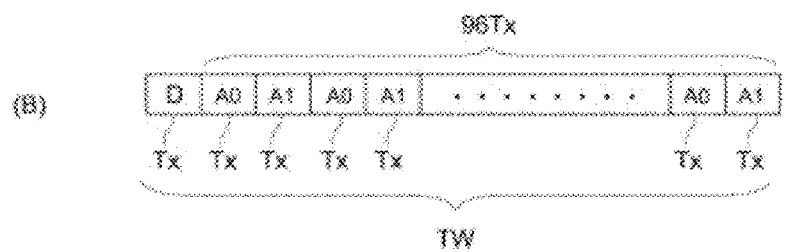
FIG. 12
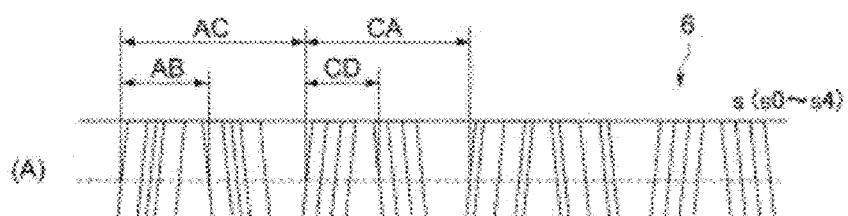
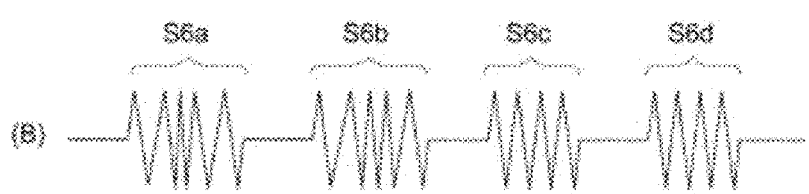

MAGNETIC RECORDING CARTRIDGE INCLUDING MAGNETIC RECORDING MEDIUM HAVING A VARIATION IN WIDTH

TECHNICAL FIELD

The present technology relates to a magnetic recording cartridge.

BACKGROUND ART

In recent years, a demand for archiving has increased, and data storage with high total capacity has been incorporated in a cloud system. In a magnetic tape (magnetic recording medium) used as a data storage, a track width and a distance between adjacent tracks have been become very narrower in order to improve a data recording density. As described above, when the track width and the distance between adjacent tracks become narrower, for example, the maximum acceptable variation as a variation in dimension of the tape itself due to environmental factors such as changes in temperature and humidity, and the like becomes smaller.

Several technologies for reducing the variation in dimension have been proposed so far. For example, in a magnetic tape medium disclosed in Patent Document 1 below, when a Young's modulus of a non-magnetic support in a width direction is represented by X and a Young's modulus of a back layer in the width direction is represented by Y, X×Y is $6 \times 10^5$ or more in a case where X is 850 kg/mm² or more or less than 850 kg/mm², and when a Young's modulus of a layer including a magnetic layer in a width direction is represented by Z, Y/Z is 6.0 or less.

CITATION LIST

Patent Document

Patent Document 1: Japanese Patent Application Laid-Open No. 2005-332510

SUMMARY OF THE INVENTION

Problems to be Solved by the Invention

A main object of the present technology is to provide a magnetic recording cartridge capable of correcting a width of a magnetic recording medium in a longitudinal direction thereof by adjusting running tension of a tape system or changing a winding direction even when stored in a high-temperature environment.

Solutions to Problems

The present technology provides:
a magnetic recording cartridge including:
a magnetic recording medium having a base layer; and
a reel, in which
a loss modulus at 65° C. of the base layer is 0.40 GPa or less,
the magnetic recording medium is wound around the reel, and
when a variation in width is measured over an entire length of the magnetic recording medium after storage at 65° C. for 360 hours,
a sign of variation in width Δout on an outer side of winding is different from a sign of variation in width Δin on an inner side of winding, and
the variation in width is 0 ppm at any position of two portions sandwiching a center line of the entire length of the magnetic recording medium in a case where the entire length of the magnetic recording medium is divided into four portions by dividing into four equal parts.

The variation in width Δin can be a positive value, and the variation in width Δout can be a negative value.

When an entire length of the magnetic recording medium in the longitudinal direction is taken as 100%, at a position of 25% to 75% from an outer side end portion of winding, a variation in width Δ of the magnetic recording medium after storage at 65° C. for 360 hours can be 0 ppm.

(The variation in width Δin)–(the variation in width Δout) can be 800 ppm or less.

A storage modulus at 65° C. of the base layer can be 8.0 GPa or less.

The base layer may include polyethylene terephthalate (PET), polyethylene naphthalate (PEN), or polyetheretherketone (PEEK).

An average thickness $t_T$ of the magnetic recording medium can be 5.6 μm or less.

An average thickness $t_T$ of the magnetic recording medium can be 5.4 μm or less.

An average thickness $t_B$ of the base layer can be 5.0 μm or less.

An average thickness $t_B$ of the base layer can be 4.6 μm or less.

According to one embodiment of the present technology, the magnetic recording medium can include a magnetic layer, and the magnetic layer can contain magnetic powder.

According to another embodiment of the present technology, the magnetic recording medium may include a magnetic layer, and the magnetic layer may be a sputtered layer.

The present technology
provides a magnetic recording medium, in which the magnetic recording medium is accommodated in a magnetic recording cartridge in a state of being wound around a reel of the magnetic recording cartridge,
when a variation in width is measured over an entire length after storage at 65° C. for 360 hours in the state of being wound around the reel,
a sign of variation in width Δout on an outer side of winding is different from a sign of variation in width Δin on an inner side of winding, and
the variation in width is 0 ppm at any position of two portions sandwiching a center line of the entire length in a case where the entire length is divided into four portions by dividing into four equal parts, and
the magnetic recording medium has a base layer having a loss modulus at 65° C. of 0.40 GPa or less.

BRIEF DESCRIPTION OF DRAWINGS

FIG. 4 is an enlarged view illustrating recording tracks in a data band of the magnetic recording medium described above.

FIG. 5 is an enlarged view illustrating a servo pattern written in a servo band of the magnetic recording medium described above.

FIG. 11(A) is a view illustrating a data structure of an LPOS word embedded in a servo pattern, and FIG. 11(B) is a view for explaining a manufacturer word.

FIG. 12(A) is a schematic plan view illustrating an arrangement example of servo patterns 6, and FIG. 12(B) is a view illustrating a reproduction waveform thereof.

MODE FOR CARRYING OUT THE INVENTION

Figure 1:
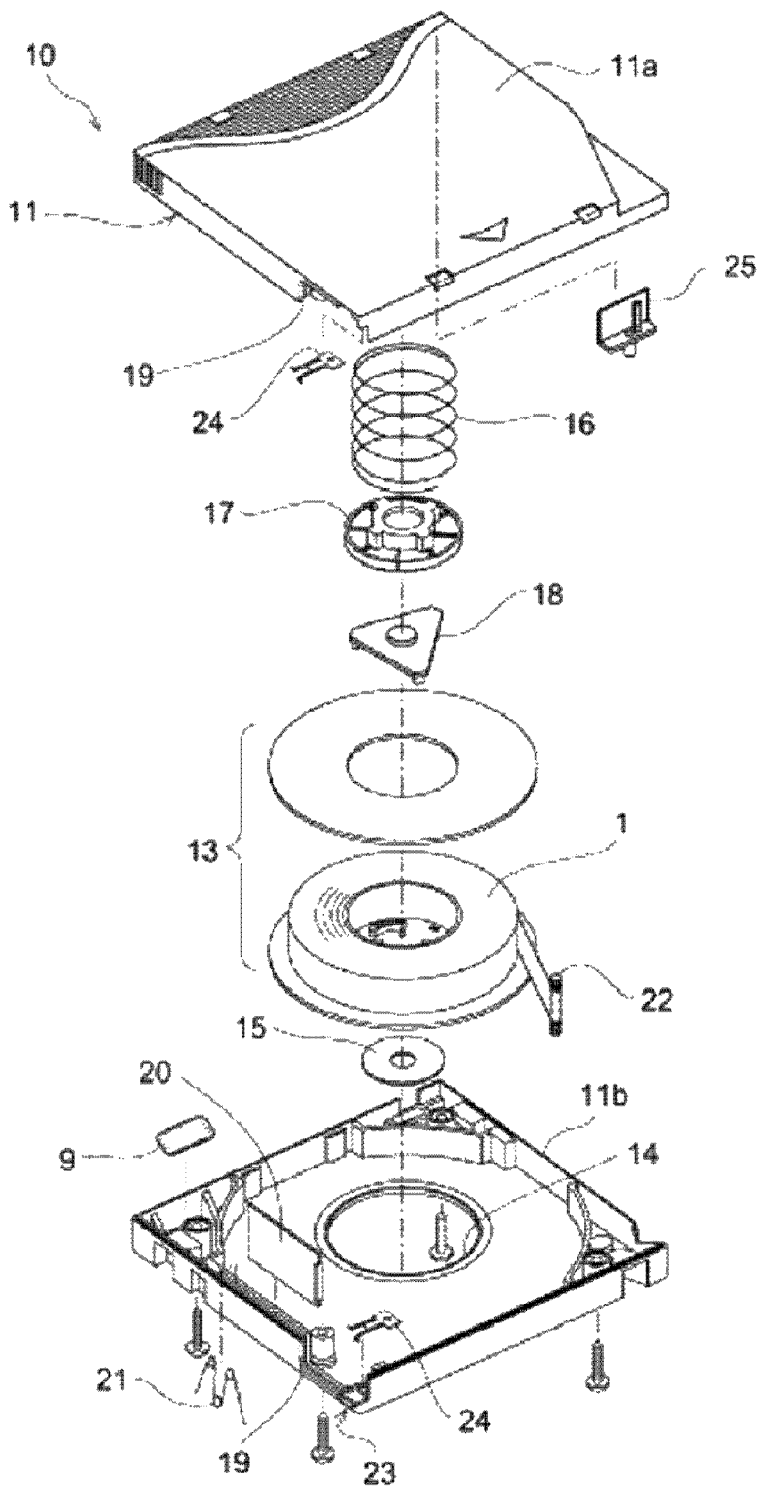
FIG. 1 is an exploded perspective view illustrating a magnetic recording cartridge according to an embodiment of the present technology.

Hereinafter, preferred embodiments for implementing the present technology will be described. Note that embodiments hereinafter described are representative embodiments of the present technology, and the scope of the present technology is not limited only to them.

The present technology will be described in the following order.

1. Description of Present Technology
2. First Embodiment (Example of Magnetic Recording Cartridge Including Coating Type Magnetic Recording Medium)
   (1) Configuration of Magnetic Recording Cartridge
   (2) Recording and Reproducing Apparatus
   (3) Configuration of Modified Example of Magnetic Recording Cartridge
   (4) Description of Each Layer of Magnetic Recording Medium
   (5) Physical Properties and Structure of Magnetic Recording Medium
   (6) Method of Manufacturing Magnetic Recording Medium
   (7) Effects
   (8) Modified Example
3. Second Embodiment (Example of Magnetic Recording Cartridge Including Vacuum Thin Film Type Magnetic Recording Medium)
   (1) Configuration of Magnetic Recording Cartridge
   (2) Description of Each Layer of Magnetic Recording Medium
   (3) Physical Properties and Structure of Magnetic Recording Medium
   (4) Configuration of Sputtering Apparatus
   (5) Method of Manufacturing Magnetic Recording Medium
   (6) Effects
   (7) Modified Example
   (8) Another Example of Magnetic Recording Medium
4. Examples 1. Description of Present Technology There is a demand for further increasing recording capacity per magnetic recording cartridge. For example, in order to increase recording capacity, it is conceivable to make a magnetic recording medium (for example, a magnetic tape)

included in the magnetic recording cartridge thinner (reduce total thickness) to increase tape length per magnetic recording cartridge.

However, as the magnetic recording medium becomes thinner, variation in dimension in a track width direction may easily occur. The variation in dimension in the width direction may cause an undesirable phenomenon for magnetic recording, for example, an off-track phenomenon. The off-track phenomenon refers to that a target track does not exist at a track position to be read by a magnetic head, or that a magnetic head reads a wrong track position.

The magnetic tape included in the magnetic recording cartridge has a narrower usable temperature range than HDD, and has been used in a temperature range up to 45° C. By allowing the magnetic recording cartridge to be used in a high temperature environment of 60° C. or more similar to the HDD, it is easy to manage a temperature environment when the magnetic recording cartridge is incorporated in a data storage system such as a cloud system, and it is expected that a use range of a tape storage system is greatly expanded.

However, in the magnetic tape wound around a reel of the magnetic recording cartridge, due to storage in a high-temperature environment of 60° C. or more, a portion that receives a high winding stress on an inner side of winding expands in a width direction of the magnetic tape, and a portion on an outer side of winding, which is pulled in a longitudinal direction by tension applied to the magnetic recording tape, narrows in the width direction due to creep phenomenon, and a difference in width between the inner side of winding and the outer side of winding tends to increase.

Conventionally, in order to suppress the variation in dimension of the magnetic recording medium, for example, a method of adding a layer for suppressing the variation in dimension of the magnetic recording medium has been performed.

However, the addition of the layer may increase the thickness of the magnetic recording tape, and does not increase tape length per the cartridge product.

The present inventors have studied a magnetic recording medium suitable for use in a recording and reproducing apparatus capable of keeping the width of an elongated magnetic recording medium constant or substantially constant by adjusting tension of the magnetic recording medium in a longitudinal direction. The recording and reproducing apparatus detects, for example, a dimension or variation in dimension of the magnetic recording medium in a width direction, and adjusts the tension in the longitudinal direction on the basis of a detection result.

However, after storage in a high-temperature environment of 60° C. or more, the difference between the width of the inner side of winding and the width of the outer side of winding increases, and therefore, it is difficult for the magnetic recording medium to keep the width constant or substantially constant even if the tension adjustment in the longitudinal direction is performed by the recording and reproducing apparatus.

In view of the above circumstances, the present inventors have studied a magnetic recording cartridge having a high recording capacity per cartridge. As a result, the present inventors have found that the magnetic recording cartridge having a specific configuration has a high recording capacity, and the width in the longitudinal direction can be corrected by adjusting running tension of a tape system or changing a winding direction even when stored in a high-temperature environment of 60° C. or more. Note that, in order to change the winding direction, for example, it can be realized by winding a magnetic tape around a reel on a drive side in a cartridge of one reel, and it can be realized by rewinding on a reel opposite to a stored state in a cartridge of two reels. For example, if the magnetic tape is stored in a state of being wound around a left reel, it can be realized by rewinding on a right reel.

That is, the present technology provides a magnetic recording cartridge including a magnetic recording medium having a base layer and a reel, in which the loss modulus at 65° C. of the base layer is 0.40 GPa or less. The magnetic recording medium is accommodated in a state of being wound around the reel, and when a variation in width is measured over an entire length of the magnetic recording medium after storage at 65° C. for 360 hours, a sign of variation in width Lout on an outer side of winding is different from a sign of variation in width Δin on an inner side of winding, and the variation in width is 0 ppm at any position of two portions sandwiching a center line of the entire length of the magnetic recording medium in a case where the entire length of the magnetic recording medium is divided into four portions by dividing into four equal parts. A method for measuring the variation in width of the magnetic recording medium will be described in (5) of 2. below.

The loss modulus at 65° C. of the base layer of the magnetic recording medium included in the magnetic recording cartridge of the present technology may be 0.40 GPa or less, preferably 0.35 GPa or less, more preferably 0.30 GPa or less, further preferably 0.25 GPa or less, and still more preferably 0.20 GPa or less. Since the loss modulus at 65° C. of the base layer of the magnetic recording medium is within the above numerical range described above, the width in the longitudinal direction can be corrected by adjusting the running tension of the tape system or changing the winding direction even when stored in a high-temperature environment of 60° C. or more.

Furthermore, the lower limit of the loss modulus at 65° C. of the base layer is not particularly limited, but may be, for example, preferably 0.01 GPa or more, more preferably 0.02 GPa or more, and further preferably 0.03 GPa or more. A method for measuring the loss modulus at 65° C. of the base layer will be described in (5) of 2. below.

The storage modulus at 65° C. of the base layer of the magnetic recording medium included in the magnetic recording cartridge of the present technology may be preferably 8.0 GPa or less, more preferably 7.0 GPa or less, and further preferably 6.0 GPa or less. Since the storage modulus at 65° C. of the base layer of the magnetic recording medium is within the above numerical range described above, it is possible to provide a magnetic recording cartridge capable of correcting the width in the longitudinal direction of the magnetic recording medium by adjusting the running tension of the tape system or changing the winding direction even after storage in a high-temperature environment.

Furthermore, the lower limit of the storage modulus at 65° C. of the base layer is not particularly limited, but may be, for example, preferably 0.01 GPa or more, more preferably 0.02 GPa or more, and further preferably 0.03 GPa or more. The method for measuring the storage modulus at 65° C. of the base layer will be described in (5) of 2. below.

In the magnetic recording cartridge of the present technology, the magnetic recording medium is wound around a reel, and when a variation in width is measured over the entire length of the magnetic recording medium after storage at 65° C. for 360 hours, a sign of variation in width Δout on an outer side of winding is different from a sign of variation in width Δin on an inner side of winding. Note that the variation in width Δ can be expressed by the following formula.

Variation in width Δ=(Variation in width after storage at 65° C. 360° C.−Variation in width in initial state)/(Variation in width in initial state)

A negative value of the variation in width Δ indicates that the width after storage is narrower than the width in the initial state, and a positive value of the variation in width Δ indicates that the width after storage is wider than the width in the initial state.

Some magnetic recording cartridges have one reel and some have two reels in the cartridge. In any type of magnetic recording cartridge, a magnetic recording medium (magnetic tape) is wound around a reel, and the magnetic recording medium is accommodated in the magnetic cartridge. As the magnetic recording medium is wound around the reel at the time of manufacturing the magnetic cartridge, the magnetic recording medium is laminated, so that a laminated body of the magnetic recording medium is formed. In the present specification, the inner side of winding refers to a region on an innermost layer side of the laminated body of the magnetic recording medium in a state where the laminated body is formed on one reel by being wound around the one reel before first data recording is performed on the magnetic cartridge, and the outer side of winding refers to a region on an outermost layer side of the laminated body of the magnetic recording medium. More specifically, the inner side of winding refers to, with an end portion attached to a reel in the magnetic recording cartridge (a reel around which the magnetic recording medium is wound before first data recording is performed on the magnetic cartridge) (hereinafter, also referred to as an "inner side end portion" (EOT)) of the two end portions of the magnetic recording medium as a starting point, a region from the position to a position advanced by a predetermined distance in a direction of an end portion opposite to the inner side end portion (hereinafter, also referred to as an "outer side end portion" (BOT)).

In the magnetic recording cartridge having one reel illustrated in FIG. 1, the inner side of winding refers to, with an end portion attached to a tape reel 13 before first data recording is performed (hereinafter, also referred to as an "inner side end portion" (EOT)) as a starting point, a region from the position to a position advanced by a predetermined distance in a direction of an end portion opposite to the inner side end portion (hereinafter, also referred to as an "outer side end portion" (BOT)). The outer side of winding refers to, with the outer side end portion of the two end portions of the magnetic recording medium as a starting point, a region from the position to a position advanced by a predetermined distance in a direction of the inner side end portion.

In the magnetic recording cartridge having two reels illustrated in FIG. 18, the inner side of winding refers to, with an end portion attached to a reel 407 before first data recording is performed (hereinafter, also referred to as an "inner side end portion" (EOT)) as a starting point, a region from the position to a position advanced by a predetermined distance in a direction of an end portion opposite to the inner side end portion (hereinafter, also referred to as an "outer side end portion" (BOT)). The outer side of winding refers to, with the outer side end portion of the two end portions of the magnetic recording medium as a starting point, a region from the position to a position advanced by a predetermined distance in a direction of the inner side end portion.

Figure 27:
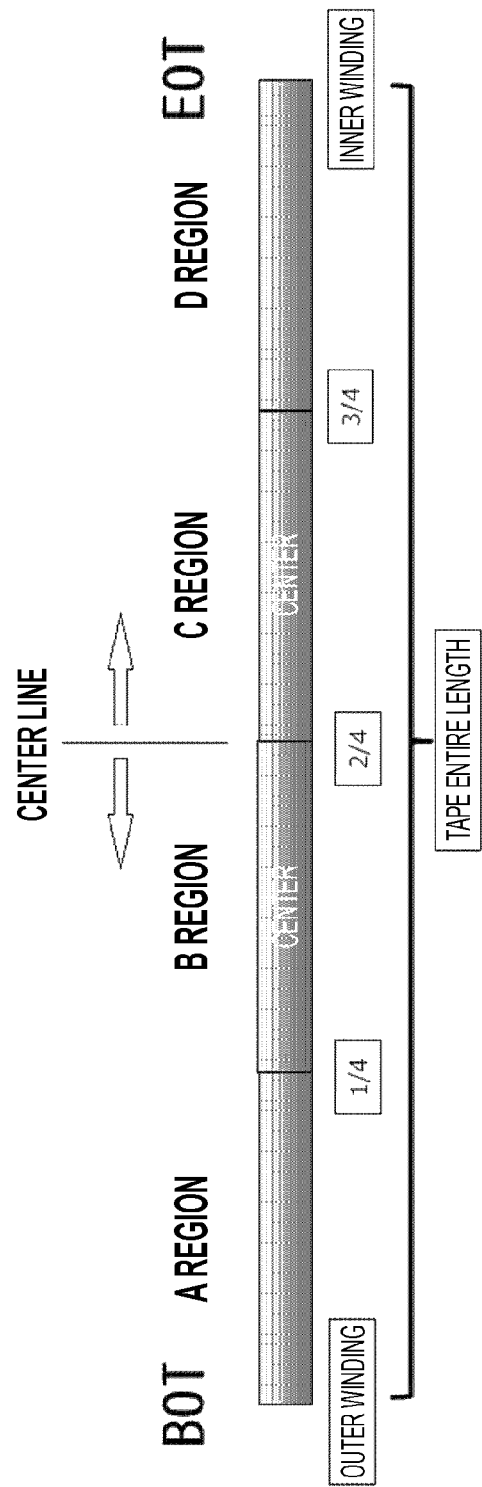
FIG. 27 is a view illustrating a state in which an entire length of a magnetic tape is divided into four regions by dividing into four equal parts.

The inner side of winding and the outer side of winding will be described more specifically with reference to FIG. 27. FIG. 27 is a view schematically illustrating a state in which an entire length of the magnetic tape is divided into four portions by dividing from an inner side end portion of winding (EOT) to an outer side end portion of winding (BOT) into four equal parts. As illustrated in FIG. 27, the entire length of the tape is divided into four portions of D region, C region, B region, and A region in order from the EOT toward the BOT. In the present specification, the A region in FIG. 27 is defined as the outer side of winding, and the D region is defined as the inner side of winding.

In the magnetic recording cartridge of the present technology, the variation in width is 0 ppm at any position of two portions sandwiching a center line of the entire length of the magnetic recording medium in a case where the entire length of the magnetic recording medium is divided into four portions by dividing into four equal parts. This will be described with reference to FIG. 27. FIG. 27 is a view schematically illustrating a state in which an entire length of the magnetic tape is divided into four portions by dividing from an inner side end portion of winding (EOT) to an outer side end portion of winding (BOT) into four equal parts. As illustrated in FIG. 27, the entire length of the tape is divided into four portions of D region, C region, B region, and A region in order from the EOT toward the BOT. As illustrated in FIG. 27, the center line of the entire length of the magnetic tape is located between the B region and the C region and is a boundary line that separates the B region and the C region, and two portions sandwiching the center line are the B region and the C region. In the magnetic recording cartridge of the present technology, the variation in width is 0 ppm at any position of the B region or the C region.

A method for measuring the variation in width will be described in (5) of 2. below.

In the magnetic recording cartridge of the present technology, the variation in width Δin on the inner side of winding may be a positive value. Here, the variation in width Δin on the inner side of winding means the maximum value of the variation in width on the inner side of winding. The fact that the variation in width Δin on the inner side of winding is a positive value indicates that the width after storage is wider than the width in the initial state on the inner side of winding.

In the magnetic recording cartridge of the present technology, the variation in width Δout on the outer side of winding may be a negative value. Here, the variation in width Δout on the outer side of winding means the minimum value of the variation in width on the outer side of winding. The fact that the variation in width Lout on the outer side of winding is a negative value indicates that the width after storage is narrower than the width in the initial state on the outer side of winding.

Furthermore, when an entire length of the magnetic recording medium in the longitudinal direction is taken as 100%, preferably at a position 25% to 75% from the outer side end portion of winding (BOT), the variation in width Δ of the magnetic recording medium after storage at 65° C. for 360 hours may be 0 ppm. In the magnetic recording medium illustrated in FIG. 27, the variation in width Δ of the magnetic recording medium after storage at 65° C. for 360 hours at any position of the B region and the C region corresponding to the position of 25% to 75% from the outer side end portion of winding (BOT) may be 0 ppm.

Furthermore, as illustrated in FIG. 27, in the magnetic recording medium divided into four portions by dividing the entire length into four equal parts, preferably, the average value of the variation in width Δ in the A region corresponding to ¼ portion on the outer side of winding may be a negative value, and the average value of the variation in width Δ in the D region corresponding to ¼ portion on the inner side of winding may be a positive value.

Furthermore, in the magnetic recording medium, (variation in width Δin on inner side of winding)−(variation in width Δout on outer side of winding) may be 800 ppm or less.

The magnetic recording medium included in the magnetic recording cartridge of the present technology is preferably an elongated magnetic recording medium, and can be, for example, a magnetic recording tape (particularly an elongated magnetic recording tape).

The magnetic recording medium included in the magnetic recording cartridge of the present technology may include a magnetic layer, a base layer, and a back layer, and may include other layers in addition to these layers. The other layers may be appropriately selected according to the type of the magnetic recording medium. The magnetic recording medium may be, for example, a coating type magnetic recording medium or a vacuum thin film type magnetic recording medium. The coating type magnetic recording medium will be described in more detail in 2. below. The vacuum thin film type magnetic recording medium will be described in more detail in 3. below. For the layers included in the magnetic recording medium other than the three layers described above, these descriptions may be referred to.

The magnetic recording medium included in the magnetic recording cartridge of the present technology can have, for example, at least one data band and at least two servo bands. The number of data bands can be, for example, 2 to 10, particularly 3 to 6, and more particularly 4 or 5. The number of servo bands can be, for example, 3 to 11, particularly 4 to 7, and more particularly 5 or 6. These servo bands and data bands may be arranged, for example, so as to extend in the longitudinal direction of the elongated magnetic recording medium (particularly, magnetic recording tape), and in particular, so as to be substantially parallel. The data bands and the servo bands can be provided in the magnetic layer. Examples of the magnetic recording medium having the data bands and the servo bands as described above include a magnetic recording tape conforming to the LTO (Linear Tape-Open) standard. That is, the magnetic recording medium may be a magnetic recording tape conforming to the LTO standard. For example, the magnetic recording medium may be a magnetic recording tape conforming to LTO9 or a later standard (for example, LTO10, LTO11, LTO12, or the like).

The width of the elongated magnetic recording medium (particularly, magnetic recording tape) can be, for example, 5 mm to 30 mm, particularly 7 mm to 25 mm, more particularly 10 mm to 20 mm, and still more particularly 11 mm to 19 mm. The length of the elongated magnetic recording medium (particularly, magnetic recording tape) can be, for example, 500 m to 1500 m. For example, the tape width conforming to the LTO8 standard is 12.65 mm, and the length is 960 m.

2. First Embodiment (Example of Magnetic Recording Cartridge Including Coating Type Magnetic Recording Medium)

(1) Configuration of Magnetic Recording Cartridge

[Magnetic Recording Cartridge]

First, a configuration of a magnetic recording cartridge according to the present technology will be described with reference to FIG. 1. FIG. 1 is an exploded perspective view illustrating an example of a magnetic recording cartridge 10 according to the present technology. In the description of the present technology, a magnetic recording cartridge conforming to the LTO standard will be described as an example of the magnetic recording cartridge 10.

As illustrated in FIG. 1, the magnetic recording cartridge 10 includes a cartridge case 11, a tape reel 13, and a magnetic tape 1 which is a magnetic recording medium. The cartridge case 11 is configured by joining an upper shell 11a and a lower shell 11b with a plurality of screw members. A single tape reel 13 around which the magnetic tape 1 is wound is rotatably accommodated inside the cartridge case 11.

A chucking gear (not illustrated) to be engaged with a spindle 31 (see FIG. 6) of the tape drive apparatus 30 is annularly formed at a bottom center of the tape reel 13. The chucking gear is exposed to the outside through an opening 14 formed at the center of the lower shell 11b. An annular metal plate 15 magnetically attracted to the spindle 31 is fixed to the inner peripheral side of the chucking gear.

A reel spring 16, a reel lock member 17, and a spider 18 are disposed between an inner surface of the upper shell 11a and the tape reel 13. Therefore, a reel lock mechanism that prevents the tape reel 13 from rotating when the magnetic recording cartridge 10 is not in use is configured.

A tape lead-out port 19 for leading out one end of the magnetic tape 1 to the outside is provided in one side wall portion of the cartridge case 11. A slide door 20 for opening and closing the tape lead-out port 19 is arranged inside the side wall portion. The slide door 20 is configured to slide in a direction of opening the tape lead-out port 19 against a biasing force of a torsion spring 21 by engagement with a tape loading mechanism (not illustrated) of the tape drive apparatus 30.

A leader pin 22 is fixed to one end portion of the magnetic tape. The leader pin 22 is configured to be detachable from a pin holding portion 23 provided on the inner side of the tape lead-out port 19. The pin holding portion 23 includes an elastic holding tool 24 that elastically holds an upper end portion and a lower end portion of the leader pin 22 on the upper wall inner surface (the inner surface of the upper shell 11a) and the bottom wall inner surface (the inner surface of the lower shell 11b) of the cartridge case 11, respectively.

Then, in addition to a safety tab 25 for preventing erroneous erasure of information recorded on the magnetic tape 1, a cartridge memory 9 capable of reading and writing contents related to data recorded on the magnetic tape 1 in a non-contact manner is arranged inside the other side wall of the cartridge case 11.

Figure 2:
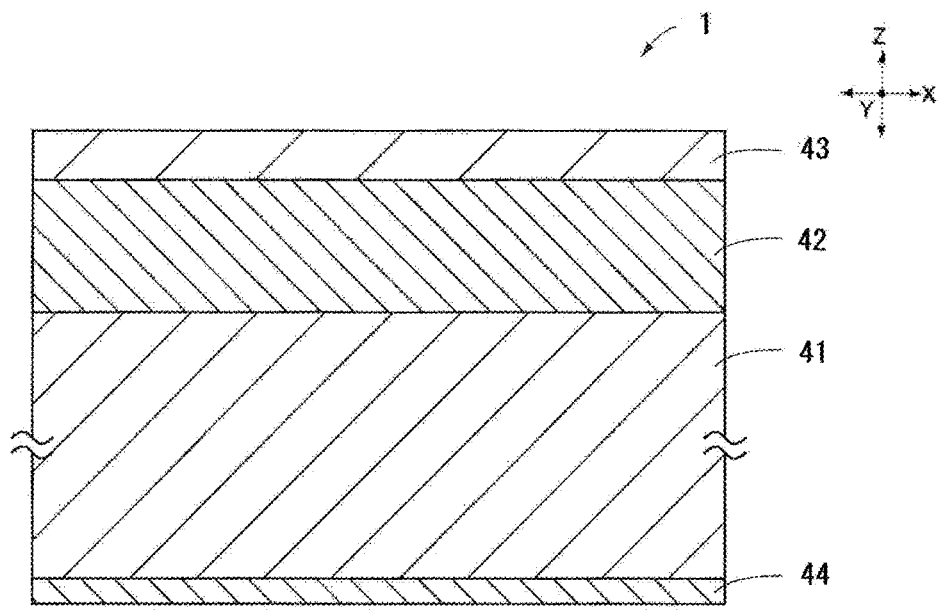
FIG. 2 is a schematic view of a magnetic recording medium according to an embodiment of the present technology as viewed from the side.
Figure 3:
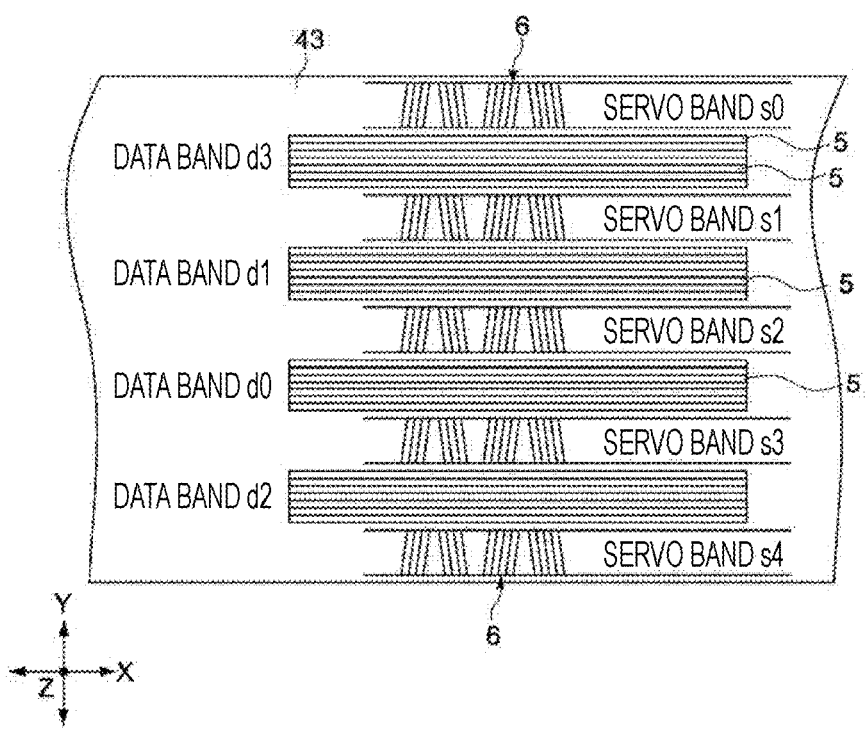
FIG. 3 is a schematic view of the magnetic recording medium described above as viewed from above (magnetic layer side).

FIG. 2 is a schematic view of the magnetic tape 1 as viewed from the side, and FIG. 3 is a schematic view of the magnetic tape 1 as viewed from above (magnetic layer 43 side). As illustrated in FIGS. 2 and 3, the magnetic tape 1 is configured to be long in the longitudinal direction (X-axis direction), short in the width direction (Y-axis direction), and thin tape-like (elongated) in the thickness direction (Z-axis direction).

The magnetic tape 1 includes a tape-shaped base layer 41 elongated in the longitudinal direction (X-axis direction), a non-magnetic layer (underlayer) 42 provided on one main surface of the base layer 41, a magnetic layer 43 provided on the non-magnetic layer (underlayer) 42, and a back layer 44 provided on the other main surface of the base layer 41. Note that the back layer 44 may be provided as necessary, and the back layer 44 may be omitted. The magnetic tape 1 may be a perpendicular recording type magnetic recording medium or may be a longitudinal recording type magnetic recording medium.

Note that details of each layer constituting the magnetic tape 1 will be described later.

As illustrated in FIG. 3, the magnetic layer 43 has a plurality of data bands d (data bands d0 to d3) elongated in a longitudinal direction (X-axis direction) in which data is written and a plurality of servo bands s (servo bands s0 to s4) elongated in a longitudinal direction in which a servo pattern 6 is written. The servo bands s are arranged at positions at which each data band d is interposed therebetween in a width direction (y-axis direction).

In the present technology, a ratio of an area of the servo bands s to an area of the entire surface of the magnetic layer 43 is typically 4.0% or less. Note that a width of the servo band s is a tape width of ½ inches, and is, for example, 96 μm or less. The ratio of the area of the servo bands s to the area of the entire surface of the magnetic layer 43 can be measured, for example, by developing the magnetic tape 1 using a developer such as a ferricolloid developer or the like, and then observing the developed magnetic tape 1 with an optical microscope.

In the example illustrated in FIG. 3, an example in a case where the number of data bands d is four and the number of servo bands s is five is shown. Note that the number of data bands d and the number of servo bands s can be appropriately changed.

The data band d is long in the longitudinal direction and includes a plurality of recording tracks 5 aligned in the width direction. The number of recording tracks 5 included in one data band d is, for example, about 1,000 to 2,000. The data is recorded in the recording track 5 along the recording track 5. A 1-bit length of the data recorded in the data band d in the longitudinal direction is, for example, 48 nm or less. The servo band s includes a servo pattern 6 having a predetermined shape to be recorded by a servo pattern recording apparatus (see FIG. 9) as described later.

Here, in the magnetic tape 1 of the linear tape-open (LTO) standard, the number of recording tracks 5 is increased for each generation, and the recording capacity is dramatically improved. As an example, the number of recording tracks 5 is 384 in the primary LTO-1, and the numbers of recording tracks 5 are 512, 704, 896, 1,280, 2,176, 3,584, and 6,656 in order from LTO-2 to LTO-8, respectively. Similarly, the data storage capacity is 100 gigabyte (GB) in LTO-1, and the data recording capacities are 200 GB, 400 GB, 800 GB, 1.5 terabyte (TB), 2.5 TB, 6.0 TB, and 12 TB in order from LTO-2 to LTO-8, respectively.

In the present embodiment, the number of recording tracks 5 and the recording capacity are not particularly limited, and can be appropriately changed. However, for example, it is advantageous to apply the present technology to the magnetic tape 1 that has the number of recording tracks 5 and the recording capacity are large (for example, 6,656 or more, 12 TB or more: LTO-8 or later) and is susceptible to the influence of fluctuation in width of the magnetic tape.

[Data Band and Servo Band]

FIG. 4 is an enlarged view illustrating the recording tracks 5 in the data band d. As illustrated in FIG. 4, the recording track 5 is elongated in the longitudinal direction, is aligned in the width direction, and furthermore, has a predetermined recording track width (track pitch) Wd for each track in the width direction. The recording track width Wd is typically 2.0 μm or less. Note that such a recording track width Wd can be measured by, for example, developing the magnetic layer 43 of the magnetic tape 1 using a developer such as a ferricolloid developer, and then observing the developed magnetic layer 43 of the magnetic tape 1 with an optical microscope. Alternatively, as a measurement method using the drive head, the recording track width Wd can be measured from an output change in a case where the drive head is set to the Read While Write (reproduction at the time of recording) state and Azimuth of the drive head is changed in order to ignore the fluctuation during running of the tape. (IEEE_Sept1996_Crosstrack Profiles of Thin Film MR Tape Heads Using the Azimuth Displacement Method)

FIG. 5 is an enlarged view illustrating the servo pattern 6 written in the servo band s. As illustrated in FIG. 5, the servo pattern 6 includes a plurality of stripes inclined at a predetermined azimuth angle α with respect to the width direction (Y-axis direction), which will be described later in detail. The plurality of stripes are classified into a first stripe group 61 inclined clockwise with respect to the width direction (Y-axis direction) and a second stripe group 62 inclined counterclockwise with respect to the width direction (Y-axis direction). The first stripe group 61 and the second stripe group 62 typically include four or five stripes. Note that the shape and the like of the servo pattern 6 can be measured by, for example, developing the magnetic layer 43 of the magnetic tape 1 using a developer such as a ferricolloid developer, and then observing the developed magnetic layer 43 of the magnetic tape 1 with an optical microscope.

In FIG. 5, a servo trace line T which is a line traced by a servo read head 132 (see FIG. 7) as described later on the servo pattern 6 is indicated by a broken line. The servo trace line T is set in the longitudinal direction (X-axis direction) and is set at a predetermined interval Ps in the width direction.

The number of servo trace lines T per servo band s is, for example, about 30 to 60. An interval Ps between two adjacent servo trace lines T is the same as a value of the recording track width Wd, and is, for example, 2.0 μm or less. Here, the interval Ps between the two adjacent servo trace lines T is a value that determines the recording track width Wd. That is, when the interval Ps between the servo trace lines T is narrowed, the recording track width Wd is decreased, and the number of recording tracks 5 included in one data band d is increased. As a result, the data recording capacity is increased.

(2) Recording and Reproducing Apparatus

Figure 6:
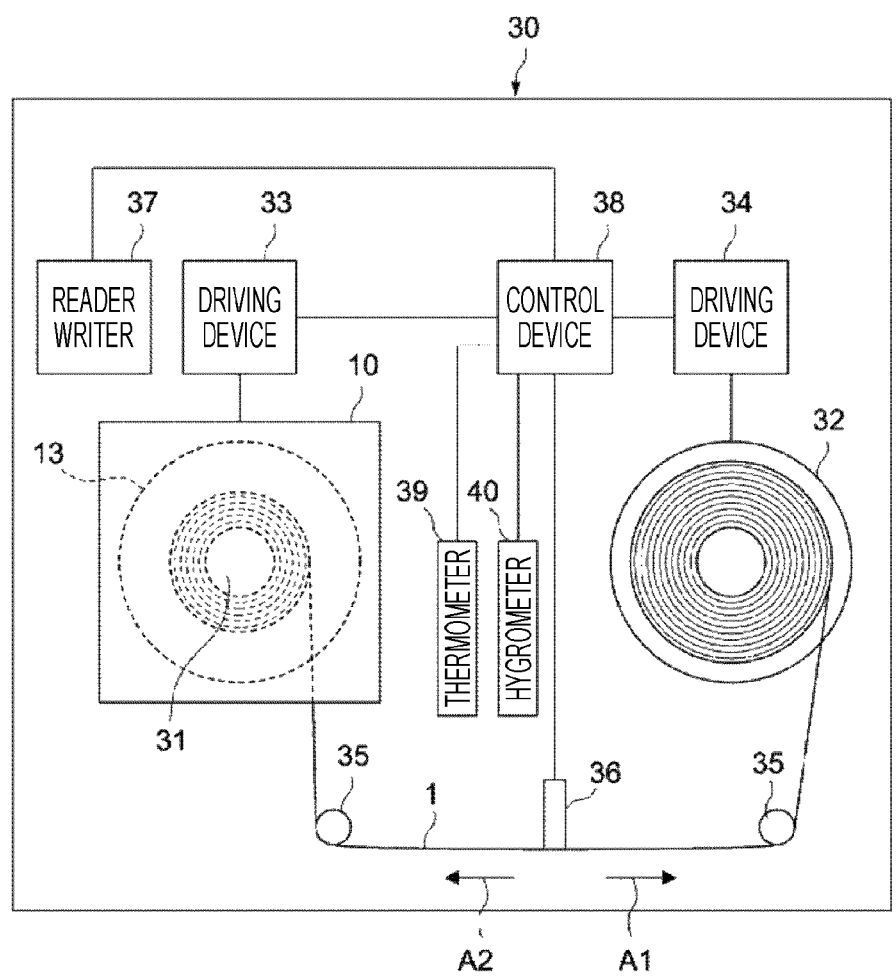
FIG. 6 is a diagram illustrating a recording and reproducing apparatus.

FIG. 6 is a view illustrating a recording and reproducing apparatus 30. The recording and reproducing apparatus 30 is a data recording/reproducing apparatus capable of recording data on the magnetic tape 1 or reproducing data recorded on the magnetic tape 1.

As illustrated in FIG. 6, the recording and reproducing apparatus 30 is configured to be able to load the magnetic recording cartridge 10. The recording and reproducing apparatus 30 is configured to be able to load one magnetic recording cartridge 10.

The recording and reproducing apparatus 30 includes a spindle 31, a winding reel 32, a spindle driving device 33, a reel driving device 34, a plurality of guide rollers 35, a drive head 36, a reader writer 37, and a control device 38. The recording and reproducing apparatus 30 may further include a thermometer 39, a hygrometer 40, and the like.

The spindle 31 has a head portion that engages with a chucking gear of a tape reel 13 via an opening 14 formed in a lower shell 11b of the magnetic recording cartridge 10. The spindle 31 raises the tape reel 13 by a predetermined distance against a biasing force of a reel spring 16 and releases a reel lock function by a reel lock member 17. Therefore, the tape reel 13 is rotatably supported inside a cartridge case 11 by the spindle 31.

The spindle driving device 33 rotates the spindle 31 according to a command from the control device 38. The winding reel 32 is configured to be able to fix a tip (leader pin 22) of the magnetic tape 1 pulled out from the magnetic recording cartridge 10 via a tape loading mechanism (not illustrated).

The plurality of guide rollers 35 guide the running of the magnetic tape 1 so that a tape bus formed between the magnetic recording cartridge 10 and the winding reel 32 has a predetermined relative positional relationship with respect to the drive head 36. The reel driving device 34 rotates the winding reel 32 according to a command from the control device 38.

When data is recorded/reproduced on the magnetic tape 1, the spindle 31 and the winding reel 32 are rotated by the spindle driving device 33 and the reel driving device 34, and the magnetic tape 1 runs. As for the running direction of the magnetic tape 1, the magnetic tape 1 can reciprocate in the forward direction (direction of unwinding from the tape reel 13 to the winding reel 32) indicated by the arrow A1 and the reverse direction (direction of rewinding from the winding reel 32 to the tape reel 13) indicated by the arrow A2 in FIG. 6.

Note that, in the present embodiment, the tension in the longitudinal direction (X-axis direction) of the magnetic tape 1 at the time of data recording/reproduction can be adjusted by controlling the rotation of the spindle 31 by the spindle driving device 33 and the rotation of the winding reel 32 by the reel driving device 34. Note that the adjustment of the tension of the magnetic tape 1 may be performed by control of the movement of the guide roller 35, a tension control unit including a dancer roller, or the like, instead of control of the rotation of the spindle 31 and the winding reel 32 (alternatively, in addition to the control).

The reader writer 37 is configured to be able to record management information in the cartridge memory 9 in response to a command from the control device 38. Furthermore, the reader writer 37 is configured to be able to read management information from the cartridge memory 9 in response to a command from the control device 38. As a communication method between the reader writer 37 and the cartridge memory 9, for example, an ISO 14443 method is adopted.

The control device 38 includes, for example, a control unit, a storage unit, a communication unit, and the like. The control unit includes, for example, a central processing unit (CPU) and the like, and comprehensively controls each unit of the recording and reproducing apparatus 30 according to a program stored in the storage unit.

The storage unit includes a nonvolatile memory in which various data or various programs are recorded, and a volatile memory used as a work area of the control unit. The various programs described above may be read from a portable recording medium such as an optical disk, a semiconductor memory, or the like, or may be downloaded from a server device on a network. The storage unit temporarily or non-temporarily stores information of the cartridge memory 9 read from the reader writer 27, output of the thermometer 39 and the hygrometer 40, and the like. The communication unit is configured to be able to communicate with other devices such as a personal computer (PC), a server device, and the like.

The drive head 36 is configured to be able to record data on the magnetic tape 1 according to a command from the control device 38. Furthermore, the drive head 36 is configured to be able to reproduce data written in the magnetic tape 1 in response to a command from the control device 38.

Figure 7:
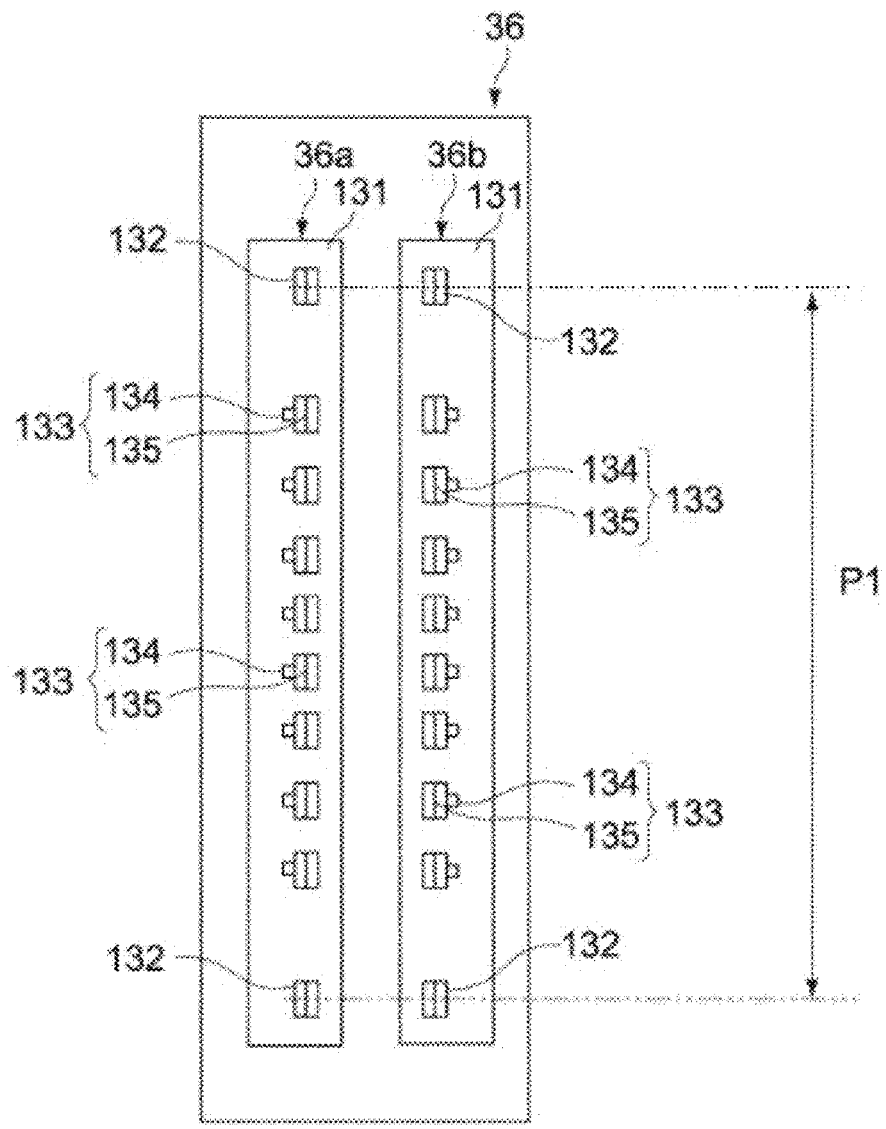
FIG. 7 is a schematic view of a drive head in the recording and reproducing apparatus described above.

The drive head 36 includes, for example, a head unit including two servo read heads, a plurality of data write/read heads, and the like. FIG. 7 is a schematic view of the drive head 36 as viewed from below (tape running surface).

As illustrated in FIG. 7, the drive head 36 has a first drive head part 36a and a second drive head part 36b. The first drive head part 36a and the second drive head part 36b are configured symmetrically in an X'-axis direction (the running direction of the magnetic tape 1 (X-axis direction in FIG. 3)). The first drive head part 36a and the second drive head part 36b are configured to be able to move in a width direction of the magnetic tape 1 (Y-axis direction in FIG. 3)).

The first drive head part 36a is a drive head used when the magnetic tape 1 runs in the forward direction (A1 direction in FIG. 6). On the other hand, the second drive head part 36b is a drive head used when the magnetic tape 1 runs in the reverse direction (A2 direction in FIG. 6). Since the first drive head part 36a and the second drive head part 36b have basically similar configurations, the first drive head part 36a will be representatively described.

The first drive head part 36a includes a head body 131, two servo read heads 132, and a plurality of data write/read heads 133.

Each of the servo read heads 132 is provided on each of both end sides of the head body 131 in the width direction (Y'-axis direction in FIG. 7). Examples of the MR element include an anisotropic magneto-resistive effect element (AMR), a giant magneto-resistive effect element (GMR), a tunnel magneto-resistive effect element (TMR), and the like. The interval between the two servo read heads 132 in a width direction (Y'-axis direction) is substantially the same as the distance between adjacent servo bands s in the magnetic tape 1, and details thereof will be described later.

The data write/read heads 133 are arranged at equal intervals in the width direction (Y'-axis direction). Furthermore, the data write/read heads 133 are arranged at a position interposed between the two servo read heads 132. The number of data write/read heads 133 is, for example, about 20 to 40, but the number is not particularly limited.

The data write/read head 133 includes a data write head 134 and a data read head 135. The data write head 134 is configured to be able to record a data signal in the data band d of the magnetic tape 1 by a magnetic field generated from a magnetic gap. Furthermore, the data read head 135 is configured to be able to reproduce a data signal by reading magnetic field generated from magnetic information recorded in the data band d of the magnetic tape 1 with a magneto-resistive effect element (MR) or the like. Examples of the MR element include an anisotropic magneto-resistive effect element (AMR), a giant magneto-resistive effect element (GMR), a tunnel magneto-resistive effect element (TMR), and the like.

In the first drive head part 36a, the data write head 134 is arranged on the left side of the data read head 135 (upstream side in a case where the magnetic tape 1 flows in the forward direction). On the other hand, in the second drive head part 36b, the data write head 134 is arranged on the right side of the data read head 135 (upstream side in a case where the magnetic tape 1 flows in the reverse direction). Note that data read head 135 can reproduce a data signal immediately after the data write head 134 writes the data signal to the magnetic tape 1.

Figure 8:
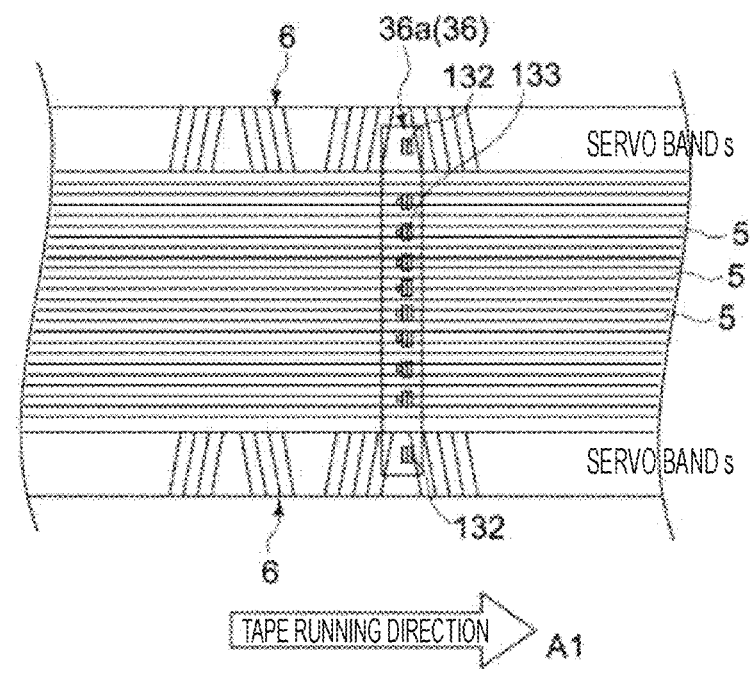
FIG. 8 is a view illustrating a state where the recording and reproducing apparatus described above performs recording and reproducing of a data signal.

FIG. 8 is a view illustrating a state where the first drive head part 36a performs recording and reproducing of a data signal. Note that, in the example illustrated in FIG. 8, a state when the magnetic tape 1 runs in the forward direction (A1 direction) is illustrated.

As illustrated in FIG. 8, when the first drive head part 36a performs recording and reproducing of a data signal, one servo read head 132 of the two servo read heads 132 is positioned on one servo band s of the two adjacent servo bands s and reads the servo pattern 6 on the servo band s. Furthermore, the other servo read head 132 of the two servo read heads 132 is positioned on the other servo band s of the two adjacent servo bands s and reads the servo pattern 6 on the servo band s.

The control device 38 determines whether or not the servo read head 132 accurately traces the target servo trace line T (see FIG. 5) on the basis of the reproduction waveform of the servo pattern 6.

The principle will be described. As illustrated in FIG. 5, in the servo pattern 6, a first stripe group 61 and a second stripe group 62 are inclined in opposite directions with respect to the width direction (Y-axis direction). Therefore, in the servo trace line T on the upper side, a distance between the first stripe group 61 and the second stripe group 62 in the longitudinal direction (X-axis direction) is relatively narrow. On the other hand, on the servo trace line T on the lower side, a distance between the first stripe group 61 and the second stripe group 62 in the longitudinal direction (X-axis direction) is relatively wide.

Therefore, when a difference between the time when the reproduction waveform of the first stripe group 61 is detected and the time when the reproduction waveform of the second stripe group 62 is detected is determined, it is possible to know where the servo read head 132 is currently positioned with respect to the magnetic tape 1 in the width direction (Y-axis direction).

Accordingly, the control device 38 can determine whether or not the servo read head 132 accurately traces on the target servo trace line T on the basis of the reproduction waveform of the servo pattern 6. Then, in a case where the servo read head 132 does not accurately trace on the target servo trace line T, the control device 38 moves the drive head 36 in the width direction (Y'-axis direction) to adjust the position of the drive head 36. Note that a method of measuring the servo trace line T on which the servo read head 132 traces will be described later with reference to FIG. 20.

Returning to FIG. 8, in a case where the magnetic tape 1 fluctuates in the width direction during running of the magnetic tape 1, the data write/read head 133 adjusts the position along the servo trace line T and records a data signal in the recording track 5.

Here, when the entire magnetic tape 1 is pulled out from the magnetic recording cartridge 10, the magnetic tape 1 runs in the reverse direction (A2 direction). At this time, the second drive head part 36b is used as the drive head 36. As the servo trace line T, a servo trace line T adjacent to the previous servo trace line T is used. In this case, the drive head 36 is moved by the interval Ps of the servo trace line T (=recording track width Wd) in the width direction (Y'-axis direction). In this case, the data signal is recorded in the recording track 5 adjacent to the recording track 5 on which the data signal is previously recorded.

As described above, in the magnetic tape 1, the data signal is recorded in the recording track 5 while the magnetic tape 1 is reciprocated several times by changing the running direction in the forward direction and the reverse direction. For example, it is assumed that the number of servo trace lines T is 50 and the number of data write/read heads 133 included in the first drive head part 36a (alternatively, the second drive head part 36b) is 32. In this case, the number of recording tracks 5 included in one data band d is 50×32, that is, 1,600, and in order to record a data signal on all the recording tracks 5, the magnetic tape 1 needs to be reciprocated 25 times.

[Servo Pattern Recording Apparatus]

Figure 9:
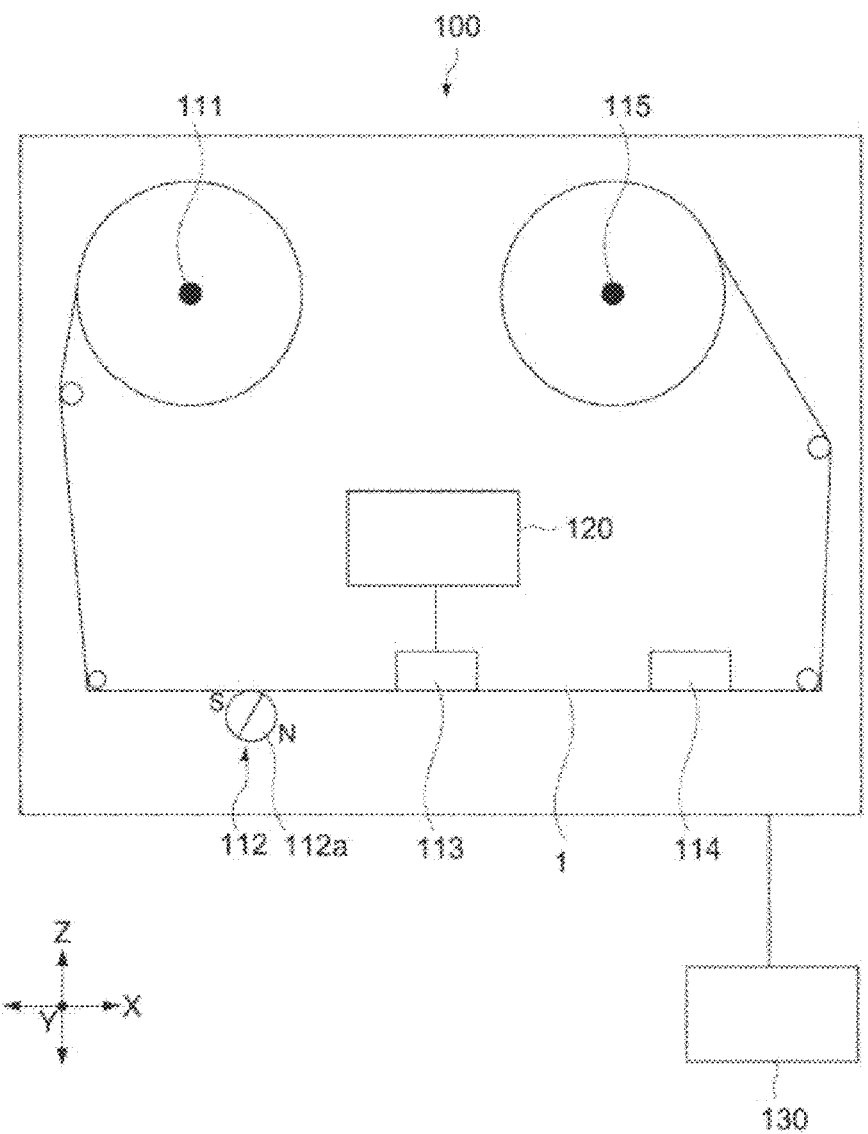
FIG. 9 is a front view illustrating a servo pattern recording apparatus according to an embodiment of the present technology.
Figure 10:
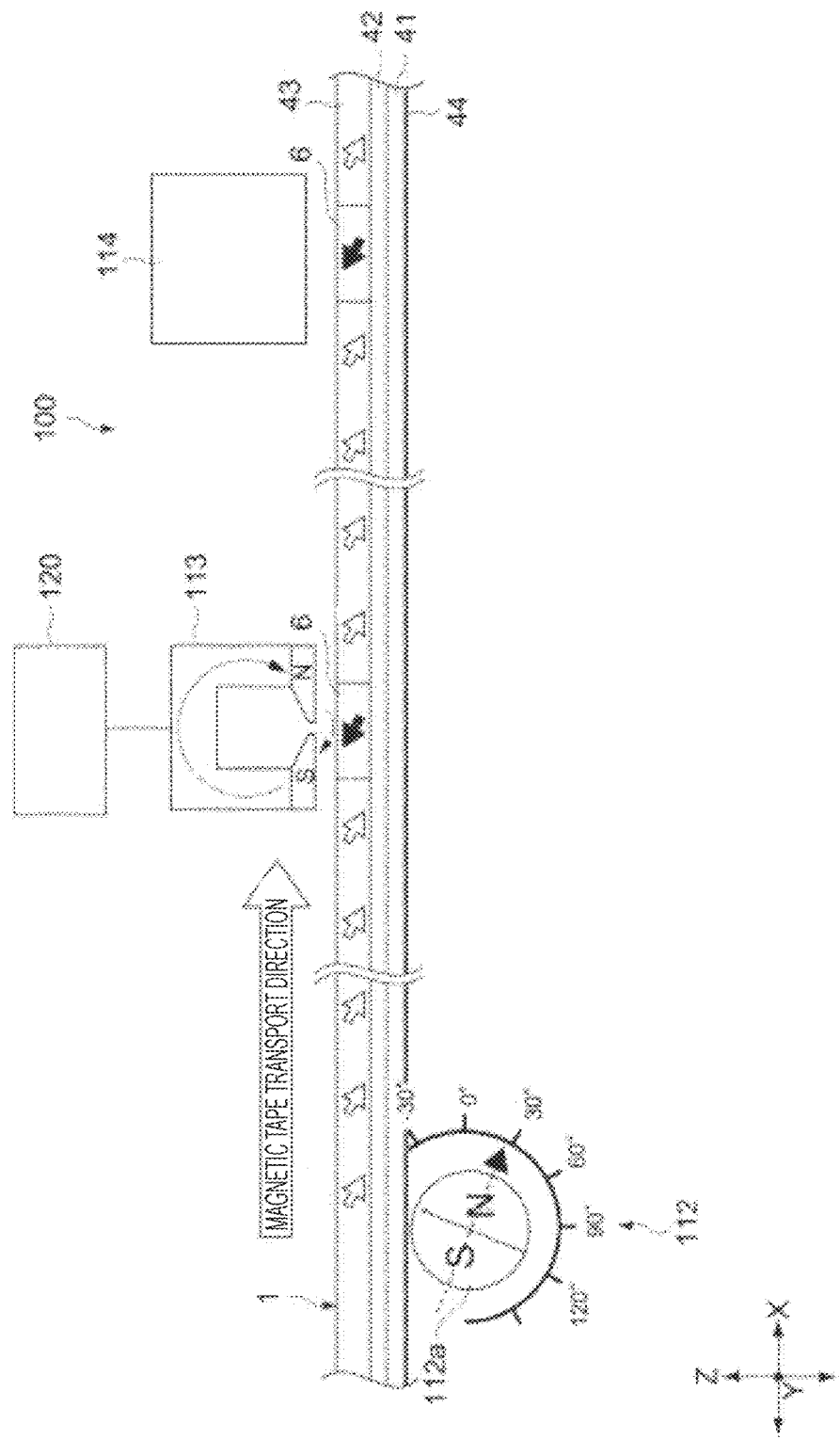
FIG. 10 is a partially enlarged view of a part of the servo pattern recording apparatus described above.

Next, a configuration of a servo pattern recording apparatus that records the servo pattern 6 on the servo band s of the magnetic tape 1 will be described. FIG. 9 is a front view illustrating a servo pattern recording apparatus 100 according to an embodiment of the present technology. FIG. 10 is a partially enlarged view of a part of the servo pattern recording apparatus 100.

The servo pattern recording apparatus 100 includes a feed roller 111, a pre-processing unit 112, a servo write head 113, a reproducing head unit 114, and a winding roller 115 in this order from the upstream side in a transport direction of the magnetic tape 1. The servo pattern recording apparatus 100 further includes a drive unit 120 and a controller 130. The controller 130 includes a control unit that comprehensively controls the respective units of the servo pattern recording apparatus 100, a recording unit that stores various programs and various types of data required for processing of the control unit, a display unit that displays data, an input unit that inputs data, and the like.

The feed roller 111 can rotatably support the roll-shaped magnetic tape 1 (before the servo pattern 6 is recorded). The feed roller 111 is rotated in accordance with driving of a drive source such as a motor or the like, and feeds the magnetic tape 1 toward the downstream side in accordance with the rotation.

The winding roller 115 can rotatably support the roll-shaped magnetic tape 1 (after the servo pattern 6 is recorded). The winding roller 115 rotates in synchronization with the feed roller 111 in accordance with driving of the drive source such as a motor or the like, and winds the magnetic tape 1 in which the servo pattern 6 is recorded in accordance with the rotation. The feed roller 111 and the winding roller 115 can move the magnetic tape 1 at a constant speed on the transport path.

The servo write head 113 is arranged, for example, above the magnetic tape 1 (magnetic layer 43 side). Note that the servo write head 113 may be arranged below the magnetic tape 1 (base layer 41 side). The servo write head 113 generates a magnetic field at a predetermined timing according to a rectangular wave pulse signal, and applies the magnetic field to a part of the magnetic layer 43 (after preprocessing) included in the magnetic tape 1.

Therefore, the servo write head 113 magnetizes a part of the magnetic layer 43 in a first direction and records the servo pattern 6 in the magnetic layer 43 (for the magnetization direction, see the black arrow in FIG. 10). When the magnetic layer 43 passes under the servo write head 113, the servo write head 113 can record the servo pattern 6 for each of the five servo bands s0 to s4.

The first direction that is the magnetization direction of the servo pattern 6 includes a component in a direction perpendicular to the upper surface of the magnetic layer 43. That is, in the present embodiment, the magnetic layer 43 contains magnetic powder vertically oriented or not oriented, and thus the servo pattern 6 to be recorded in the magnetic layer 43 includes a magnetization component in the vertical direction.

The pre-processing unit 112 is arranged, for example, below (base layer 41 side) of the magnetic tape 1 on the upstream side of the servo write head 113. The pre-processing unit 112 may be arranged above the magnetic tape 1 (magnetic layer 43 side). The pre-processing unit 112 includes a permanent magnet 112a rotatable about a center axis of rotation in the Y-axis direction (the width direction of the magnetic tape 1). A shape of the permanent magnet 112a is, for example, a cylindrical shape or a polygonal columnar shape, but is not limited thereto.

Before the servo pattern 6 is recorded by the servo write head 113, the permanent magnet 112a applies a magnetic field to the entire magnetic layer 43 by a direct-current magnetic field to demagnetize the entire magnetic layer 43. Therefore, the permanent magnet 112a can magnetize the magnetic layer 43 in advance in the second direction opposite to the magnetization direction of the servo pattern 6 (in FIG. 10, see the white arrow). As described above, the two magnetization directions are set to be opposite directions, respectively, such that the reproduction waveforms of the servo signals obtained by reading the servo pattern 6 can be symmetrical in a vertical direction (+).

Note that, as a method of adjusting the second direction described above, for example, a rotation angle of the permanent magnet 112a may be arbitrary, the servo pattern 6 may be recorded in the magnetic layer 43 after the entire magnetic layer 43 is demagnetized, and the rotation angle of the permanent magnet 112a with the width direction of the magnetic tape 1 as a center may be adjusted on the basis of the inclination of the reproduction waveform.

The reproducing head unit 114 is arranged above the magnetic tape 1 (magnetic layer 43 side) on the downstream side of the servo write head 113. The reproducing head unit 114 reads the servo pattern 6 described above from the magnetic layer 43 of the magnetic tape 1 in which the servo pattern 6 is pre-processed by the pre-processing unit 112 and is recorded by the servo write head 113. The reproduction waveform of the servo pattern 6 read by the reproducing head unit 114 is displayed on a screen of the display unit. Typically, the reproducing head unit 114 detects the magnetic flux generated from the surface of the servo band s when the magnetic layer 43 passes under the reproducing head unit 114. The magnetic flux detected at this time becomes a reproduction waveform of the servo pattern 6 as a servo signal.

[Servo Pattern]

Next, the servo pattern 6 will be described in detail. The servo pattern 6 has a data structure conforming to the "ECMA-319 standard". FIG. 11(A) is a view illustrating a data structure of an LPOS word embedded in the servo pattern 6, and FIG. 11(B) is a view for explaining a manufacturer word.

As illustrated in FIG. 11(A), a plurality of LPOS (longitudinal position) words LW continuously arranged in a tape longitudinal direction is embedded in the servo pattern 6. Each LPOS word LW is configured by 36-bit data including an 8-bit synchronization mark Sy meaning a head thereof, an LPOS value Ls including six 4 bits (24 bits in total) indicating a position (address) in the tape longitudinal direction, and a 4-bit manufacturer data Tx.

The manufacturer data Tx forms a manufacturer word TW on the magnetic tape 1. As illustrated in FIG. 11(B), the manufacturer word TW has a length of 97 pieces of manufacturer data Tx, and is obtained by continuously reading 97 LPOS words LW. The manufacturer word TW is configured as follows.

Manufacturer word TW: D, A0, A1, A0, A1, . . . , A0, A1

"D", which is the first manufacturer data Tx, is a symbol indicating a head of the manufacturer word TW, and 4-bit data converted by a predetermined table (typically, "0001") is written in this.

The second and subsequent 96 pieces of manufacturer data Tx are formed by alternately arranging "A0" and "A1", and two adjacent pieces of "A0" and "A1" form a symbol pair. Any 13 basic symbols (typically 0, 1, 2, 3, 4, 5, 6, 7, 8, 9, A, B, C) other than "D" are written in each of the symbol pairs "A0" and "A1". These 13 basic symbols also include 4-bit data converted by the predetermined table described above. Then, one symbol (hereinafter, also referred to as LPOS record value) determined according to a combination of specific two basic symbols (corresponding to the symbol pair described above) among the 13 basic symbols is specified.

The LPOS record value includes 8-bit data. The two basic symbols forming the symbol pair may be a combination of the same type (for example, 0, 0) or a combination of different types (for example, 0, 1).

Typically, in the 96 pieces of manufacturer data Tx configured as described above, in addition to the manufacturer information represented by the LPOS record value and the management information such as the manufacturing date and serial number of the magnetic tape, servo band identification information for identifying the servo band, and the like are embedded.

FIG. 12(A) is a schematic plan view illustrating an arrangement example of the servo patterns 6, and FIG. 12(B) is a view illustrating a reproduction waveform thereof.

In a timing-based servo type head tracking servo, the servo pattern includes a plurality of azimuthal slope patterns having two or more different shapes. The position of the servo read head 132 is recognized by the time interval at which two inclined patterns having different shapes are read and the time interval at which two inclined patterns having the same shape are read. On the basis of the position of the servo read head 132 thus recognized, the position of the drive head 36 in the width direction (Y-axis direction) of the magnetic tape 1 is controlled (see FIGS. 7 and 8).

As illustrated in FIG. 12(A), the servo pattern 6 forms a servo frame SF including a first servo sub-frame SSF1 and a second servo sub-frame SSF2. The servo frames SF are continuously arranged at predetermined intervals in the tape longitudinal direction. Each servo frame SF encodes a single bit of "1" or "0". That is, one servo frame SF corresponds to one bit.

The first servo sub-frame SSF1 is constituted by an A burst 6a and a B burst 6b. The A burst 6a includes five linear patterns (corresponding to the first stripe group 61 in FIG. 5) inclined in a first direction with respect to the tape longitudinal direction, and the B burst 6b includes five linear patterns (corresponding to the second stripe group 62 in FIG. 5) inclined in a second direction opposite to the first direction described above with respect to the tape longitudinal direction.

On the other hand, the second servo sub-frame SSF2 is constituted by a C burst 6c and a D burst 6d. The C burst 6c includes four linear patterns (corresponding to the first stripe group 61 in FIG. 5) inclined in the first direction described above, and the D burst 6d includes four linear patterns (corresponding to the second stripe group 62 in FIG. 5) inclined in the second direction.

The lengths of the servo frame SF and each of the servo sub-frames SSF1 and SSF2, the arrangement intervals of the inclined portions that incline the respective bursts 6a to 6d, and the like can be arbitrarily set according to the type, specification, and the like of the magnetic tape.

The reproduction waveform of the servo pattern 6 typically shows a burst waveform as illustrated in FIG. 12(B), and a signal S6a corresponds to the A burst 6a, a signal S6b corresponds to the B burst 6b, a signal S6c corresponds to the C burst 6c, and then a signal S6d corresponds to the D burst 6d.

In the timing-based servo type head tracking servo, a position error signal (PES) is generated by reading the servo pattern 6 on two servo bands adjacent to one data band, and a recording and reproducing head with respect to a recording track in the corresponding data band is appropriately positioned. Typically, the servo pattern 6 is read from the magnetic tape 1 running at a predetermined speed, a ratio of a distance (the time interval) AC between the A burst 6a and the C burst 6c that are arrays of the inclined patterns having the same shapes as each other to a distance (the time interval) AB between the A burst 6a and the B burst 6b that are arrays of the inclined patterns having the different shapes from each other (or a ratio of a distance CA between the C burst 6c and the A burst 6a to a distance CD between the C burst 6c and the D burst 6d) is calculated, and the drive head 36 is moved in the tape width direction (Y-axis direction) so that the value is a setting value set for each recording track (see FIG. 8).

[Identification of Data Band]

In each of the servo bands s (s0 to s4), servo band identification information in a different combination is written for each data band. For example, a combination of servo band identification information obtained from two servo bands s2 and s3 adjacent to the data band d0 is different from a combination of servo band identification information obtained from the servo bands s1 and s2 adjacent to the data band d1, a combination of servo band identification information obtained from the two servo bands s3 and s4 adjacent to the data band d2, and a combination of servo band identification information obtained from two servo bands s0 and s1 adjacent to the data band d3. As described above, the servo band identification information obtained from two servo bands adjacent to one data band is set to be different from the servo band identification information obtained from two servo bands adjacent to the other data band, such that the individual data bands can be identified.

In the present embodiment, two types of servo bands are used to identify the data bands d0 to d4 to be recorded and reproduced. As described above, servo band identification information is embedded in the servo band. The servo band identification information is information of a plurality of bits and is embedded in predetermined positions of the second and subsequent 96 pieces of manufacturer data Tx in the manufacturer word TW. The servo band identification information is typically 4 bits, but may be 8 bits (a combination of symbol pairs "A0" and "A1") or a plurality of bits other than 4 bits and 8 bits.

In the present embodiment, the two types of servo bands described above include a first servo band in which first servo band identification information is recorded and a second servo band in which second servo band identification information is recorded. The first servo band identification information is 4-bit information (for example, "1001"), and the second servo band identification information is 4-bit information (for example, "0111") different from the first servo band identification information.

Figure 13:
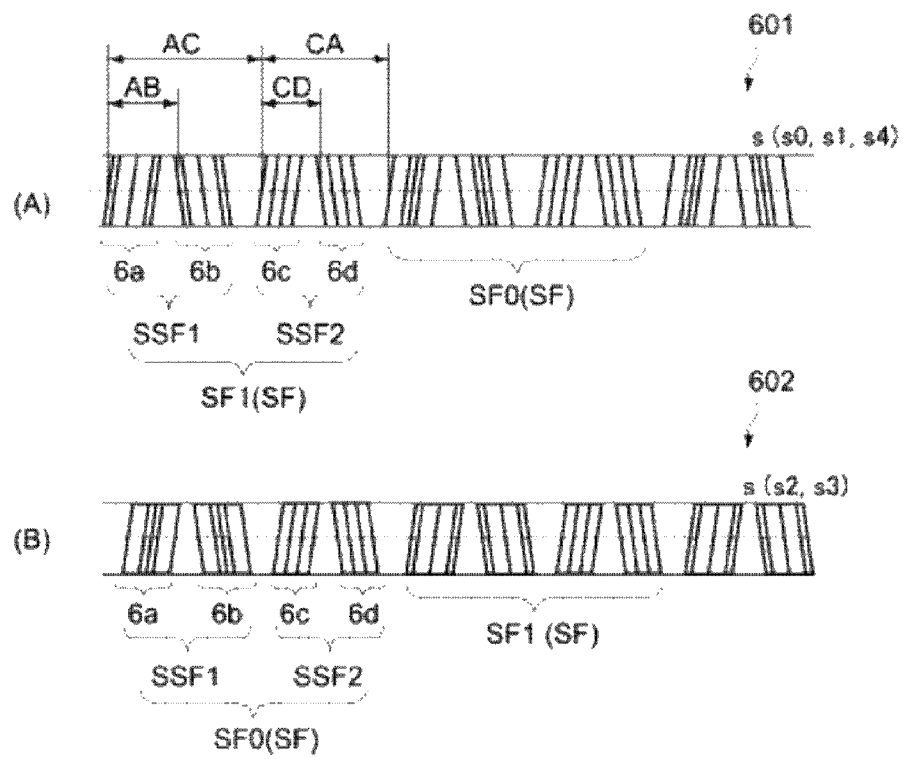
FIG. 13 is a schematic view illustrating a configuration example of a first servo pattern and a second servo pattern.
Figure 14:
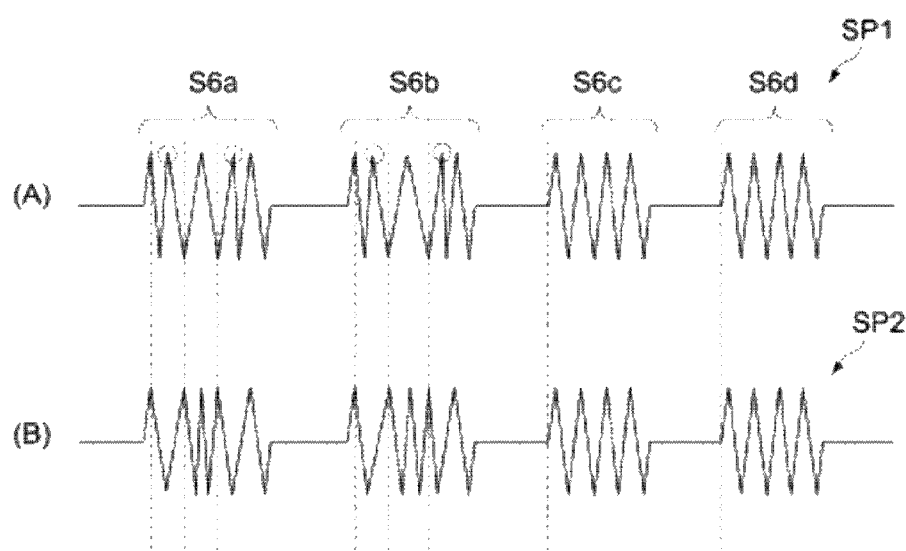
FIG. 14 is a view illustrating reproduction waveforms of the first servo pattern described above and the second servo pattern described above, respectively.

The combination of the signs "0" and "1" constituting the first and second servo band identification information is identified from the reproduction waveform of the servo pattern 6. That is, the reproduction waveform of the servo pattern 6 corresponds to modulated waves of the signs "0" and "1", and the first and second servo band identification information are read by demodulating the reproduction waveform and combining, for example, four bits. Hereinafter, the first and second servo band identification information will be described with reference to FIGS. 13 and 14.

FIGS. 13(A) and 13(B) are schematic views illustrating configuration examples of a servo pattern in which first servo band identification information is embedded (hereinafter, also referred to as a first servo pattern 601) and a servo pattern in which second servo band identification information is embedded (hereinafter, also referred to as a second servo pattern 602), respectively. As illustrated in the same drawing, the first servo pattern 601 and the second servo pattern 602 are both constituted by a combination of two types of servo frames SF including a servo frame SF1 representing one sign (for example, "1") and a servo frame SF0 representing the other sign (for example, "0"). The servo frames SF1 and SF0 are common in that the servo frame SF including the first servo sub-frame SSF1 and the second servo sub-frame SSF2 is used as a constituent unit, but the first servo sub-frames SSF1 (A burst 6a and B burst 6b) are different from each other.

As illustrated in FIG. 13(A), in the servo frame SF1 indicating the sign "1", when five inclined patterns respectively constituting the A burst 6a and the B burst 6b are defined as a first inclined portion, a second inclined portion, a third inclined portion, a fourth inclined portion, and a fifth inclined portion in order from the left side in the drawing, the second inclined portion and the fourth inclined portion are arranged at positions biased toward the first inclined portion and the fifth inclined portion, respectively. On the other hand, as illustrated in FIG. 13(B), in the servo frame SF0 representing the sign "0", the arrangement intervals of some of the inclined patterns constituting the A burst 6a and the B burst 6b are different from those of the servo frame SF1. In the illustrated example, in the five inclined patterns constituting each of the A burst 6a and the B burst 6b, the second inclined portion and the fourth inclined portion are arranged at positions biased toward the third inclined portion, respectively. Therefore, as for the A burst 6a and the B burst 6b in the servo frame SF0, the interval between the second inclined portion and the third inclined portion and the interval between the third inclined portion and the fourth inclined portion are shortest, and the interval between the first inclined portion and the second inclined portion and the interval between the fourth inclined portion and the fifth inclined portion are longest.

FIGS. 14(A) and 14(B) illustrate reproduction waveforms SP1 and SP2 of the first servo pattern 601 and the second servo pattern 602, respectively. The reproduction waveform of each of the servo frames SF1 and SF0 is constituted by a burst signal having a peak at a position corresponding to the inclined portion of each of the burst portions 6a to 6d. As described above, in the servo frame SF0, since configurations of the A burst 6a and the B burst 6b are different from configurations of the A burst 6a and the B burst 6b of the servo frame SF1, the peak positions of the burst signals S6a and S6b are shifted corresponding to the interval between the different inclined portions. Therefore, it is possible to read the information written in the servo frame SF by detecting the portion where a deviation of the peak position occurs, a deviation amount thereof, and a deviation direction. Here, for example, the servo frame SF1 illustrated in FIG. 14(A) represents one bit "1", and the servo frame SF0 illustrated in FIG. 14(B) represents another one bit "0". The first and second servo band identification information can be configured by arbitrarily combining the two servo frames SF1 and SF0, for example, four bits.

Figure 15:
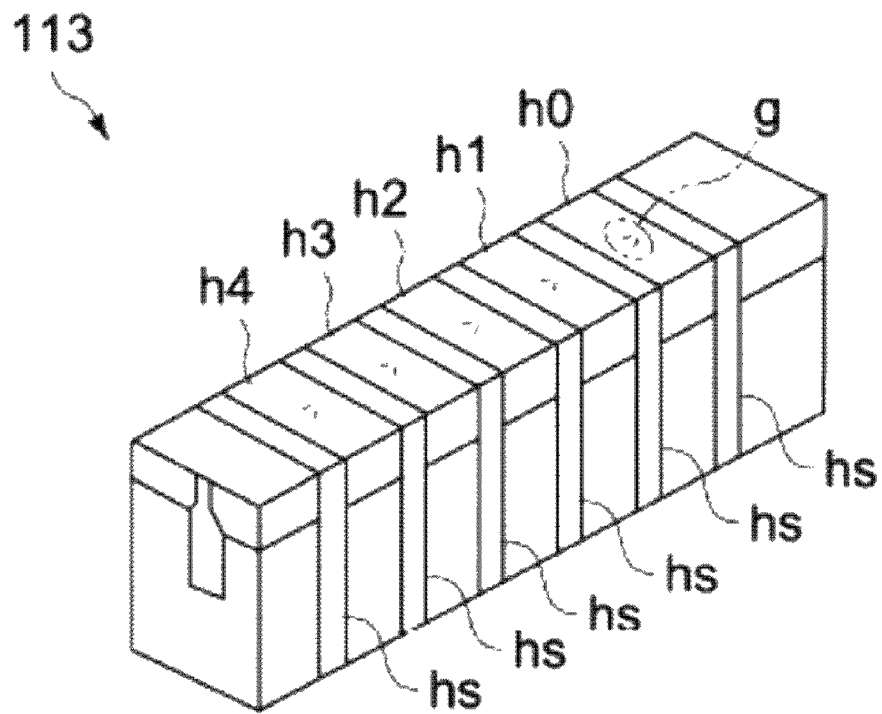
FIG. 15 is a perspective view schematically illustrating a configuration of a servo write head in the servo pattern recording apparatus described above.

As illustrated in FIG. 10, the servo pattern recording apparatus 100 includes the drive unit 120 that drives the servo write head 113. FIG. 15 is a perspective view schematically illustrating a configuration of the servo write head 113, and FIG. 16 is a block diagram illustrating a configuration of the drive unit 120.

As illustrated in FIG. 15, the servo write head 113 includes a plurality of head blocks h0 to h4 for recording the servo pattern 6 on each of the servo bands s0 to s4 of the magnetic tape 1. The head blocks h0 to h4 are bonded to each other via an adhesive layer hs. Each of the head blocks h0 to h4 constitutes a recording unit arranged corresponding to each of the servo bands s0 to s4 of the magnetic tape 1, and has a magnetic gap g for recording the servo pattern in each servo band.

The magnetic gap g is constituted by a pair of straight line portions ("/" and "\") that are inclined in opposite directions. One straight line portion "/" and the other straight line portion "\" record the A burst 6a and the C burst 6c, and the B burst 6b and the D burst 6d, respectively. The magnetic gaps g of head blocks h1 to h5 are arranged so as to be aligned on an axis parallel to the longitudinal direction of the servo write head 113. The head blocks h0 to h4 are magnetically separated from each other, and are configured to be able to simultaneously record different types of servo patterns 6 in two or more servo bands.

Figure 16:
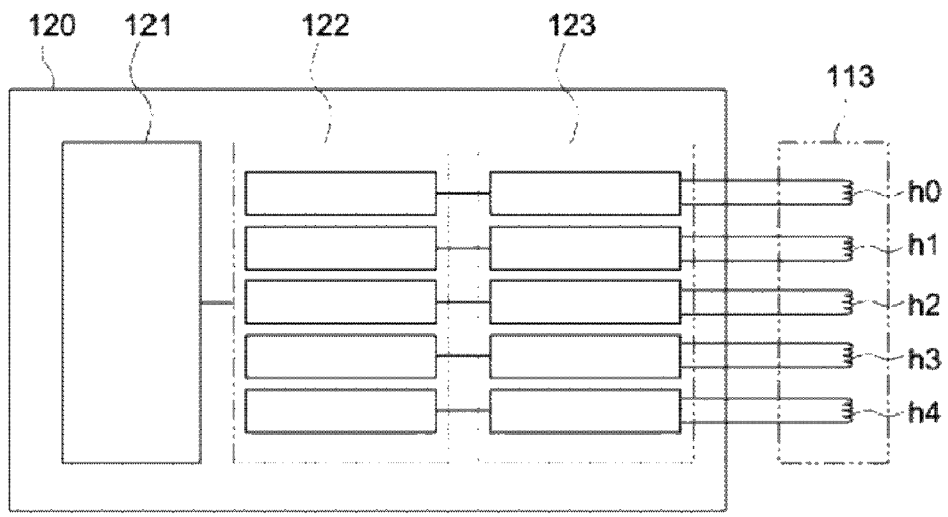
FIG. 16 is a block diagram illustrating a configuration of a drive unit in the servo pattern recording apparatus described above.

As illustrated in FIG. 16, a converter 121 that converts servo single into pulse information on the basis of an output from the drive unit 130 (see FIG. 9), a signal generation unit 122 that generates a pulse signal on the basis of an output of the converter 121, and an amplifier 123 that amplifies the generated pulse signal are included. A plurality of signal generation units 122 and a plurality of amplifiers 123 are provided corresponding to the head blocks h0 to h4, respectively, and are configured to be able to output unique pulse signals to the head blocks h0 to h4 of the servo write heads 113.

The controller 130 includes a memory that stores data regarding the positions of the servo bands (in this example, s0, s1, and s4) in which the first servo band identification information is to be recorded and the positions of the servo bands (in this example, s2 and s3) in which the second servo band identification information is to be recorded. The controller 130 controls the drive unit 120 on the basis of the data stored in the memory.

The converter 121 individually outputs pieces of information corresponding to the servo band identification information to be recorded in the respective servo bands s0 to s4 to the signal generation units 122 corresponding to the respective head blocks h0 to h4. In the present embodiment, a first pulse signal PS1 for recording the first servo pattern 601 (FIG. 13(A)) including the first servo band identification information is output to the head blocks h0, h1, and h4 corresponding to the servo bands s0, s1, and s4, respectively, and a second pulse signal PS2 for recording the second servo pattern 602 (FIG. 13(B)) including the second servo band identification information is output to the head blocks h2 and h3 corresponding to the servo bands s2 and s3, respectively.

Figure 17:
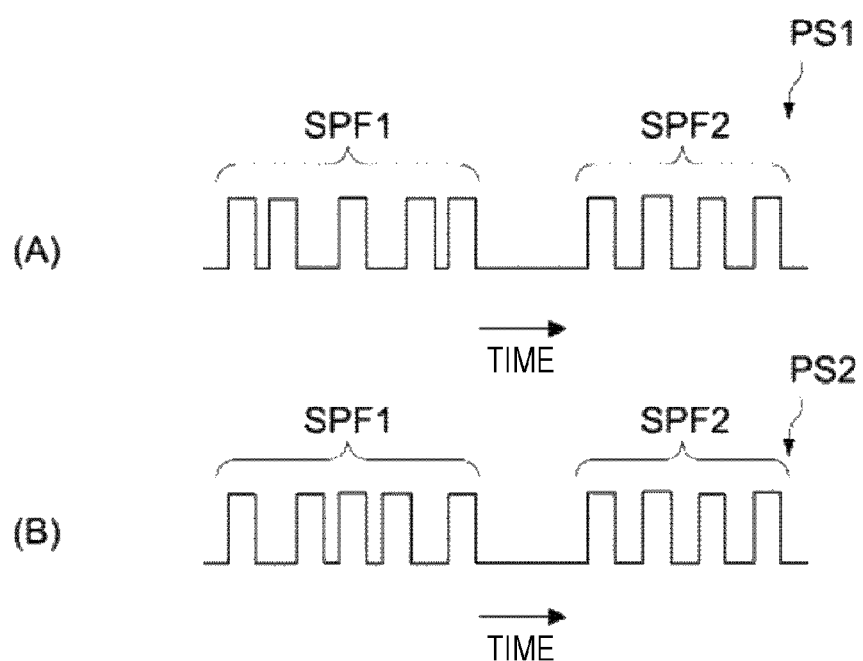
FIG. 17 is a view schematically illustrating recording signal waveforms of a first servo sub-frames in a first pulse signal and a second pulse, respectively.

FIGS. 17(A) and 17(B) schematically illustrate the recording signal waveforms of the first servo sub-frames SSF1 in the first pulse signal PS1 and the second pulse signal PS2, respectively. As illustrated in the drawings, the first and second pulse signals PS1 and PS2 include a first pulse group SPF1 including five pulse groups and a second pulse group SPF2 including four pulse groups. The first pulse group SPF1 is a signal for recording each inclined portion of the A6 burst 6a, and the second pulse group SPF2 is a signal for recording each inclined portion of the B burst 6b.

As illustrated in the same figures, second and fourth pulse rise times in the first pulse group SPF1 are different between the first pulse signal PS1 and the second pulse signal PS2, and second pulse rise time of the pulse signal PS2 is later than that of the pulse signal PS1, and is earlier than that of the fourth pulse rise time. Therefore, the first servo sub-frame SSF1 in which the arrangement intervals of the inclined portions of the A6 burst 6a are partially different from each other as illustrated in FIGS. 13(A) and 13(B) is formed.

Moreover, the first pulse signal PS1 and the second pulse signal PS2 are transmitted to the head blocks h0 to h4 at the same phase (the same timing). Therefore, in each of the head blocks h0 to h4, the first servo pattern 601 (first servo band identification information) is recorded in the servo bands s0, s1, and s4, and the second servo pattern 602 (second servo band identification information) is recorded in the servo bands s2 and s3, in the same phase.

[About Fluctuation in Tape Width]

Incidentally, the magnetic tape 1 is generally manufactured through application of a magnetic material to a base film (base layer 41), calender treatment, cutting processing, and recording processing of the servo pattern 6, and the like. Since these processing are performed while winding the base film with a constant tension, the completed magnetic tape 1 has internal strain, and the internal strain tends to be relaxed with the lapse of time, so that the width of the magnetic tape 1 tends to increase. Furthermore, in a storage environment and a use environment at a high temperature of 60° C. or more, a creep phenomenon occurs due to tension being applied and elongation in the longitudinal direction occurs, and different phenomena such as strain relaxation and elongation due to creep occur. Therefore, in the tape width, strain relaxation and a creep phenomenon in the width direction due to a winding pressure are likely to overlap and spread at a position where the tension is not applied on the inner side of winding. On the outer side of winding, a phenomenon of contraction in the width direction by the creep phenomenon due to the tension applied in the longitudinal direction and an opposite phenomenon of strain relaxation overlap, and whether the width expands or contracts is determined depending on the situation of the magnetic tape. In particular, in a magnetic tape in recent years in which a high capacity is required, the total thickness of the tape is thin due to thinning of the thickness of the base film and the coating thickness, and the number of times of winding of the magnetic tape around the reel is increased. Therefore, the surface pressure due to tight winding on the inner side of winding increases, and the fluctuation in the width dimension of the magnetic tape increases. Since the track width is narrowed due to the increase in capacity, the influence of fluctuation in the width direction is more and more increased.

Therefore, when the recording and reproducing apparatus records or reproduces data, even if the magnetic tape is caused to run with the same tension as that at the time of recording the servo pattern, the width dimension of the magnetic tape may be larger than the width dimension of the magnetic tape at the time of recording the servo pattern. In this case, since the interval between the adjacent servo bands changes, the interval between the servo patterns recorded in these servo bands also fluctuates, and as a result, desired tracking control becomes difficult. Such a problem can significantly occur due to thinning of the magnetic tape due to high recording capacity in recent years.

(3) Configuration of Modified Example of Magnetic Recording Cartridge

[Magnetic Recording Cartridge]

In one embodiment of the magnetic recording cartridge described above, a case where the magnetic recording cartridge is a one-reel type cartridge has been described, but the magnetic recording cartridge of the present technology may be a two-reel type cartridge. That is, the magnetic recording cartridge of the present technology may have one or a plurality of (for example, two) reels around which the magnetic tape is wound. Hereinafter, a modified example of the magnetic recording cartridge of the present technology having two reels will be described with reference to FIG. 18.

Figure 18:
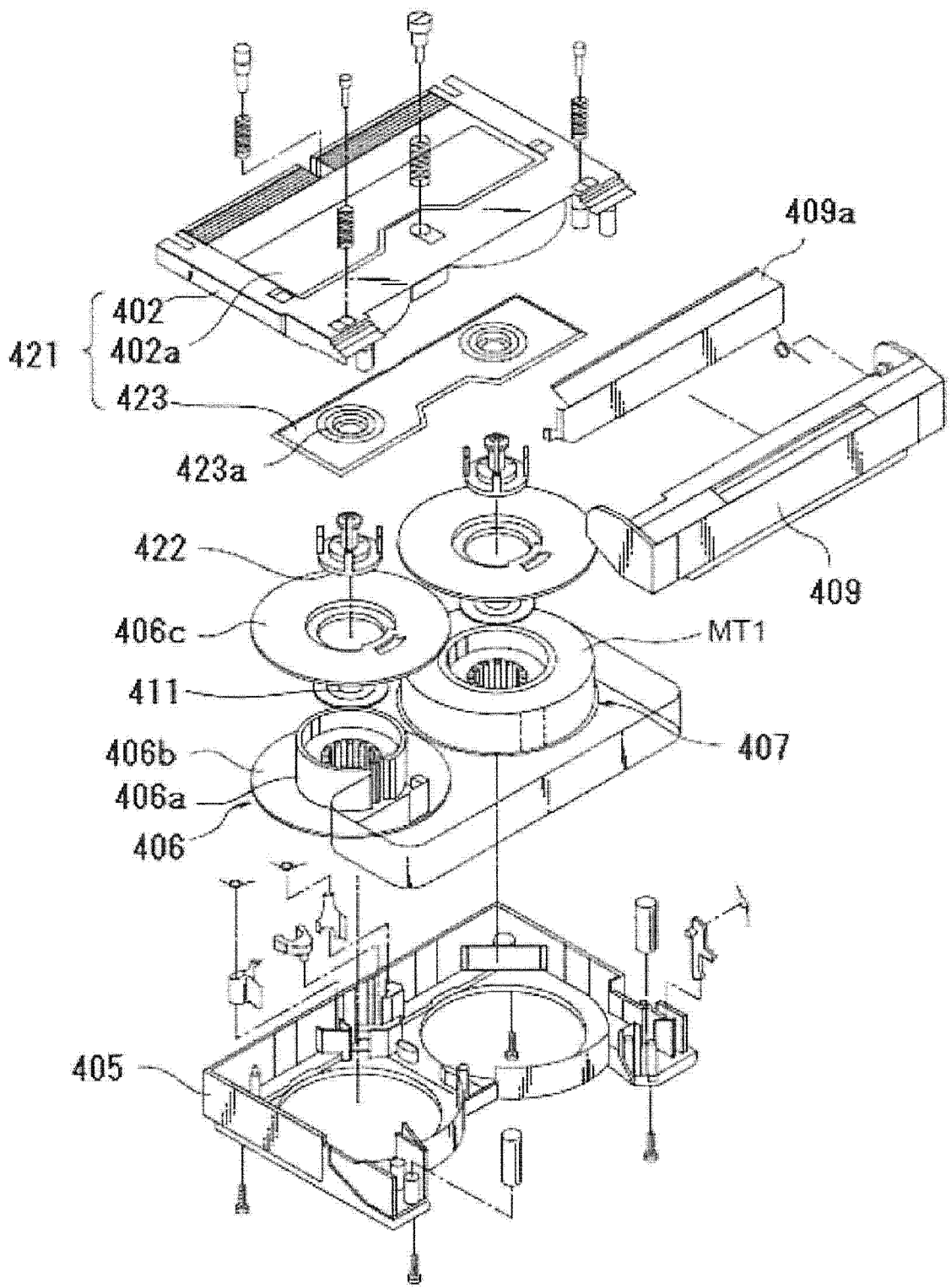
FIG. 18 is an exploded perspective view illustrating a modified example of a magnetic recording cartridge according to an embodiment of the present technology.

FIG. 18 is an exploded perspective view illustrating an example of a configuration of a two-reel type cartridge 421. The cartridge 421 includes an upper half 402 including a synthetic resin, a transparent window member 423 fitted and fixed to a window portion 402a opened in an upper surface of the upper half 402, a reel holder 422 fixed to an inner side of the upper half 402 and preventing uplift of reels 406 and 407, a lower half 405 corresponding to the upper half 402, the reels 406 and 407 stored in a space formed by combining the upper half 402 and the lower half 405, a magnetic tape MT1 wound around the reels 406 and 407, a front lid 409 closing a front side opening formed by combining the upper half 402 and the lower half 405, and a back lid 409a protecting the magnetic tape MT1 exposed at the front side opening.

The reel 406 includes a lower flange 406b having a cylindrical hub portion 406a around which the magnetic tape MT1 is wound in a central portion, an upper flange 406c having substantially the same size as the lower flange 406b, and a reel plate 411 interposed between the hub portion 406a and the upper flange 406c. The reel 407 has a configuration similar to that of the reel 406.

The window member 423 is provided with attachment holes 423a at positions corresponding to the reels 406 and 407, respectively, for assembling the reel holder 422 as a reel holding unit for preventing the reels from being lifted up. The magnetic tape MT1 is similar to the magnetic tape T in the first embodiment.

(4) Description of Each Layer of Magnetic Recording Medium

Next, a configuration of a magnetic recording medium 1 will be described with reference to FIG. 2 described above. The magnetic recording medium 1 is, for example, a magnetic recording medium subjected to vertical orientation processing, and includes an elongated base layer (also referred to as a substrate) 41, an underlayer (non-magnetic layer) 42 provided on one principal plane of the base layer 41, a magnetic layer (also referred to as a recording layer) 43 provided on the underlayer 42, and a back layer 44 provided on the other principal plane of the base layer 41 as illustrated in FIG. 2. Hereinafter, among the both principal planes of the magnetic recording medium 1, the plane on which the magnetic layer 43 is provided will be referred to as a magnetic surface, and a plane opposite to the magnetic surface (the plane on which the back layer 44 is provided) will be referred to as a back surface.

The magnetic recording medium 1 has an elongated shape and runs in a longitudinal direction during recording and reproducing. Furthermore, the magnetic recording medium 1 may be configured to be able to record a signal at the shortest recording wavelength of preferably 100 nm or less, more preferably 75 nm or less, still more preferably 60 nm or less, and particularly preferably 50 nm or less, and may be used for, for example, a recording and reproducing apparatus whose shortest recording wavelength is in the range described above. The recording and reproducing apparatus may include a ring type head as a recording head. A recording track width is, for example, 2 μm or less.

[Base Layer]

The base layer 41 can function as a support of the magnetic recording medium 1, and is, for example, an elongated flexible non-magnetic substrate, and particularly, can be a non-magnetic film. The thickness of the base layer 41 can be, for example, 2.0 μm or more and 5.0 μm or less, preferably 2.2 μm or more and 4.6 μm or less, more preferably 2.5 μm or more and 4.2 μm or less, and still more preferably 2.6 μm or more and 3.8 μm or less. The base layer 41 can contain, for example, at least one of a polyester-based resin, a polyolefin-based resin, a cellulose derivative, a vinyl-based resin, an aromatic polyetherketone resin, or other polymer resins. In a case where the base layer 11 contains two or more of the materials described above, the two or more materials may be mixed, copolymerized, or laminated.

An average thickness of the base layer 41 is obtained as follows. First, the magnetic tape 1 accommodated in the magnetic recording cartridge 10 is unwound, and the magnetic tape 1 is cut out to a length of 250 mm from each of three positions apart from 10 m to 20 m, 30 m to 40 m, and 50 m to 60 m from the connection portion between the magnetic tape 1 and the reader tape LT, thereby preparing samples. In the present specification, the "longitudinal direction" in the case of "longitudinal direction from the connection portion between the magnetic tape 1 and the reader tape LT" means a direction from one end on the reader tape LT side toward the other end on the opposite side.

Subsequently, layers other than the base layer 41 of each sample (that is, the non-magnetic layer (underlayer) 42, the magnetic layer 43, and the back layer 44) are removed with acetone, ethanol, or the like. Next, a thickness of the sample (base layer 41) is measured at five positions using a laser holo gauge (LGH-110C) manufactured by Mitutoyo Corporation as a measuring device, and these measured values (fifteen points in total) are simply averaged (arithmetically averaged) to calculate the average thickness of the base layer 41. Note that the five measurement positions described above are randomly selected from each sample so as to be different positions in the longitudinal direction of the magnetic tape 1.

As the polyester-based resin, for example, one or a mixture of two or more of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylenebisphenoxycarboxylate may be used. According to a preferred embodiment of the present technology, the base layer 41 may include PET or PEN.

The polyolefin-based resin may be, for example, one or a mixture of two or more of polyethylene (PE) and polypropylene (PP).

The cellulose derivative may be, for example, one or a mixture of two or more of cellulose diacetate, cellulose triacetate, cellulose acetate butyrate (CAB), and cellulose acetate propionate (CAP).

The vinyl-based resin may be, for example, one or a mixture of two or more of polyvinyl chloride (PVC) and polyvinylidene chloride (PVDC).

The aromatic polyether ketone resin may be, for example, one or a mixture of two or more of polyether ketone (PEK), polyether ether ketone (PEEK), polyether ketone ketone (PEKK), and polyether ether ketone ketone (PEEKK). According to a preferred embodiment of the present technology, the base layer 41 may include PEEK.

Examples of the other polymer resins may be, for example, one or a mixture of two or more of polyamide (PA, nylon), aromatic PA (aromatic polyamide, aramid), polyimide (PI), aromatic PI, polyamide imide (PAI), aromatic PAI, polybenzoxazole (PBO) (for example, Zylon (registered trademark)), polyether, polyether ester, polyether sulfone (PES), polyether imide (PEI), polysulfone (PSF), polyphenylene sulfide (PPS), polycarbonate (PC), polyarylate (PAR), and polyurethane (PU).

[Magnetic Layer]

The magnetic layer 43 can be, for example, a perpendicular recording layer. The magnetic layer 43 can contain magnetic powder. The magnetic layer 43 can further contain, for example, a binder and conductive particles in addition to the magnetic powder. The magnetic layer 43 can further contain, for example, additives such as a lubricant, an abrasive, a corrosion inhibitor, and the like, as needed.

An average thickness $t_m$ of the magnetic layer 43 can be preferably 35 nm$\leq t_m \leq$120 nm, more preferably 35 nm$\leq t_m \leq$100 nm, and particularly preferably 35 nm$\leq t_m \leq$90 nm. The average thickness $t_m$ of the magnetic layer 43 within the numerical range described above contributes to improvement of electromagnetic conversion characteristics.

The average thickness $t_m$ of the magnetic layer 43 is determined as follows. First, the magnetic tape 1 accommodated in the magnetic recording cartridge 10 is unwound, and the magnetic tape 1 is cut out to a length of 250 mm from each of three positions apart from 10 m to 20 m, 30 m to 40 m, and 50 m to 60 m from the connection portion between the magnetic tape 1 and the reader tape LT, thereby preparing samples. Subsequently, each sample is processed by a FIB method or the like to perform thinning. In a case where the FIB method is used, a carbon layer and a tungsten layer are formed as protective films as a pre-treatment for observing a TEM image of a cross section described later. The carbon layer is formed on a surface of the magnetic layer 43 and a surface of the back layer 44 of the magnetic tape 1 by a vapor deposition method, and then the tungsten layer is further formed on the surface of the magnetic layer 43 by a vapor deposition method or a sputtering method. The thinning is performed in the longitudinal direction of the magnetic tape 1. That is, a cross section parallel to both the longitudinal direction and the thickness direction of the magnetic tape 1 is formed by the thinning.

The obtained cross section described above of each thinned sample is observed with a transmission electron microscope (TEM) under the following conditions to obtain a TEM image of each thinned sample. Note that the magnification and the acceleration voltage may be appropriately adjusted according to the type of the apparatus.

Device: TEM (H9000NAR manufactured by Hitachi, Ltd.)
Acceleration voltage: 300 kV
Magnification: 100,000 times Next, the thickness of the magnetic layer 43 is measured at five positions of each resulting thinned sample using the obtained TEM image of each thinned sample. Note that the five measurement positions of each thinned sample are randomly selected from the sample so as to be different positions in the longitudinal direction of the magnetic tape 1. An average value obtained by simply averaging (arithmetically averaging) the obtained measured values (the thicknesses of the magnetic layers 43 at fifteen points in total) of each thinned sample is defined as an average thickness tm [nm] of the magnetic layer 43.

The magnetic layer 43 is preferably a vertically oriented magnetic layer. In the present specification, vertical orientation refers to that a squareness ratio S1 measured in the longitudinal direction (running direction) of the magnetic recording medium 1 is 35% or less.

Note that the magnetic layer 43 may be a magnetic layer which is in-plane oriented (longitudinal orientation). That is, the magnetic recording medium 1 may be a horizontal recording type magnetic recording medium. However, vertical orientation is more preferable in terms of a higher recording density.

[Magnetic Powder]

Examples of magnetic particles forming the magnetic powder contained in the magnetic layer 43 can include epsilon type iron oxide (ε-iron oxide), gamma hematite, magnetite, chromium dioxide, cobalt-coated iron oxide, hexagonal ferrite, barium ferrite (BaFe), Co ferrite, strontium ferrite, a metal, and the like, but are not limited thereto. The magnetic powder may be one or a combination or two or more thereof. Particularly preferably, the magnetic powder can include ε-iron oxide magnetic powder, barium ferrite magnetic powder, cobalt ferrite magnetic powder, or strontium ferrite magnetic powder. Note that ε-iron oxide may contain Ga and/or Al. These magnetic particles may be appropriately selected by those skilled in the art on the basis of factors such as, for example, the method of manufacturing the magnetic layer 43, specifications of the tape, a function of the tape, and the like.

An average particle size (average maximum particle size) D of the magnetic powder can be preferably 22 nm or less, more preferably 8 nm or more and 22 nm or less, and still more preferably 10 nm or more and 20 nm or less.

The average particle size D of the magnetic powder described above is obtained as follows. First, the magnetic recording medium 1 to be measured is processed by a focused ion beam (FIB) method or the like to prepare a thin piece, and a cross-section of the thin piece is observed by a transmission electron microscope (TEM). Next, 500 ε-iron oxide particles are randomly selected from the imaged TEM photo, a maximum particle size $d_{max}$ of each particle is measured, and a particle size distribution of the maximum particle size $d_{max}$ of the magnetic powder is obtained. Here, the "maximum particle size $d_{max}$" means a so-called maximum Feret diameter, and specifically, refers to a maximum distance among distances between two parallel lines drawn from all angles so as to be in contact with outline of the ε-iron oxide particle. Thereafter, a median diameter (50% diameter, D50) of the maximum particle size $d_{max}$ is obtained from the particle size distribution of the obtained maximum particle size $d_{max}$, and is determined as an average particle size (average maximum particle size) D of the magnetic powder.

A shape of the magnetic particles depends on a crystal structure of the magnetic particles. For example, BaFe and strontium ferrite can have a hexagonal plate shape. The ε-iron oxide can have a spherical shape. The cobalt ferrite can have a cubic shape. The metal can have a spindle shape. These magnetic particles are oriented in a manufacturing process of the magnetic recording medium 1.

According to a preferred embodiment of the present technology, the magnetic powder can include powder of nanoparticles preferably containing ε-iron oxide (hereinafter, referred to as "ε-iron oxide particles"). The ε-iron oxide particles can obtain high coercive force even when the ε-iron oxide particles are fine particles. It is preferable that ε-iron oxide contained in the ε-iron oxide particles is preferentially crystal-oriented in a thickness direction (vertical direction) of the magnetic recording medium 1.

ε-iron oxide particle has a spherical shape or a substantially spherical shape, or has a cubic shape or a substantially cubic shape. Since the ε-iron oxide particles have the shape as described above, in a case where ε-iron oxide particles are used as the magnetic particles, a contact area between the particles in the thickness direction of the medium can be reduced and aggregation of the particles can be suppressed as compared with a case where barium ferrite particles having a hexagonal plate shape are used as magnetic particles. Therefore, dispersibility of the magnetic powder may be enhanced and a more excellent signal-to-noise ratio (SNR) may be obtained.

Figure 21:
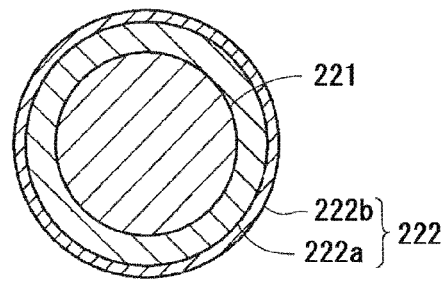
FIG. 21 is a cross-sectional view illustrating a configuration of a magnetic particle.

The ε-iron oxide particle has a core-shell structure. Specifically, as illustrated in FIG. 21, the ε-iron oxide particle is provided with a core 221 and a shell 222 having a two-layer structure provided around the core 221. The shell 222 having the two-layer structure is provided with a first shell 222a provided on the core 221 and a second shell 222b provided on the first shell 222a.

The core 221 includes ε-iron oxide. ε-iron oxide included in the core 221 preferably includes a ε-Fe$_2$O$_3$ crystal as a main phase, and more preferably includes a single-phase ε-Fe$_2$O$_3$.

The first shell 222a covers at least a part of a periphery of the core 221. Specifically, the first shell 222a may partially cover the periphery of the core 221 or may cover an entire periphery of the core 221. From a viewpoint of making exchange coupling between the core 221 and the first shell 222a sufficient and improve a magnetic characteristic, the entire surface of the core 221 is preferably covered.

The first shell 222a is a so-called soft magnetic layer, and can include, for example, a soft magnetic material such as α-Fe, a Ni—Fe alloy, or a Fe—Si—Al alloy. α-Fe may also be obtained by reducing ε-iron oxide included in the core 221.

The second shell 222b is an oxide coating as an oxidation resistant layer. The second shell 222b can include α-iron oxide, aluminum oxide, or silicon oxide. α-iron oxide can include at least one iron oxide among Fe$_3$O$_4$, Fe$_2$O$_3$, or FeO, for example. In a case where the first shell 222a includes α-Fe (soft magnetic material), α-iron oxide may be obtained by oxidizing α-Fe included in the first shell 222a.

Since the ε-iron oxide particle has the first shell 222a as described above, thermal stability can be secured, whereby the coercive force Hc of the core 221 alone can be maintained at a large value and/or the coercive force Hc as whole ε-iron oxide particles (core-shell particles) can be adjusted to the coercive force Hc suitable for recording. Furthermore, since the ε-iron oxide particle has the second shell 222b as described above, it is possible to suppress a decrease in characteristic of the ε-iron oxide particle due to exposure of the ε-iron oxide particle to the air and occurrence of rust and the like on a particle surface at a manufacturing step of the magnetic recording medium 1 and before the step. Therefore, deterioration in characteristic of the magnetic recording medium 1 may be suppressed.

Figure 22:
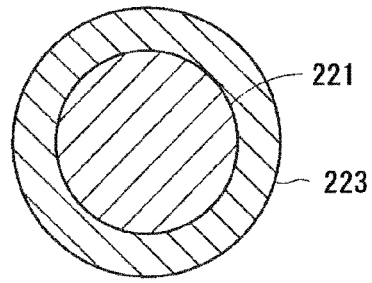
FIG. 22 is a cross-sectional view illustrating a configuration of a magnetic particle in a modified example.

As illustrated in FIG. 22, the ε-iron oxide particle may have a shell 223 having a single-layer structure. In this case, the shell 223 has the configuration similar to that of the first shell 222a. However, from a viewpoint of suppressing deterioration in characteristic of the ε-iron oxide particle, it is more preferable that the ε-iron oxide particle has the shell 222 having the two-layer structure.

The ε-iron oxide particle may contain an additive instead of the core-shell structure, or may have the core-shell structure and may contain an additive as well. In these cases, a part of Fe of the ε-iron oxide particle is substituted with the additive. The coercive force Hc of all the ε-iron oxide particles can be adjusted to the coercive force Hc suitable for recording also when the ε-iron oxide particle includes the additive, such that recordability can be improved. The additive is a metal element other than iron, preferably a trivalent metal element, and more preferably one or more selected from the group consisting of aluminum (Al), gallium (Ga), and indium (In).

Specifically, the ε-iron oxide containing an additive is an ε-Fe$_{2-x}$M$_x$O$_3$ crystal (here, M is a metal element other than iron, preferably a trivalent metal element, and more preferably at least one or more selected from the group consisting of Al, Ga, and In, and x is, for example, 0<x<1.).

According to another preferred embodiment of the present technology, the magnetic powder may be a barium ferrite (BaFe) magnetic powder. The barium ferrite magnetic powder contains iron oxide magnetic particles having barium ferrite as a main phase (hereinafter, referred to as "barium ferrite particles"). The barium ferrite magnetic powder has high reliability of data recording, for example, the coercive force is not decreased even in a high-temperature and high-humidity environment, and the like. From such a viewpoint, the barium ferrite magnetic powder is preferable as the magnetic powder.

An average particle size of the barium ferrite magnetic powder is 50 nm or less, more preferably 10 nm or more and 40 nm or less, and still more preferably 12 nm or more and 25 nm or less.

In a case where the magnetic layer 43 contains barium ferrite magnetic powder as the magnetic powder, the average thickness $t_m$ [nm] of the magnetic layer 43 is preferably 35 nm≤$t_m$≤100 nm. Furthermore, the coercive force Hc measured in the thickness direction (vertical direction) of the magnetic recording medium 1 is preferably 160 kA/m or more and 280 kA/m or less, more preferably 165 kA/m or more and 275 kA/m or less, and still more preferably 170 kA/m or more and 270 kA/m or less.

According to still another preferred embodiment of the present technology, the magnetic powder can be cobalt ferrite magnetic powder. The cobalt ferrite magnetic powder contains iron oxide magnetic particles having cobalt ferrite as a main phase (hereinafter, referred to as "cobalt ferrite magnetic particles"). The cobalt ferrite magnetic particle preferably has uniaxial anisotropy. The cobalt ferrite magnetic particle has, for example, a cubic shape or a substantially cubic shape. The cobalt ferrite is cobalt ferrite containing Co. The cobalt ferrite may further contain one or more selected from the group consisting of Ni, Mn, Al, Cu, and Zn in addition to Co.

The cobalt ferrite has, for example, an average composition represented by the following Formula (1).

$$Co_xM_yFe_2O_z \qquad (1)$$

(Here, in Formula (1), M is, for example, one or more metals selected from the group consisting of Ni, Mn, Al, Cu, and Zn, x is a value within a range of $0.4 \leq x \leq 1.0$, y is a value within a range of $0 \leq y \leq 0.3$, x and y satisfy a relationship of $(x+y) \leq 1.0$, z is a value within a range of $3 \leq z \leq 4$, and a part of Fe may be substituted with another metal element.)

An average particle size of the cobalt ferrite magnetic powder is preferably 25 nm or less and more preferably 23 nm or less. A coercive force Hc of the cobalt ferrite magnetic powder is preferably 2,500 Oe or more and more preferably 2,600 Oe or more and 3,500 Oe or less.

According to still another embodiment of the present technology, the magnetic powder can include powder of nanoparticles containing hexagonal ferrite (hereinafter, referred to as "hexagonal ferrite particles"). The hexagonal ferrite particle has, for example, a hexagonal plate shape or a substantially hexagonal plate shape. The hexagonal ferrite can preferably contain at least one of Ba, Sr, Pb, or Ca, and more preferably at least one of Ba or Sr. Specifically, the hexagonal ferrite may be, for example, barium ferrite or strontium ferrite. The barium ferrite may further contain at least one of Sr, Pb, or Ca in addition to Ba. The strontium ferrite may further contain at least one of Ba, Pb, or Ca in addition to Sr.

More specifically, the hexagonal ferrite can have an average composition represented by a general formula $MFe_{12}O_{19}$. Here, M is, for example, at least one metal of Ba, Sr, Pb, and Ca, and preferably at least one metal of Ba and Sr. M may be a combination of Ba and one or more metals selected from the group consisting of Sr, Pb, and Ca. Furthermore, M may be a combination of Sr and one or more metals selected from the group consisting of Ba, Pb, and Ca. In the general formula described above, a part of Fe may be substituted by another metal element.

In a case where the magnetic powder includes powder of hexagonal ferrite particles, an average particle size of the magnetic powder is preferably 50 nm or less, more preferably 10 nm or more and 40 nm or less, and still more preferably 15 nm or more and 30 nm or less.

[Binder]

As the binder, a resin having a structure in which a crosslinking reaction is imparted to a polyurethane-based resin, a vinyl chloride-based resin, or the like is preferable. However, the binder is not limited thereto, and other resins may be appropriately blended according to a physical property and the like required for the magnetic recording medium 1. The resin to be blended is not particularly limited as long as it is usually used in a coating type magnetic recording medium.

Examples of the binder include polyvinyl chloride, polyvinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivative (cellulose acetate butyrate, cellulose diacetate, cellulose triacetate, cellulose propionate, nitrocellulose), styrene-butadiene copolymer, polyester resin, amino resin, synthetic rubber and the like.

Furthermore, as the binder, a thermosetting resin or a reactive resin may be used, and examples thereof include a phenol resin, an epoxy resin, a urea resin, a melamine resin, an alkyd resin, a silicone resin, a polyamine resin, an urea-formaldehyde resin, and the like.

Furthermore, a polar functional group such as $-SO_3M$, $-OSO_3M$, $-COOM$, $P=O(OM)_2$, or the like may be introduced into each binder described above in order to improve dispersibility of the magnetic powder. Here, in the formula, M is a hydrogen atom or an alkali metal such as lithium, potassium, sodium, or the like.

Moreover, examples of the polar functional group include a side chain type having an end group of $-NR1R2$ and $-NR1R2R3^+X^-$, a main chain type of $>NR1R2^+X^-$, and the like. Here, in the formulas, each of R1, R2 and R3 is a hydrogen atom or a hydrocarbon group, and $X^-$ is a halogen element ion such as fluorine, chlorine, bromine, iodine, or the like, or an inorganic or organic ion. Furthermore, examples of the polar functional group include OH, —SH, —CN, an epoxy group, and the like.

[Additive]

The magnetic layer 43 may further contain aluminum oxide ($\alpha$, $\beta$, or $\gamma$ alumina), chromium oxide, silicon oxide, diamond, garnet, emery, boron nitride, titanium carbide, silicon carbide, titanium carbide, titanium oxide (rutile type or anatase type titanium oxide), or the like, as non-magnetic reinforcing particles.

[Non-Magnetic Layer (Underlayer)]

The non-magnetic layer (underlayer) 42 is a non-magnetic layer containing non-magnetic powder and a binder as main components. The description regarding the binder contained in the magnetic layer 43 is also applied to the binder contained in the non-magnetic layer (underlayer) 42. The non-magnetic layer (underlayer) 42 may further contain at least one additive of conductive particles, a lubricant, a curing agent, a corrosion inhibitor, and the like, as needed.

The average thickness of the non-magnetic layer (underlayer) 42 is preferably 0.6 μm or larger and 2.0 μm or less, and more preferably 0.8 μm or larger and 1.4 μm or less. The average thickness of the non-magnetic layer (underlayer) 42 may be obtained as follows. First, the magnetic tape 1 accommodated in the magnetic recording cartridge 10 is unwound, and the magnetic tape 1 is cut out to a length of 250 mm from each of three positions apart from 10 m to 20 m, 30 m to 40 m, and 50 m to 60 m from the connection portion between the magnetic tape 1 and the reader tape LT, thereby preparing samples. Subsequently, each sample is processed by a FIB method or the like to perform thinning. In a case where the FIB method is used, a carbon layer and a tungsten layer are formed as protective films as a pretreatment for observing a TEM image of a cross section described later. The carbon layer is formed on a surface of the magnetic layer 43 and a surface of the back layer 44 of the magnetic tape 1 by a vapor deposition method, and then the tungsten layer is further formed on the surface of the magnetic layer 43 by a vapor deposition method or a sputtering method. The thinning is performed in the longitudinal direction of the magnetic tape 1. That is, a cross section parallel to both the longitudinal direction and the thickness direction of the magnetic tape 1 is formed by the thinning.

The obtained cross section described above of each thinned sample is observed with a transmission electron microscope (TEM) under the following conditions.

Device: TEM (H9000NAR manufactured by Hitachi, Ltd.)

Acceleration voltage: 300 kV

Magnification: 100,000 times

Next, the thickness of the non-magnetic layer 42 is measured at fifteen or more positions in the longitudinal direction of the magnetic tape 1 using the obtained TEM image, and then these measured values are simply averaged (arithmetically averaged) to obtain the average thickness (μm) of the non-magnetic layer (underlayer) 42.

[Non-Magnetic Powder]

The non-magnetic powder contained in the underlayer 42 can contain, for example, at least one selected from inorganic particles and organic particles. One kind of non-magnetic powder may be used alone, or two or more kinds of non-magnetic powders may be used in combination. The inorganic particles include, for example, one or a combination of two or more selected from a metal, metal oxide, metal carbonate, metal sulfate, metal nitride, metal carbide, and metal sulfide. More specifically, the inorganic particles can be, for example, one or two or more selected from iron oxyhydroxide, hematite, titanium oxide, and carbon black. Examples of a shape of the non-magnetic powder include various shapes such as a needle shape, a sphere shape, a cubic shape, a plate shape, and the like, but are not particularly limited thereto.

[Back Layer]

The back layer 44 can contain a binder and non-magnetic powder. The back layer 44 may contain various additives such as a lubricant, a curing agent, an antistatic agent, and the like, as needed. The descriptions of the binder and the non-magnetic powder contained in the non-magnetic layer (underlayer) 42 described above are also applied to the binder and the non-magnetic powder contained in the back layer 44.

An average particle size of the inorganic particles contained in the back layer 44 is preferably 10 nm or more and 150 nm or less and more preferably 15 nm or more and 110 nm or less. The average particle size of the inorganic particles is determined in a manner similar to that of the average particle size D of the magnetic powder described above.

An average thickness $t_b$ of the back layer 44 is preferably $t_b \leq 0.6$ μm. When the average thickness $t_b$ of the back layer 44 is within the range described above, even in a case where the average thickness $t_T$ of the magnetic recording medium 1 is $t_T \leq 5.5$ μm, the thicknesses of the non-magnetic layer (underlayer) 42 and the base layer 41 can be kept thick, and therefore, running stability of the magnetic recording medium 1 in the recording and reproducing apparatus can be maintained.

The average thickness $t_b$ of the back layer 44 is determined as follows.

The magnetic tape 1 accommodated in the magnetic recording cartridge 10 is unwound, and the magnetic tape 1 is cut out to a length of 250 mm from each of three positions apart from 10 m to 20 m, 30 m to 40 m, and 50 m to 60 m from the connection portion between the magnetic tape 1 and the reader tape LT, thereby preparing samples. First, the average thickness (average total thickness) $t_T$ of the magnetic tape 1 is measured by a measurement method as described in the following "average thickness of magnetic recording medium". After the measurement of the average thickness $t_T$ (average total thickness), the back layer 44 of each sample of which the average thickness has been measured is removed with a solvent such as MEK (methyl ethyl ketone) or dilute hydrochloric acid. Next, thicknesses of the sample are measured at five positions using a laser holo gauge (LGH-110C) manufactured by Mitutoyo Corporation, and these measured values (fifteen points in total) are simply averaged (arithmetically averaged) to calculate an average value $t_B$ [μm]. Thereafter, an average thickness $t_b$ [μm] of the back layer 44 is obtained by the following equation. Note that the five measurement positions described above are randomly selected from each sample so as to be different positions in the longitudinal direction of the magnetic tape 1.

$$t_b \text{ [μm]} = t_T \text{ [μm]} - t_B \text{ [μm]}$$

(5) Physical Properties and Structure of Magnetic Recording Medium

[Variation in Width Δ of Magnetic Recording Medium]

When a variation in width Δ is measured over an entire length of the magnetic recording medium after storage at 65° C. for 360 hours, a sign of variation in width Δout on an outer side of winding is different from a sign of variation in width Δin on an inner side of winding. Since the sign of variation in width Δout on the outer side of winding is different from the sign of variation in width Δin on the inner side of winding, excellent running stability can be obtained even when stored in a high-temperature environment. Furthermore, the variation in width Δ is 0 ppm at any position of two portions sandwiching a center line of the entire length of the magnetic recording medium in a case where the entire length of the magnetic recording medium is divided into four portions by dividing into four equal parts. As described above, since the variation in width Δ is 0 ppm in a specific region in the longitudinal direction of the magnetic recording medium, excellent running stability can be obtained even when stored in a high-temperature environment.

The variation in width Δ of the magnetic recording medium is measured as follows.

First, the servo band pitch in the longitudinal direction of the magnetic recording medium in the initial state before storage at 65° C. for 360 hours is measured using a magnetic recording and reproducing apparatus 30. Note that the servo band pitch means an arrangement interval of servo bands.

Note that, in measuring the servo band pitch, in an environment of 32° C. and 55 RH % in a state where the magnetic tape 1 is wound around the magnetic recording cartridge 10 at a tension of 0.55 N, the servo band pitch at each position in the longitudinal direction of the magnetic tape 1 is measured over an entire length of the magnetic tape 1 while the magnetic tape 1 accommodated in the magnetic recording cartridge 10 is caused to run so as to be wound around the magnetic recording and reproducing apparatus 30 (so-called caused to run in the forward direction). In the measurement, tension applied to the magnetic tape 1 is 0.55 N, and a running speed is 3 to 6 m/s.

Next, a process of storing at 65° C. and 40 RH % for 24 hours in a state where the magnetic tape 1 is wound around the magnetic recording cartridge 10 at a tension of 0.55 N, then reciprocating once at a tension of 0.55 N by the magnetic recording and reproducing apparatus in an environment of 32° C. and 55 RH %, storing again in an environment of 65° C. and 40 RH % for 24 hours, and then reciprocating once at a tension of 0.55 N by the magnetic recording and reproducing apparatus in an environment of 32° C. and 55 RH % is repeated to store for a total of 360 hours.

A ratio between a servo band pitch after storage at each position in the longitudinal direction of the magnetic tape 1 and the servo band pitch at the corresponding position in the longitudinal direction (the corresponding position in the longitudinal direction means a position having the same length ratio in the entire length.) in the initial state is defined as variation in width Δ. A portion where the variation in width Δ is minimized and a portion where the variation in width Δ is maximized are specified, and a difference between the variation in width maximum value $\Delta_{max}$ and the variation in width minimum value $\Delta_{min}$ is further obtained.

Figure 19:
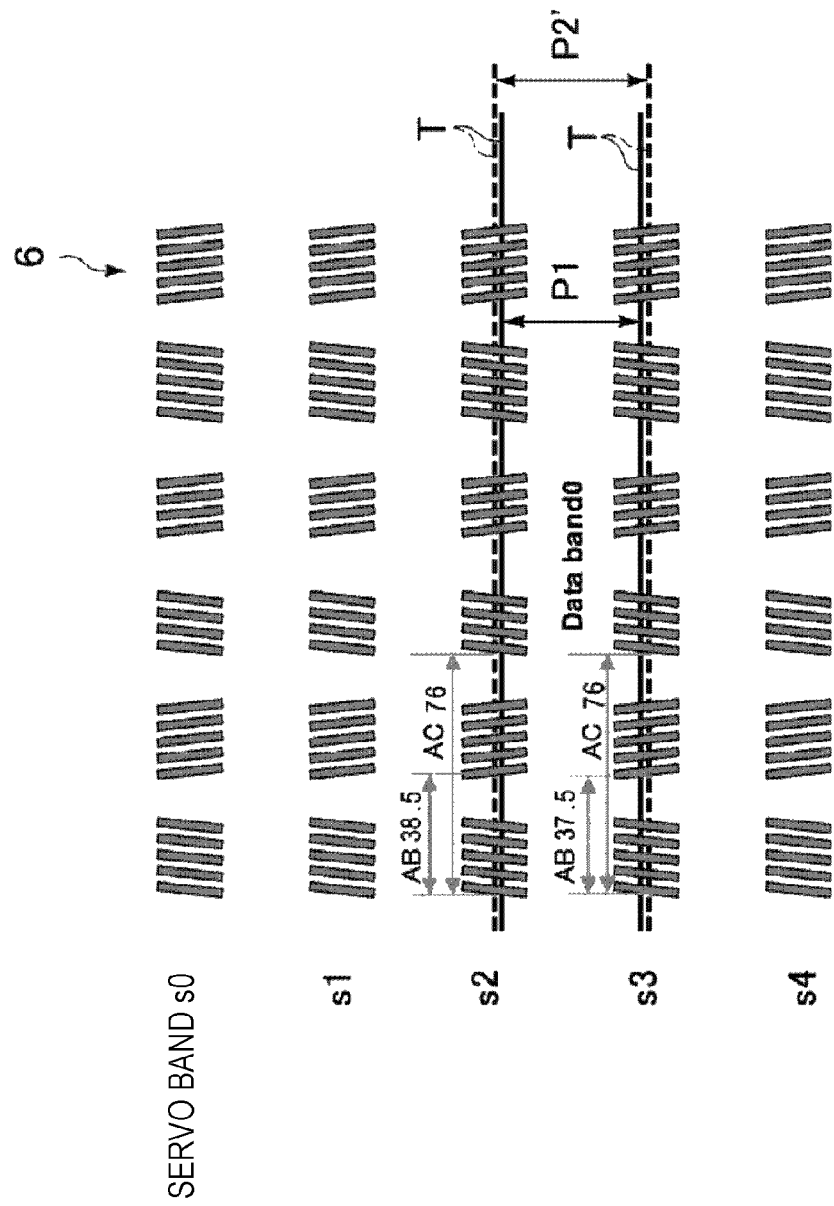
FIG. 19 is a view for explaining a method of measuring a servo band pitch using the recording and reproducing apparatus described above.

A method of measuring the servo band pitch will be described more specifically below. Here, as illustrated in FIG. 19, an example in which the drive head 36 tracks the data band d0 interposed between the servo band s2 and the servo band s3 will be described.

As described above, in the method of measuring the servo band pitch using the magnetic recording and reproducing apparatus 30, the magnetic tape 1 is caused to run over the entire length by the magnetic recording and reproducing apparatus 30, a numerical value representing a relative position of a servo trace line T with respect to the servo pattern 6 on each servo band of the two servo read heads 132 is measured, and the servo band pitch is calculated from the relative position of each measured servo trace line T with respect to the servo pattern 6. The interval between the servo trace lines T indicated by a solid line in FIG. 19 indicates a servo band pitch (first pitch P1 which is an arrangement interval of two servo read heads 132 of the drive head 36) when the width of the magnetic tape 1 does not change. Furthermore, an interval between the servo trace lines T indicated by a broken line in FIG. 19 corresponds to a servo band pitch (P2') when the width of the magnetic tape 1 is increased.

Figure 20:
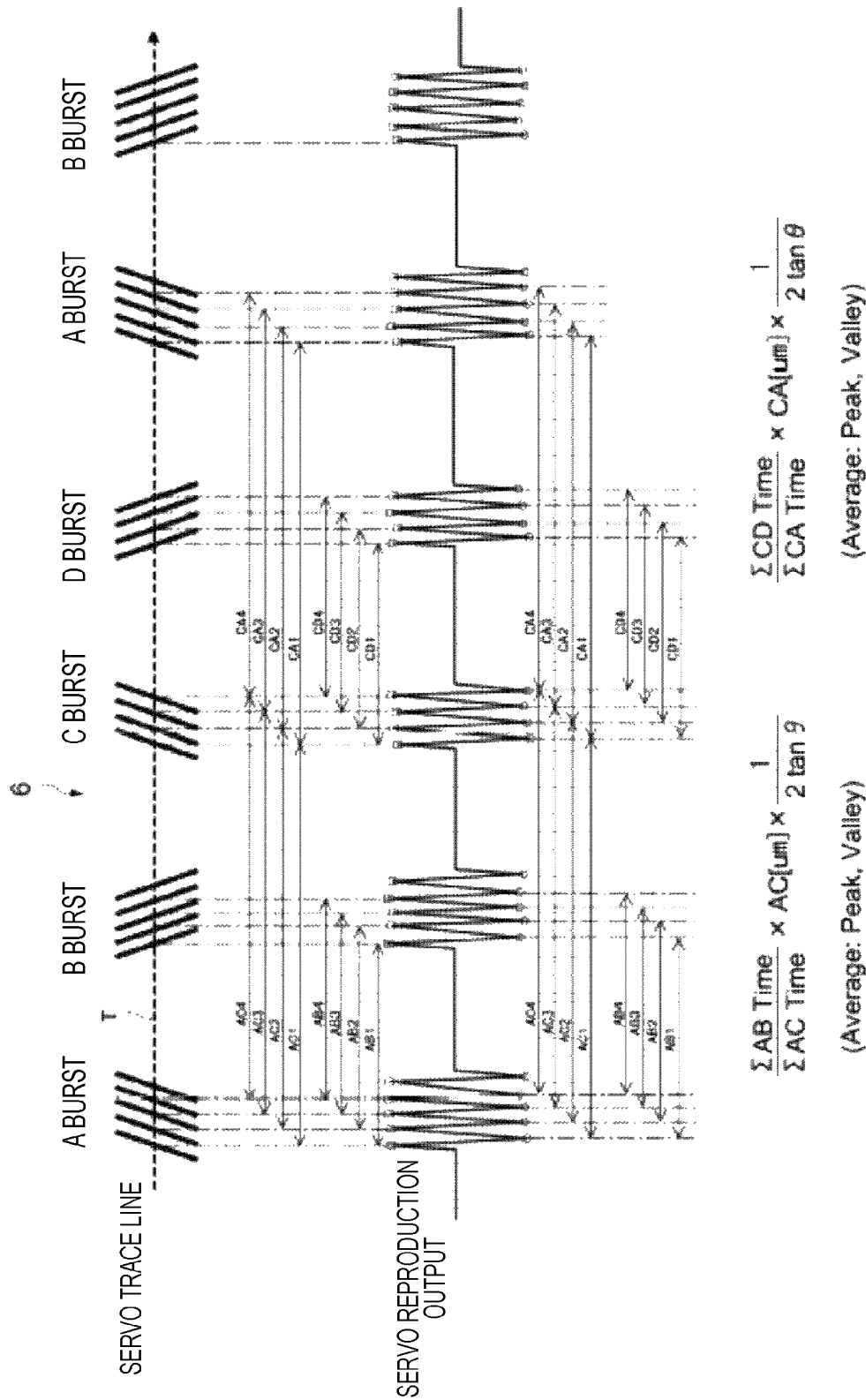
FIG. 20 is a view for explaining a method of measuring a servo trace line.

FIG. 20 is a view for explaining a method of measuring the servo trace line T. The magnetic recording and reproducing apparatus 30 outputs a servo reproduction signal having a waveform corresponding to the position of the servo trace line T with respect to the servo pattern 6. Typically, a distance AC between the A burst and the C burst that are arrays of the inclined patterns having the same shapes as each other, and a distance AB between the A burst and the B burst that are arrays of the inclined patterns having different shapes from each other are calculated, and a numerical value representing the relative position of the servo trace line T of each servo read head 132 with respect to the servo pattern 6 is calculated by the following equation [Math. 1]. Note that θ is an azimuth angle of each of the inclined patterns described above corresponding to an angle α in FIG. 5, and is 12° in the present example.

Furthermore, the distance AC is calculated by multiplying AC Time by tape running speed. Here, the AC Time means a time from A signal to C signal. In a case where the AC Time is measured from measurement using a large number of servo frames, the AC Time is calculated by multiplying an arithmetic average value of AC Times by tape running speed.

Similarly, the distance AB is calculated by multiplying AB Time by tape running speed. Here, the AB Time means a time from A signal to B signal. Note that, in the following equation [Math. 1], ΣAB Time and ΣAC Time mean integrated values of AB Time and AC Time in 100 to 100000 servo frames. In the equation [Math. 1], when (ΣAB Time/ΣAC Time) is calculated, in a case where the AB Time is a time when a servo reproduction waveform during the first inclined portion has a peak, the AC Time is also the time when a servo reproduction waveform during the first inclined portion has a peak, in a case where the AB Time is a time when a servo reproduction waveform during the second inclined portion has a peak, the AC Time is also the time when a servo reproduction waveform during the second inclined portion has a peak, in a case where the AB Time is a time when a servo reproduction waveform during the third inclined portion has a peak, the AC Time is also the time when a servo reproduction waveform during the third inclined portion has a peak, and in a case where the AB Time is a time when a servo reproduction waveform during the fourth inclined portion has a peak, the AC Time is also the time when a servo reproduction waveform during the fourth inclined portion has a peak.

Note that the position of T is a position where (ΣAB Time/ΣAC Time) becomes 1.

$$\frac{\Sigma AB\ \text{Time}}{\Sigma AC\ \text{Time}} \times AC[\mu m] \times \frac{1}{2\tan\theta}. \qquad [\text{Math. 1}]$$

Here, the distance AC may be a distance AC1 between the first inclined portions of the A burst and the C burst, a distance AC2 between the second inclined portions thereof, a distance AC3 between the third inclined portions thereof, or a distance AC4 between the fourth inclined portions thereof. These distances ACs (AC1 to AC4) refer to distances calculated by multiplying the time between (upper peak) timings at which an amplitude shows a positive maximum value in the servo reproduction waveform by tape running speed.

Then, the servo band pitch is determined from a difference between a numerical value representing the position of the servo trace line T on the servo pattern in the servo band s2 and a numerical value representing the position of the servo trace line T on the servo pattern in the servo band s3, which are obtained from the ratio of the distance AB and the distance AC calculated using the equation [Math. 1]. Here, the difference between the measured value of the servo band (servo band s2) in the tape center and the measured value of the servo band (servo band s3) on the tape edge of the two servo bands to be measured is taken. A positive or negative value thereof means a direction of change in tape width. A case where it is a positive value corresponds to narrowing of the servo band pitch, and a case where it is a negative value corresponds to widening of the servo band pitch. A case where the difference described above is zero means that there is no fluctuation in the tape width.

The servo band pitch is preferably determined from a measurement using a large number of servo frames, and may be, for example, a simple average value of measured values calculated from differences between 100 to 100,000 servo frames. Note that the number of measurements may be a simple average value within the above range. The tape tension during measurement is set to 0.55 N, and measurement is performed at a constant tension over the entire length of the magnetic tape 1.

As illustrated in FIG. 19, in a case where the servo trace line T is at a position indicated by a broken line, the distance AB is 38.5 μm and the distance AC is 76 μm in the servo band s2, and the distance AB is 37.5 μm and the distance AC is 76 μm in the servo band s3.

In the servo band s2,
(38.5/76)×(76/2 tan 12°)=90.5641 [μm], and
in the servo band s3,
(37.5/76)×(76/2 tan 12°)=88.2118 [μm]. A difference between these values is
88.2118−90.5641=−2.3523 [μm].

Therefore, the servo band pitch in this case is determined as a value wider than the first pitch P1 which is the interval between the servo read heads by 2.3523 μm.

Note that, as illustrated in FIG. 19, in a case where the servo trace line T is at a position indicated by a broken line, in both the servo band s2 and the servo band s3, the distance AB is 38 µm and the distance AC is 76 µm. In this case, the servo band pitches in both the servo band s2 and the servo band s3 are 89.3880 [µm], and a difference therebetween is 0 [µm].

Note that the variation in width in the longitudinal direction of the magnetic recording medium can be adjusted, for example, as follows. In order to reduce strain and creep generated in the magnetic recording medium 1, a material of the base layer, vertical and horizontal strength of the base layer (vertical and horizontal stretching conditions), and a type of the magnetic layer (coating type magnetic layer, vacuum thin film type magnetic layer), and in the case of a coating layer, Tg of a binding agent, an amount of the curing agent, and the like may be appropriately selected. Furthermore, for strain relaxation, the magnetic recording medium 1 may be stored at a temperature of 65° C. or more for a long time before being cut, or may be further stored at a temperature of 55° C. or more for a long time before servo writing.

[Loss Modulus, Storage Modulus]

The loss modulus at 65° C. of the base layer 41 can be 0.40 GPa or less, preferably 0.35 GPa or less, more preferably 0.30 GPa or less, further preferably 0.25 GPa or less, and preferably 0.20 GPa or less. When the loss modulus is within the range, it is possible to provide a magnetic recording cartridge capable of correcting the width in the longitudinal direction of the magnetic recording medium by adjusting the running tension of the tape system or changing the winding direction even when stored in a high-temperature environment of 60° C. or more.

The loss modulus and the storage modulus are measured by dynamic viscoelasticity measurement. The dynamic viscoelasticity measurement is temperature-dependent measurement, and is specifically performed as follows.

The magnetic tape 1 accommodated in the magnetic recording cartridge 10 is unwound, and the magnetic tape 1 is cut out to a length of 250 mm from each of three positions apart from 10 m to 20 m, 30 m to 40 m, and 50 m to 60 m from the connection portion between the magnetic tape 1 and the reader tape LT, thereby preparing samples. Layers other than the base layer 41 of the sample (that is, the non-magnetic layer (underlayer) 42, the magnetic layer 43, and the back layer 44) are removed with acetone, ethanol, or the like. Both ends in the longitudinal direction of the sample are clamped by a measurement unit of a dynamic viscoelasticity measuring device (RSA II, manufactured by TA Instruments). Then, dynamic viscoelasticity measurement is performed under the following measurement conditions. Each acid sample is measured at five points, and these measured values (fifteen points in total) are simply averaged (arithmetically averaged) to calculate the loss modulus and the storage modulus. Note that the five measurement positions described above are randomly selected from each sample so as to be different positions in the longitudinal direction of the magnetic tape 1.

Measurement temperature range: −10° C. to 180° C.
    Heating rate: 2° C./min
    Amplitude: expanded and contracted at an amplitude of 0.1% with respect to an initial length of the tape
    Measurement frequency: 10 Hz
    Test Type: "Strain-Controlled"
    Measurement Type: "Dynamic"
    Environment in which the device is placed: temperature 25° C., humidity 50 RH %
    Humidity control of measurement unit: none
    Number of N measured: 3

More detailed settings regarding the measurement conditions of the device are as follows. That is, as described below, in the measurement, the tension is adjusted so that the tension does not become 0 or less, and the strain is adjusted so as not to fall below the lower limit value of a transducer. The measurement conditions for these adjustments may be appropriately set by those skilled in the art, but for example, the following settings may be adopted for the dynamic viscoelasticity measuring device described above.

Option Settings
    Delay Before Test: OFF
    Auto Tension (setting for adjusting tension so that tension does not become 0 or less)
    Mode Static Force Tracking Dynamic Force
    Auto Tension Direction Tension
    Initial Static Force 10.0 g
    Static>Dynamic Force by 5.0%
    Minimum Static Force 1.0 g
    Auto Tension Sensitivity 1.0 g
    Auto Strain (setting for adjusting strain so as not to fall below the lower limit of the transducer)
    Max Applied Strain 0.1%
    Max Allowed Force 100.0 g
    Min allowed Force 2.0 g
    Strain Adjustment 3.0%
    Meas Ops: Default setting By performing the dynamic viscoelasticity measurement described above on the base layer 41, values of the loss modulus and the storage modulus at a measurement temperature of 65° C. are obtained.

The loss modulus and the storage modulus of the base layer 41 can be adjusted by, for example, a type of a material forming the base layer, a stretched state in the longitudinal direction and the width direction of the base layer, and/or an application and drying step, a calendering step, a curing step, an aging step, and the like.

For example, by using PEN, PET, or PEEK as a material for forming the base layer, the loss modulus and the storage modulus can be reduced as compared with those using other materials.

[Arithmetic Average Roughness Ra]

Arithmetic average roughness Ra of the magnetic surface is preferably 2.5 nm or less, and more preferably 2.0 nm or less. When Ra is 2.5 nm or less, a more excellent SNR can be obtained.

The above-described arithmetic average roughness Ra is obtained as follows. First, a surface on a side on which the magnetic layer 43 is provided is observed using an AFM (Atomic ForceMicroscope) (manufactured by Bruker, Dimension Icon) to obtain a cross-sectional profile. Next, the arithmetic average roughness Ra is obtained from the obtained cross-sectional profile in accordance with JIS B0601:2001.

[Average Thickness $t_T$ of Magnetic Recording Medium]

The average thickness $t_T$ of the magnetic recording medium 1 can be preferably 5.6 µm or less, more preferably 5.4 µm or less, further preferably 5.0 µm or less, and particularly preferably 4.6 µm or less. When the average thickness $t_T$ of the magnetic recording medium 1 is $t_T \leq 5.6$ µm, the recording capacity that can be recorded in one data cartridge can be increased more than that of a conventional one. A lower limit value of an average thickness $t_T$ of the magnetic recording medium 1 is not particularly limited, but is, for example, 3.5 µm $\leq t_T$.

The average thickness $t_T$ of the magnetic recording medium 1 is determined as follows. First, the magnetic tape 1 accommodated in the magnetic recording cartridge 10 is unwound, and the magnetic tape 1 is cut out to a length of 250 mm from each of three positions apart from 10 m to 20 m, 30 m to 40 m, and 50 m to 60 m from the connection portion between the magnetic tape 1 and the reader tape LT, thereby preparing samples. Next, a thickness of each sample is measured at five positions using a laser holo gauge (LGH-110C) manufactured by Mitutoyo Corporation as a measuring device, and these measured values (fifteen points in total) are simply averaged (arithmetically averaged) to calculate the average thickness $t_T$ [μm]. Note that the five measurement positions described above are randomly selected from each sample so as to be different positions in the longitudinal direction of the magnetic tape 1.

(6) Method of Manufacturing Magnetic Recording Medium

Next, a method of manufacturing the magnetic recording medium 1 having the configuration described above will be described. First, an underlayer forming coating material is prepared by kneading and/or dispersing non-magnetic powder, a binder, or the like, in a solvent. Next, a magnetic layer forming coating material is prepared by kneading and/or dispersing magnetic powder, a binder, or the like in a solvent. For the preparation of the magnetic layer forming coating material and the underlayer forming coating material, for example, the following solvents, dispersing device, and kneading device can be used.

Examples of the solvents used in the preparation of the coating material described above include ketone solvents such as acetone, methyl ethyl ketone, methyl isobutyl ketone, cyclohexanone, and the like; alcohol solvents such as methanol, ethanol, propanol, and the like; ester-based solvents such as methyl acetate, ethyl acetate, butyl acetate, propyl acetate, ethyl lactate, ethylene glycol acetate, and the like; ether-based solvents such as diethylene glycol dimethyl ether, 2-ethoxyethanol, tetrahydrofuran, dioxane, and the like; aromatic hydrocarbon solvents such as benzene, toluene, xylene, and the like; and halogenated hydrocarbon-based solvents such as methylene chloride, ethylene chloride, carbon tetrachloride, chloroform, chlorobenzene, and the like. One of these solvents may be used, or a mixture of two or more thereof may be used.

As the kneading device used in the preparation of the coating material described above, for example, a kneading device such as a continuous biaxial kneader, a continuous biaxial kneader capable of diluting in multiple steps, a kneader, a press kneader, a roll kneader, or the like can be used, but the present technology is not particularly limited thereto. Furthermore, as the dispersing device used in the preparation of the coating material described above, for example, a roll mill, a ball mill, a horizontal sand mill, a vertical sand mill, a spike mill, a pin mill, a tower mill, a pearl mill (for example, DCP Mill, manufactured by Nippon Eirich Co., Ltd., or the like), a homogenizer, an ultrasonic dispersing device, or the like can be used, but the present technology is not particularly limited thereto.

Next, the underlayer forming coating material is applied to one principal plane of the base layer 41 and dried to form the non-magnetic layer (hereinafter, also referred to as the underlayer) 42. Subsequently, the magnetic layer forming coating material is applied onto the underlayer 42 and dried to form the magnetic layer 43 on the underlayer 42. Note that, at the time of drying, magnetic powder is magnetically oriented in the thickness direction of the base layer 41 by, for example, a solenoid coil. Furthermore, at the time of drying, for example, the magnetic powder may be magnetically oriented in the longitudinal direction (running direction) of the base layer 41 and then may be magnetically oriented in the thickness direction of the base layer 41 by a solenoid coil. After the magnetic layer 43 is formed, the back layer 44 is formed on the other principal plane of the base layer 41. Therefore, the magnetic recording medium 1 can be obtained.

Thereafter, the obtained magnetic recording medium 1 is rewound around a large diameter core, and curing treatment is performed. Finally, the magnetic recording medium 1 is calendered and then cut into a predetermined width (for example, a width of ½ inches). Thus, a target elongated magnetic recording medium 1 can be obtained.

(7) Effects

A magnetic recording cartridge 10 according to a first embodiment includes: a magnetic recording medium having a base layer; and a reel, in which a loss modulus at 65° C. of the base layer is 0.40 GPa or less, the magnetic recording medium is accommodated in a state of being wound around the reel, and when a variation in width is measured over an entire length of the magnetic recording medium after storage at 65° C. for 360 hours, a sign of variation in width Δout on an outer side of winding is different from a sign of variation in width Δin on an inner side of winding, and the variation in width is 0 ppm at any position of two portions sandwiching a center line of the entire length of the magnetic recording medium in a case where the entire length of the magnetic recording medium is divided into four portions by dividing into four equal parts. Therefore, it is possible to provide a magnetic recording cartridge capable of correcting the width in the longitudinal direction of the magnetic recording medium by adjusting the running tension of the tape system or changing the winding direction even when stored in a high-temperature environment of 60° C. or more.

(8) Modified Example

Modified Example 1

The magnetic recording medium 1 may be incorporated in a library apparatus. That is, the present technology also provides a library apparatus including at least one magnetic recording medium 1. The library apparatus has a configuration capable of adjusting tension applied in the longitudinal direction of the magnetic recording medium 1, and may include the plurality of recording and reproducing apparatus 30 described above.

Modified Example 2

The magnetic recording medium 1 may be subjected to servo signal write processing by a servo writer. The servo writer can keep the widths of the magnetic recording medium 1 constant or substantially constant by adjusting the tension in the longitudinal directions of the magnetic recording medium 1 at the time of recording a servo signal or the like. In this case, the servo writer can include a detection device that detects the widths of the magnetic recording medium 1. The servo writer can adjust the tension in the longitudinal directions of the magnetic recording medium 1 on the basis of the detection result of the detection device.

3. Second Embodiment (Example of Magnetic Recording Cartridge Including Vacuum Thin Film Type Magnetic Recording Medium)

(1) Configuration of Magnetic Recording Cartridge

The magnetic recording cartridge of the present embodiment is the same as the magnetic recording cartridge 1 described in "(1) Configuration of Magnetic Cartridge" of 2. described above except that a vacuum thin film type magnetic recording medium 810 is included instead of the coating type magnetic recording medium 1. Hereinafter, the vacuum thin film type magnetic recording medium 810 will be described.

Figure 23:
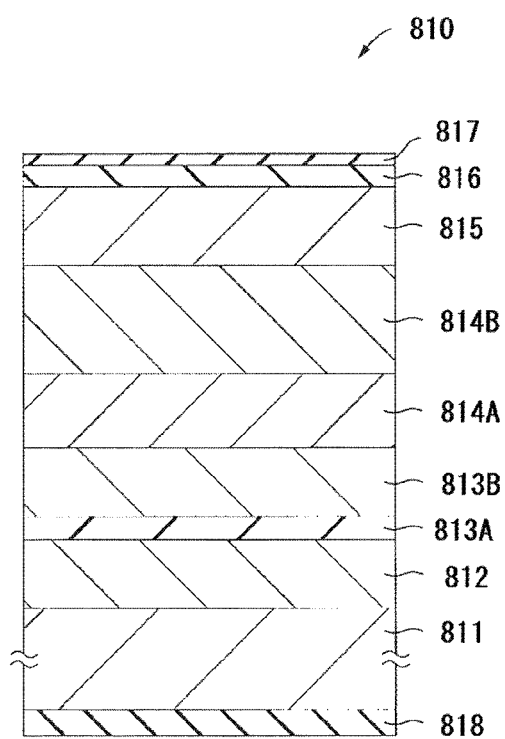
FIG. 23 is a cross-sectional view illustrating a configuration of a magnetic recording medium according to a second embodiment.

The magnetic recording medium 810 is an elongated perpendicular magnetic recording medium, and includes a film-like base layer 811, a soft magnetic underlayer (hereinafter, referred to as "SUL") 812, a first seed layer 813A, a second seed layer 813B, a first underlayer 814A, a second underlayer 814B, and a magnetic layer 815, as illustrated in FIG. 23. The SUL812, the first and second seed layers 813A and 813B, the first and second underlayers 814A and 814B, and the magnetic layer 815 can be, for example, vacuum thin films such as a layer formed by sputtering (hereinafter, also referred to as a "sputtered layer") and the like.

The SUL812, the first and second seed layers 813A and 813B, and the first and second underlayers 814A and 814B are provided between one principal plane (hereinafter, referred to as a "front surface") of the base layer 811 and the magnetic layer 815, and the SUL812, the first seed layer 813A, the second seed layer 813B, the first underlayer 814A, and the second underlayer 814B are laminated in order from the base layer 811 toward the magnetic layer 815.

The magnetic recording medium 810 may further include a protective layer 816 provided on the magnetic layer 815 and a lubricating layer 817 provided on the protective layer 816 as needed. Furthermore, the magnetic recording medium 810 may further include a back layer 818 provided on the other principal plane (hereinafter referred to as a "back surface") of the base layer 811 as needed.

Hereinafter, a longitudinal direction of the magnetic recording medium 810 (a longitudinal direction of the base layer 811) is referred to as a machine direction (MD) direction. Here, the machine direction means a relative movement direction of the recording and reproducing head with respect to the magnetic recording medium 810, that is, a direction in which the magnetic recording medium 810 runs at the time of recording and reproducing.

The magnetic recording medium 810 is suitable for use as a data archive storage medium, which is expected to increase in demand in the future. The magnetic recording medium 810 can realize, for example, a surface recording density of 10 times or more the current coating type magnetic recording medium for storage, that is, a surface recording density of 50 Gb/in$^2$ or more. In a case where a general linear recording type data cartridge is configured using the magnetic recording medium 810 having such a surface recording density, it is possible to perform large-capacity recording of 100 TB or more per data cartridge.

The magnetic recording medium 810 is suitable for use in a recording and reproducing apparatus (recording and reproducing apparatus for recording and reproducing data) including a ring-type recording head and a giant magneto-resistive (GMR) type or tunneling magneto-resistive (TMR) type reproducing head. Furthermore, the magnetic recording medium 810 according to the second embodiment preferably uses a ring type recording head as a servo signal writing head. In the magnetic layer 815, a data signal is vertically recorded by, for example, a ring type recording head. Furthermore, in the magnetic layer 815, a servo signal is vertically recorded by, for example, a ring type recording head.

(2) Description of Each Layer of Magnetic Recording Medium (Base Layer)

Since the description of the base layer 41 in the first embodiment applies to the base layer 811, the description of the base layer 811 is omitted. Note that, the average thickness, loss modulus, and storage modulus of the base layer 811 are measured by the same methods as the base layer 41 in the first embodiment except that layers other than the base layer of each sample are removed with a solvent such as MEK (methyl ethyl ketone) or dilute hydrochloric acid, and then washed with pure water.

(SUL)

The SUL812 contains a soft magnetic material in an amorphous state. The soft magnetic material includes, for example, at least one of a Co-based material or an Fe-based material. The Co-based material includes, for example, CoZrNb, CoZrTa, or CoZrTaNb. The Fe-based material includes, for example, FeCoB, FeCoZr, or FeCoTa.

The SUL812 is a single-layer SUL and is provided directly on the base layer 811. An average thickness of the SUL812 is preferably 10 nm or more and 50 nm or less, and more preferably 20 nm or more and 30 nm or less.

The average thickness of the SUL812 is determined by the same method as the method of measuring the average thickness of the magnetic layer 43 in the first embodiment. Note that an average thickness of the layer other than the SUL812 (that is, an average thickness of each of the first and second seed layers 813A and 813B, the first and second underlayers 814A and 814B, and the magnetic layer 815) described later is also determined by the same method as the method of measuring the average thickness of the magnetic layer 43 in the first embodiment. However, magnification of the TEM image is appropriately adjusted according to the thickness of each layer.

(First and Second Seed Layers)

The first seed layer 813A contains an alloy containing Ti and Cr, and has an amorphous state. Furthermore, the alloy may further contain oxygen (O). The oxygen may be impurity oxygen contained in a trace amount in the first seed layer 813A when the first seed layer 813A is formed by a film forming method such as a sputtering method or the like.

Here, the "alloy" means at least one of a solid solution containing Ti and Cr, a eutectic material, an intermetallic compound, or the like. The "amorphous state" means that a halo is observed by X-ray diffraction, electron beam diffraction, or the like, and a crystal structure cannot be specified.

An atomic ratio of Ti to the total amount of Ti and Cr contained in the first seed layer 813A is preferably in a range of 30 atomic % or more and less than 100 atomic % or less, and more preferably in a range of 50 atomic % or more and less than 100 atomic %. When the atomic ratio of Ti is less than 30%, a (100) plane of a body-centered cubic lattice (bcc) structure of Cr is oriented, and there is a possibility that the orientation of the first and second underlayers 814A and 814B formed on the first seed layer 813A is deteriorated.

The atomic ratio of Ti described above is determined as follows. Depth direction analysis (depth profile measurement) of the first seed layer 813A by auger electron spectroscopy (hereinafter, referred to as "AES") is performed while ion-milling the magnetic recording medium 810 from the magnetic layer 815 side. Next, an average composition (average atomic ratio) of Ti and Cr in a film thickness direction is determined from the obtained depth profile. Next, the atomic ratio of Ti described above is determined using the determined average composition of Ti and Cr.

In a case where the first seed layer 813A contains Ti, Cr, and O, an atomic ratio of O to the total amount of Ti, Cr, and O contained in the first seed layer 813A is preferably 15 atomic % or less, and more preferably 10 atomic % or less. When the atomic ratio of O exceeds 15 atomic %, a $TiO_2$ crystal is generated, such that crystal nucleation formation in the first and second underlayers 814A and 814B formed on the first seed layer 813A is affected, and the orientation of the first and second underlayers 814A and 814B may be deteriorated. The atomic ratio of O described above is determined using the analysis method similar to that of the atomic ratio of Ti described above.

The alloy contained in the first seed layer 813A may further contain elements other than Ti and Cr as additive elements. The additive elements may be, for example, one or more elements selected from the group consisting of Nb, Ni, Mo, Al, and W.

An average thickness of the first seed layer 813A is preferably 2 nm or more and 15 nm or less, and more preferably 3 nm or more and 10 m or less.

The second seed layer 813B contains, for example, NiW or Ta, and has a crystalline state. An average thickness of the second seed layer 813B is preferably 3 nm or more and 20 nm or less, and more preferably 5 nm or more and 15 nm or less.

The first and second seed layers 813A and 813B have a crystal structure similar to those of the first and second underlayers 814A and 814B, and are not seed layers provided for the purpose of crystal growth, but are seed layers that improve the vertical orientation of the first and second underlayers 814A and 814B by the amorphous state of the first and second seed layers 813A and 813B.

(First and Second Underlayers)

The first and second underlayer 814A and 814B preferably have a crystal structure similar to that of the magnetic layer 815. In a case where the magnetic layer 815 contains a Co-based alloy, it is preferable that the first and second underlayers 814A and 814B contain a material having a hexagonal close-packed (hcp) structure similar to that of the Co-based alloy, and a c-axis of the structure is oriented in a direction perpendicular to the film surface (that is, a film thickness direction). This is because the orientation of the magnetic layer 815 can be enhanced, and a lattice constant matching between the second underlayer 814B and the magnetic layer 815 can be relatively preferable. As the material having a hexagonal close-packed (hcp) structure, a material containing Ru is preferably used, and specifically, Ru alone or a Ru alloy is preferable. Examples of the Ru alloy include Ru alloy oxides such as Ru—$SiO_2$, Ru—$TiO_2$, Ru—$ZrO_2$, and the like, and the Ru alloy may be any one of these alloy oxides.

As described above, similar materials can be used as the materials of the first and second underlayers 814A and 814B. However, the targeted effects of the first and second underlayers 814A and 814B are different from each other. Specifically, the second underlayer 814B has a film structure that promotes a granular structure of the magnetic layer 815 as an upper layer thereof, and the first underlayer 814A has a film structure with high crystal orientation. In order to obtain such a film structure, it is preferable that film formation conditions such as sputtering conditions and the like of the first and second underlayers 814A and 814B are different from each other.

An average thickness of the first underlayer 814A is preferably 3 nm or more and 15 nm or less, and more preferably 5 nm or more and 10 nm or less. An average thickness of the second underlayer 814B is preferably 7 nm or more and 40 nm or less, and more preferably 10 nm or more and 25 nm or less.

(Magnetic Layer)

The magnetic layer (also referred to as a recording layer) 815 can be a perpendicular magnetic recording layer in which a magnetic material is vertically oriented. From the viewpoint of improving the recording density, the magnetic layer 815 is preferably a granular magnetic layer containing a Co-based alloy. The granular magnetic layer includes ferromagnetic crystal particles containing a Co-based alloy and a non-magnetic grain boundary (non-magnetic body) surrounding the ferromagnetic crystal particles. More specifically, the granular magnetic layer includes columns (columnar crystals) containing a Co-based alloy, and a non-magnetic grain boundary (for example, an oxide such as $SiO_2$ or the like) that surrounds the column and magnetically separates each column. In the structure, the magnetic layer 815 having a structure in which the columns are magnetically separated can be configured.

The Co-based alloy has a hexagonal close-packed (hcp) structure, and a c-axis thereof is oriented in a direction perpendicular to the film surface (film thickness direction). As the Co-based alloy, a CoCrPt-based alloy containing at least Co, Cr, and Pt is preferably used. The CoCrPt-based alloy may further contain an additive element. Examples of the additive element include one or more elements selected from the group consisting of Ni, Ta, and the like.

The non-magnetic grain boundary surrounding the ferromagnetic crystal grains contains a non-magnetic metal material. Here, the metal includes a semimetal. As the non-magnetic metal material, for example, at least one of a metal oxide or a metal nitride can be used, and from the viewpoint of more stably maintaining the granular structure, it is preferable to use a metal oxide. Examples of the metal oxide include metal oxides including at least one element selected from the group consisting of Si, Cr, Co, Al, Ti, Ta, Zr, Ce, Y, Hf, and the like, and metal oxides including at least a Si oxide (that is, $SiO_2$) are preferable. Specific examples of the metal oxide include $SiO_2$, $Cr_2O_3$, CoO, $Al_2O_3$, $TiO_2$, $Ta_2O_5$, $ZrO_2$, $HfO_2$, and the like. Examples of the metal nitride include metal nitrides including at least one element selected from the group consisting of Si, Cr, Co, Al, Ti, Ta, Zr, Ce, Y, Hf, and the like. Specific examples of the metal nitride include SiN, TiN, AlN, and the like.

It is preferable that the CoCrPt-based alloy contained in the ferromagnetic crystal particles and the Si oxide contained in the non-magnetic grain boundary have an average composition represented by the following Formula (1). This is because it is possible to realize a saturation magnetization amount Ms capable of suppressing the influence of a demagnetizing field and securing a sufficient reproduction output, and therefore, the recording and reproducing characteristics can be further improved.

$$(Co_xPt_yCr_{100-x-y})_{100-z}—(SiO_2)_z \qquad (1)$$

(Here, in Formula (1), x, y, and z are values within the ranges of 69≤X≤75, 10≤y≤16, and 9≤Z≤12, respectively.)

Note that the composition described above can be determined as follows. A depth direction of the magnetic layer 815 is analyzed by AES while ion-milling the magnetic recording medium 810 from the magnetic layer 815 side, and an average composition (average atomic ratio) of Co, Pt, Cr, Si, and O in the film thickness direction is determined.

An average thickness $t_m$ [nm] of the magnetic layer 815 can be preferably 9 nm≤$t_m$≤90 nm, more preferably 9 nm≤$t_m$≤20 nm, and still more preferably 9 nm≤$t_m$≤15 nm. The average thickness $t_m$ of the magnetic layer 815 within the numerical range described above can contribute to improvement of the electromagnetic conversion characteristics.

(Protective Layer)

The protective layer 816 contains, for example, a carbon material or silicon dioxide ($SiO_2$), and preferably contains a carbon material from the viewpoint of the film strength of the protective layer 816. Examples of the carbon material include graphite, diamond-like carbon (DLC), diamond, and the like.

(Lubricating Layer)

The lubricating layer 817 contains at least one lubricant. The lubricating layer 817 may further contain various additives, for example, a corrosion inhibitor and the like, as needed. The lubricant has at least two carboxyl groups and one ester bond, and contains at least one carboxylic acid-based compound represented by the following General Formula (1). The lubricant may further a lubricant other than the carboxylic acid-based compound represented by the following General Formula (1).

General Formula (1):

[Chem. 1]
$$Rf-Es-R-\underset{\underset{COOH}{|}}{\underset{CH_2}{\overset{|}{CH}}}-COOH$$

(In the formula, Rf is an unsubstituted or substituted saturated or unsaturated fluorine-containing hydrocarbon group or a hydrocarbon group, Es is an ester bond, and R may be absent, but is an unsubstituted or substituted saturated or unsaturated hydrocarbon group.)

The carboxylic acid-based compound described above is preferably represented by the following General Formula (2) or (3).

General Formula (2):

[Chem. 2]
$$Rf-\underset{\underset{O}{||}}{C}-O-\underset{\underset{CH_2-COOH}{|}}{CH}-COOH.$$

(In the formula, Rf is an unsubstituted or substituted saturated or unsaturated fluorine-containing hydrocarbon group or a hydrocarbon group.)

General Formula (3):

[Chem. 3]
$$Rf-O-\underset{\underset{O}{||}}{C}-CH_2-\underset{\underset{CH_2-COOH}{|}}{CH}-COOH.$$

(In the formula, Rf is an unsubstituted or substituted saturated or unsaturated fluorine-containing hydrocarbon group or a hydrocarbon group.)

The lubricant preferably contains one or both of the carboxylic acid-based compounds represented by General Formulas (2) and (3) described above.

When the lubricant containing a carboxylic acid-based compound represented by General Formula (1) is applied to the magnetic layer 815, the protective layer 816, or the like, a lubricating action is exerted by a cohesive force between fluorine-containing hydrocarbon groups or hydrocarbon groups Rf which are hydrophobic groups. In a case where the Rf group is a fluorine-containing hydrocarbon group, the total number of carbon atoms is preferably 6 to 50, and the total number of carbon atoms of the fluorinated hydrocarbon group is preferably 4 to 20. The Rf group can be, for example, a saturated or unsaturated linear, branched, or cyclic hydrocarbon group, but can preferably be a saturated linear hydrocarbon group.

For example, in a case where the Rf group is a hydrocarbon group, the Rf group is desirably a group represented by the following General Formula (4).

General Formula (4):

[Chemical Formula 4]
$$CH_3-(CH_2)_{\overline{l}}$$

(Here, in General Formula (4), l is an integer selected from the range of 8 to 30, and more desirably 12 to 20.)

Furthermore, in a case where the Rf group is a fluorine-containing hydrocarbon group, the Rf group is desirably a group represented by the following General Formula (5).

General Formula (5):

[Chemical Formula 5]
$$CF_3-(CF_2)_{\overline{n}}-(CH_2)_{\overline{m}}$$

(Here, in General Formula (5). m and n are integers independently selected from the following ranges, respectively, and m=2 to 20 and n=3 to 18, and more desirably m=4 to 13 and n=3 to 10.)

The fluorinated hydrocarbon group may be concentrated at one location in the molecule as described above, or may be dispersed as in the following General Formula (6), and may be not only —$CF_3$ or —$CF_2$— but also —$CHF_2$, —CHF—, or the like.

General Formula (6):

[Chem. 6]
$$CH_3-(CH_2)_{\overline{n1}}(CH_2)_{\overline{m1}}(CF_2)_{\overline{n2}}(CF_2)_{\overline{m2}}$$

(Here, in General Formulas (5) and (6), n1+n2=n and m1+m2=m.)

The reason why the number of carbon atoms is limited as described above in General Formulas (4), (5), and (6) is that when the number of carbon atoms (l or sum of m and n) constituting an alkyl group or a fluorine-containing alkyl group is the above lower limit or more, the length thereof becomes an appropriate length, the cohesive force between the hydrophobic groups is effectively exhibited, a preferred lubricating action is exhibited, and friction/wear durability is improved. Furthermore, when the number of carbon atoms is the upper limit described above or less, the solubility of the lubricant including the carboxylic acid-based compound in a solvent is kept excellent.

In particular, when the Rf group in each of General Formulas (1), (2), and (3) contains a fluorine atom, the Rf group is effective in reducing the friction coefficient, improving running performance, and the like. However, it is preferable that a hydrocarbon group is provided between the fluorine-containing hydrocarbon group and the ester bond, and hydrolysis is prevented by securing stability of the ester bond by separating the fluorine-containing hydrocarbon group and the ester bond.

Furthermore, the Rf group may have a fluoroalkyl ether group or a perfluoropolyether group.

An R group in General Formula (1) may be absent, but in some cases, a hydrocarbon chain having a relatively small number of carbon atoms is preferable.

Furthermore, the Rf group or the R group contains one or more elements selected from nitrogen, oxygen, sulfur, phosphorus, and halogen as constituent elements, and may further have a hydroxyl group, a carboxyl group, a carbonyl group, an amino group, an ester bond, and the like in addition to the functional group described above.

Specifically, the carboxylic acid-based compound represented by General Formula (1) is preferably at least one of the following compounds. That is, the lubricant preferably contains at least one of the following compounds.

$CF_3(CF_2)_7(CH_2)_{10}COOCH(COOH)CH_2COOH$
$CF_3(CF_2)_3(CH_2)_{10}COOCH(COOH)CH_2COOH$
$C_{17}H_{15}COOCH(COOH)CH_2COOH$
$CF_3(CF_2)_7(CH_2)_2OCOCH_2CH(C_{18}H_{37})COOCH(COOH)CH_2COOH$
$CF_3(CF_2)_7COOCH(COOH)CH_2COOH$
$CHF_2(CF_2)_7COOCH(COOH)CH_2COOH$
$CF_3(CF_2)_7(CH_2)_2OCOCH_2CH(COOH)CH_2COOH$
$CF_3(CF_2)_7(CH_2)_6OCOCH_2CH(COOH)CH_2COOH$
$CF_3(CF_2)_7(CH_2)_{11}OCOCH_2CH(COOH)CH_2COOH$
$CF_3(CF_2)_3(CH_2)_6OCOCH_2CH(COOH)CH_2COOH$
$C_{18}H_{37}OCOCH_2CH(COOH)CH_2COOH$
$CF_3(CF_2)_7(CH_2)_4COOCH(COOH)CH_2COOH$
$CF_3(CF_2)_3(CH_2)_4COOCH(COOH)CH_2COOH$
$CF_3(CF_2)_3(CH_2)_7COOCH(COOH)CH_2COOH$
$CF_3(CF_2)_9(CH_2)_{10}COOCH(COOH)CH_2COOH$
$CF_3(CF_2)_7(CH_2)_{12}COOCH(COOH)CH_2COOH$
$CF_3(CF_2)_5(CH_2)_{10}COOCH(COOH)CH_2COOH$
$CF_3(CF_2)_7CH(C_9H_{19})CH_2CH=CH(CH_2)_7COOCH(COOH)CH_2COOH$
$CF_3(CF_2)_7CH(C_6H_{13})(CH_2)_7COOCH(COOH)CH_2COOH$
$CH_3(CH_2)_3(CH_2CH_2CH(CH_2CH_2(CF_2)_9CF_3))_2(CH_2)_7COOCH(COOH)CH_2COOH$

The carboxylic acid-based compound represented by General Formula (1) is soluble in a non-fluorine-based solvent having a small load on the environment, and has, for example, an advantage that operations such as coating, immersion, and spraying can be performed using a general-purpose solvent such as a hydrocarbon-based solvent, a ketone-based solvent, an alcohol-based solvent, an ester-based solvent, or the like. Specifically, examples of the general-purpose solvent can include solvents such as hexane, heptane, octane, decane, dodecane, benzene, toluene, xylene, cyclohexane, methyl ethyl ketone, methyl isobutyl ketone, methanol, ethanol, isopropanol, diethyl ether, tetrahydrofuran, dioxane, cyclohexanone, and the like.

In a case where the protective layer 816 contains a carbon material, when the carboxylic acid-based compound described above is applied as a lubricant onto the protective layer 816, two carboxyl groups and at least one ester bond group, which are polar groups of lubricant molecules, are adsorbed onto the protective layer 816, and the lubricating layer 817 having particularly excellent durability can be formed due to the cohesive force between the hydrophobic groups.

Note that the lubricant is not only held as the lubricating layer 817 on the surface of the magnetic recording medium 810 as described above, but may also be included and held in layers such as the magnetic layer 815, the protective layer 816, and the like constituting the magnetic recording medium 810.

(Back Layer)

The description regarding the back layer 44 in the first embodiment is applied to the back layer 818.

(3) Physical Properties and Structure of Magnetic Recording Medium

All of the descriptions regarding the physical properties and the structure described in (5) of 2. described above are also applied to the second embodiment. The descriptions of physical properties and the structure of the magnetic recording medium of the second embodiment will be omitted except for differences from the first embodiment. The average thickness, loss modulus, and storage modulus of the base layer 811 are measured by the same methods as the base layer 41 in the first embodiment except that layers other than the base layer of each sample are removed with a solvent such as MEK (methyl ethyl ketone) or dilute hydrochloric acid, and then washed with pure water.

(4) Configuration of Sputtering Apparatus

Hereinafter, an example of a configuration of a sputtering apparatus 920 used for manufacturing the magnetic recording medium 810 will be described below with reference to FIG. 24. The sputtering apparatus 920 is a continuous winding type sputtering apparatus used for forming a film of the SUL 812, the first seed layer 813A, the second seed layer 813B, the first underlayer 814A, the second underlayer 814B, and the magnetic layer 815, and includes a film forming chamber 921, a drum 922 which is a metal can (rotating body), cathodes 923a to 923f, a supply reel 924, a winding reel 925, and a plurality of guide rollers 927a to 927c and 928a to 928c illustrated in FIG. 24. The sputtering apparatus 920 is, for example, a direct current (DC) magnetron sputtering system device, but the sputtering system is not limited to this system.

The film forming chamber 921 is connected to a vacuum pump (not illustrated) via an exhaust port 926, and the atmosphere in the film forming chamber 921 is set to a predetermined degree of vacuum by the vacuum pump. In the inside of the film forming chamber 921, the drum 922 having a rotatable configuration, the supply reel 924, and the winding reel 925 are disposed. The inside of the film forming chamber 921 is provided with the plurality of guide rollers 927a to 927c for guiding the transport of the base layer 811 between the supply reel 924 and the drum 922, and the plurality of guide rollers 928a to 928c for guiding the transport of the base layer 811 between the drum 922 and the winding reel 925. At the time of sputtering, the base layer 811 unwound from the supply reel 924 is wound around the winding reel 925 via the guide rollers 927a to 927c, the drum 922, and the guide rollers 928a to 928c. The drum 922 has a cylindrical shape, and the elongated base layer 811 is transported along a cylindrical circumferential surface of the drum 922. The drum 922 is provided with a cooling mechanism (not illustrated), and is cooled to, for example, about −20° C. during sputtering. In the inside of the film forming chamber 921, the plurality of cathodes 923a to 923f are arranged so as to face the circumferential surface of the drum 922. Targets are set for these cathodes 923a to 923f, respectively. Specifically, targets for forming the SUL 812, the first seed layer 813A, the second seed layer 813B, the first underlayer 814A, the second underlayer 814B, and the magnetic layer 815 are set in the cathodes 923a, 923b, 923c, 923d, 923e, and 923f, respectively. These cathodes 923a to 923f simultaneously form a plurality of types of films, that is, the SUL 812, the first seed layer 813A, the second seed layer 813B, the first underlayer 814A, the second underlayer 814B, and the magnetic layer 815.

In the sputtering apparatus 920 having the configuration described above, the SUL 812, the first seed layer 813A, the second seed layer 813B, the first underlayer 814A, the second underlayer 814B, and the magnetic layer 815 can be continuously formed by a roll-to-roll method.

(5) Method of Manufacturing Magnetic Recording Medium

The magnetic recording medium 810 can be manufactured, for example, as follows.

Figure 24:
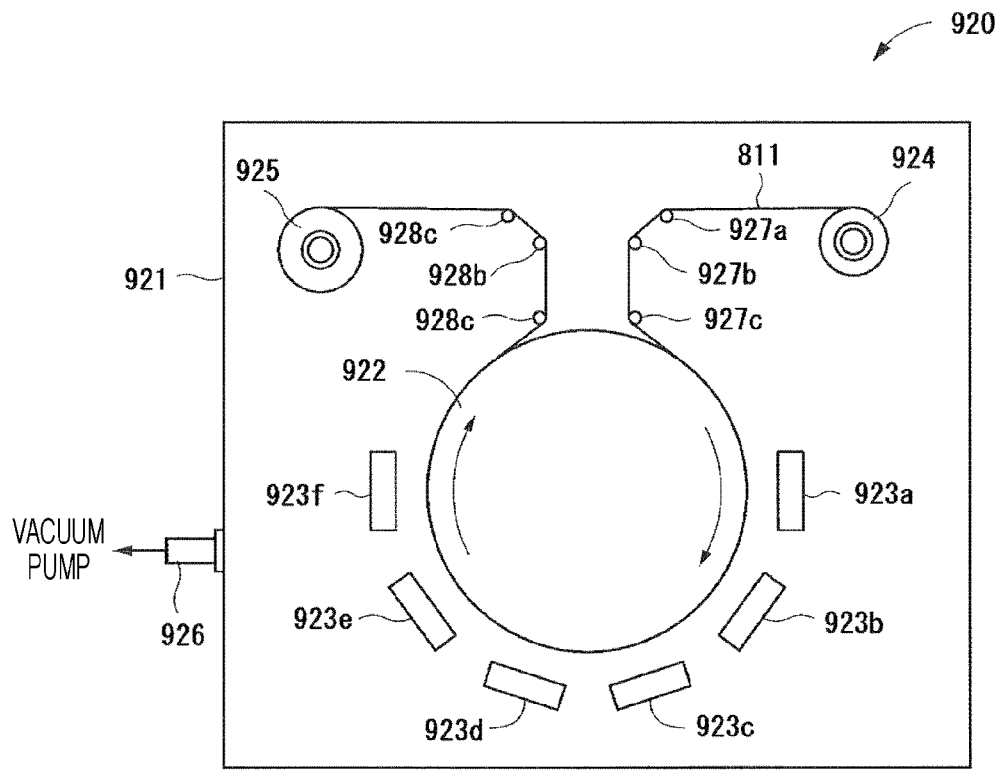
FIG. 24 is a schematic view illustrating a configuration of a sputtering apparatus.

First, the SUL 812, the first seed layer 813A, the second seed layer 813B, the first underlayer 814A, the second underlayer 814B, and the magnetic layer 815 are sequentially formed on the surface of the base layer 811 using the sputtering apparatus 920 illustrated in FIG. 24. Specifically, the film is formed as follows. First, the film forming chamber 921 is evacuated until a predetermined pressure is reached. Thereafter, the targets set in the cathodes 923a to 923f are sputtered while a process gas such as an Ar gas or the like is introduced into the film forming chamber 921. Therefore, the SUL 812, the first seed layer 813A, the second seed layer 813B, the first underlayer 814A, the second underlayer 814B, and the magnetic layer 815 are sequentially formed on the surface of the running base layer 811.

The atmosphere of the film forming chamber 921 during sputtering is set to, for example, about $1 \times 10^{-5}$ Pa to $5 \times 10^{-5}$ Pa. The film thicknesses and characteristics of the SUL 812, the first seed layer 813A, the second seed layer 813B, the first underlayer 814A, the second underlayer 814B, and the magnetic layer 815 can be controlled by adjusting the tape line speed at which the base layer 811 is wound up, the pressure (sputtering gas pressure) of a process gas such as an Ar gas or the like introduced during sputtering, the input power, and the like.

Next, the protective layer 816 is formed on the magnetic layer 815. As a method of forming the protective layer 816, for example, a chemical vapor deposition (CVD) method or a physical vapor deposition (PVD) method can be used.

Next, a binder, inorganic particles, a lubricant, and the like are kneaded and dispersed in a solvent to prepare a coating material for forming a back layer. Next, the back layer 818 is deposited on the back surface of the base layer 811 by applying a coating material for deposition of the back layer on the back surface of the base layer 811 and drying the coating material.

Next, for example, a lubricant is applied onto the protective layer 816 to form the lubricating layer 817. As a method of applying the lubricant, for example, various coating methods such as gravure coating, dip coating, and the like can be used. Next, the magnetic recording medium 810 is cut into a predetermined width as needed. Therefore, the magnetic recording medium 810 illustrated in FIG. 23 can be obtained.

(6) Effects

Similarly to the first embodiment, the magnetic recording cartridge according to the second embodiment can provide a magnetic recording cartridge having a high recording capacity per cartridge and capable of correcting the width in the longitudinal direction of the magnetic recording medium 810 by adjusting the running tension of the tape system or changing the winding direction even when stored in a high-temperature environment of 60° C. or more.

(7) Modified Example

The magnetic recording medium 810 may further include an underlayer between the base layer 811 and the SUL 812. Since the SUL 812 has an amorphous state, it does not play a role of promoting epitaxial growth of a layer formed on the SUL 812, but is required not to disturb the crystal orientation of the first and second underlayers 814A and 814B formed on the SUL 812. For this reason, it is preferable that the soft magnetic material has a fine structure that does not form a column, but in a case where the influence of the release of gas such as moisture or the like from the base layer 811 is large, the soft magnetic material becomes coarse, and there is a possibility that the crystal orientation of the first and second underlayers 814A and 814B formed on the SUL 812 is disturbed. In order to suppress the influence of the release of gas such as moisture or the like from the base layer 811, it is preferable to provide an underlayer containing an alloy containing Ti and Cr and having an amorphous state between the base layer 811 and the SUL 812 as described above. As a specific configuration of the underlayer, a configuration similar to that of the first seed layer 813A of the second embodiment can be adopted.

The magnetic recording medium 810 may not include at least one layer of the second seed layer 813B and the second underlayer 814B. However, from the viewpoint of improving the SNR, it is more preferable to include both the second seed layer 813B and the second underlayer 814B.

The magnetic recording medium 810 may include an antiparallel coupled SUL (APC-SUL) instead of the single-layer SUL.

(8) Another Example of Magnetic Recording Medium (Configuration of Another Example of Magnetic Recording Medium)

Figure 25:
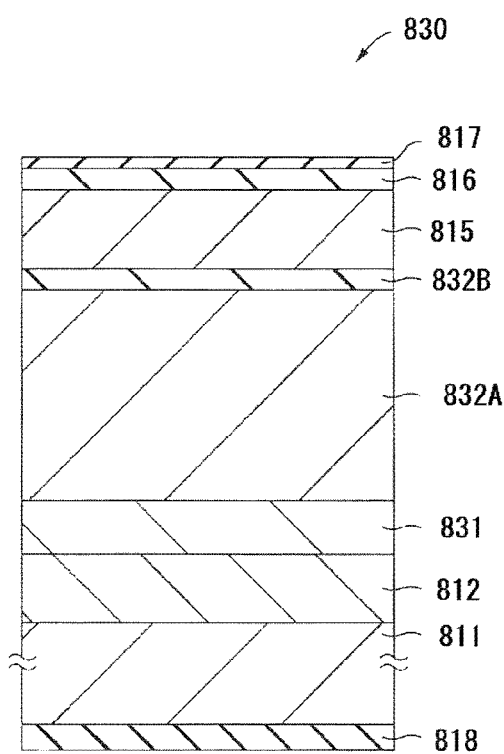
FIG. 25 is a cross-sectional view illustrating a configuration of another example of a magnetic recording medium according to a second embodiment.
Figure 26:
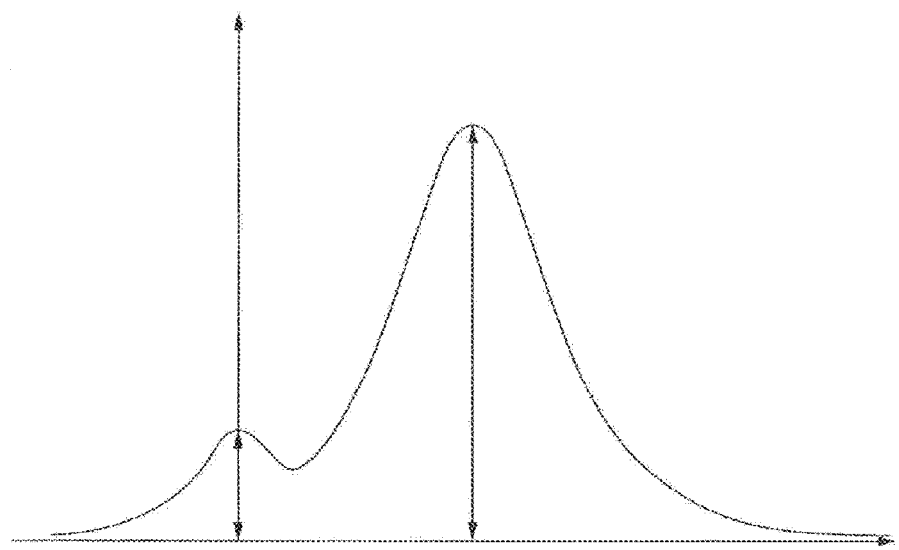
FIG. 26 is a graph illustrating an example of an SFD curve.

The magnetic recording cartridge 10 may include a magnetic recording medium 830 described below instead of the magnetic recording medium 810. As illustrated in FIG. 25, the magnetic recording medium 830 includes a base layer 811, an SUL 812, a seed layer 831, a first underlayer 832A, a second underlayer 832B, and a magnetic layer 815. Note that, regarding the description of the magnetic recording medium 830, the same configurations as those of the magnetic recording medium 810 are denoted by the same reference signs, and the description thereof will be omitted.

The SUL 812, the seed layer 831, and the first and second underlayers 832A and 832B are provided between one principal plane of the base layer 811 and the magnetic layer 815, and the SUL 812, the seed layer 831, the first underlayer 832A, and the second underlayer 832B are laminated in order from the base layer 811 toward the magnetic layer 815.

(Seed Layer)

The seed layer 831 contains Cr, Ni, and Fe and has a face-centered cubic lattice (fcc) structure, and a (111) plane of the face-centered cubic structure is preferentially oriented so as to be parallel to the surface of the base layer 811. Here, the preferential orientation means a state in which a diffraction peak intensity from the (111) plane of the face-centered cubic lattice structure is larger than diffraction peaks from other crystal planes in the θ-2θ scan of an X-ray diffraction method, or a state in which only the diffraction peak intensity from the (111) plane of the face-centered cubic lattice structure is observed in the θ-2θ scan of the X-ray diffraction method.

An intensity ratio of the X-ray diffraction of the seed layer 831 is preferably 60 cps/nm or more, more preferably 70 cps/nm or more, and still more preferably 80 cps/nm or more, from the viewpoint of improving the SNR. Here, the intensity ratio of the X-ray diffraction of the seed layer 831 is a value (I/D (cps/nm)) determined by dividing an intensity I (cps) of the X-ray diffraction of the seed layer 831 by an average thickness D (nm) of the seed layer 831.

Cr, Ni, and Fe contained in the seed layer 831 preferably have an average composition represented by the following Formula (2).

$$Cr_X(Ni_YFe_{100-Y})_{100-X} \qquad (2)$$

(Here, in Formula (2), X is 10≤X≤45, and Y is within a range of 60≤Y≤90.) When X is within the range described above, the (111) orientation of the face-centered cubic lattice structure of Cr, Ni, and Fe can be improved, and a more excellent SNR can be obtained. Similarly, when Y is within the range described above, the (111) orientation of the face-centered cubic lattice structure of Cr, Ni, and Fe can be improved, and a more excellent SNR can be obtained.

An average thickness of the seed layer 831 is preferably 5 nm or more and 40 nm or less. When the average thickness of the seed layer 831 is within the range, the (111) orientation of the face-centered cubic lattice structure of Cr, Ni, and Fe is improved, and a more excellent SNR can be obtained. Note that the average thickness of the seed layer 831 is determined in a manner similar to that of the magnetic layer 43 in the first embodiment. However, magnification of the TEM image is appropriately adjusted according to the thickness of the seed layer 831.

(First and Second Underlayers)

The first underlayer 832A contains Co and O having a face-centered cubic lattice structure, and has a column (columnar crystal) structure. In the first underlayer 832A containing Co and O, an effect (function) substantially similar to that of the second underlayer 832B containing Ru can be obtained. A concentration ratio of an average atomic concentration of O to an average atomic concentration of Co ((average atomic concentration of O)/(average atomic concentration of Co)) is 1 or more. When the concentration ratio is 1 or more, the effect of providing the first underlayer 832A can be improved, and a more excellent SNR can be obtained.

The column structure is preferably inclined from the viewpoint of improving the SNR. The direction of the inclination is preferably the longitudinal direction of the elongated magnetic recording medium 830. The reason why the longitudinal direction is preferable is as follows. The magnetic recording medium 830 is a so-called magnetic recording medium for linear recording, and a recording track is parallel to the longitudinal direction of the magnetic recording medium 830. Furthermore, the magnetic recording medium 830 is also a so-called perpendicular magnetic recording medium, and from the viewpoint of recording characteristics, it is preferable that the crystal orientation axis of the magnetic layer 815 is in the vertical direction. However, there is a case where the crystal orientation axis of the magnetic layer 815 is inclined due to the influence of the inclination of the column structure of the first underlayer 832A. In the magnetic recording medium 830 for linear recording, the configuration in which the crystal orientation axis of the magnetic layer 815 is inclined in the longitudinal direction of the magnetic recording medium 830 due to the head magnetic field at the time of recording can reduce the influence on the recording characteristics due to the inclination of the crystal orientation axis as compared with the configuration in which the crystal orientation axis of the magnetic layer 815 is inclined in the width direction of the magnetic recording medium 830. In order to incline the crystal orientation axis of the magnetic layer 815 in the longitudinal direction of the magnetic recording medium 830, it is preferable to set the inclination direction of the column structure of the first underlayer 832A to the longitudinal direction of the magnetic recording medium 830 as described above.

An inclination angle of the column structure is preferably more than 0° and 60° or less. If the inclination angle is in a range of more than 0° and 60° or less, the change in the tip shape of the column included in the first underlayer 832A is large and becomes substantially triangular, such that the effect of the granular structure is enhanced, noise is reduced, and the SNR tends to be improved. On the other hand, if the inclination angle exceeds 60°, the change in the tip shape of the column included in the first underlayer 832A is small, and the column hardly has a substantially triangular shape, such that the low noise effect tends to be weakened.

An average particle size of the column structure is 3 nm or more and 13 nm or less. If the average particle size is less than 3 nm, the average particle size of the column structure included in the magnetic layer 815 is small, and thus the ability of the current magnetic material to hold recording may be deteriorated. On the other hand, if the average particle size is 13 nm or less, noise can be suppressed, and a more excellent SNR can be obtained.

An average thickness of the first underlayer 832A is preferably 10 nm or more and 150 nm or less. If the average thickness of the first underlayer 832A is 10 nm or more, the (111) orientation of the face-centered cubic lattice structure of the first underlayer 832A can be improved, and a more excellent SNR can be obtained. On the other hand, if the average thickness of the first underlayer 832A is 150 nm or less, it is possible to suppress an increase in the particle size of the column. Therefore, the noise can be suppressed, and a more excellent SNR can be obtained. Note that the average thickness of the first underlayer 832A is determined in a manner similar to that of the magnetic layer 43 in the first embodiment. However, magnification of the TEM image is appropriately adjusted according to the thickness of the first underlayer 832A.

The second underlayer 832B preferably has a crystal structure similar to that of the magnetic layer 815. In a case where the magnetic layer 815 contains a Co-based alloy, it is preferable that the second underlayer 832B contains a material having a hexagonal close-packed (hcp) structure similar to that of the Co-based alloy, and a c-axis of the structure is oriented in a direction perpendicular to the film surface (that is, a film thickness direction). This is because the orientation of the magnetic layer 815 can be enhanced, and a lattice constant matching between the second underlayer 832B and the magnetic layer 815 can be relatively preferable. As the material having a hexagonal close-packed structure, a material containing Ru is preferably used, and specifically, Ru alone or a Ru alloy is preferable. Examples of the Ru alloy include Ru alloy oxides such as Ru—$SiO_2$, Ru—$TiO_2$, Ru—$ZrO_2$, and the like.

An average thickness of the second underlayer 832B may be thinner than the underlayer (for example, an underlayer containing Ru) in a general magnetic recording medium, and can be, for example, 1 nm or more and 5 nm or less. Since the seed layer 831 and the first underlayer 832A having the configuration described above are provided below the second underlayer 832B, an excellent SNR can be obtained even if the average thickness of the second underlayer 832B is thin as described above. Note that the average thickness of the second underlayer 832B is determined in a manner similar to that of the magnetic layer 43 in the first embodiment. However, magnification of the TEM image is appropriately adjusted according to the thickness of the second underlayer 832B.

Effect

Even in a case where the magnetic recording medium 810 is used instead of the magnetic recording medium 830, similarly to the first embodiment, the magnetic recording cartridge according to the second embodiment can provide a magnetic recording cartridge capable of correcting the width in the longitudinal direction of the magnetic recording medium 830 by adjusting the running tension of the tape system or changing the winding direction even when stored in a high-temperature environment of 60° C. or more.

The magnetic recording medium 830 includes the seed layer 831 and the first underlayer 832A between the base layer 811 and the second underlayer 832B. The seed layer 831 contains Cr, Ni, and Fe and has a face-centered cubic lattice structure, and a (111) plane of the face-centered cubic structure is preferentially oriented so as to be parallel to the surface of the base layer 811. The first underlayer 832A has a column structure containing Co and O, in which a ratio of an average atomic concentration of O to an average atomic concentration of Co is 1 or more, and an average particle size is 3 nm or more and 13 nm or less. Therefore, it is possible to realize a magnetic layer 815 having good crystal orientation and high coercive force without using Ru, which is an expensive material, as much as possible by reducing the thickness of the second underlayer 832B.

Ru contained in the second underlayer 832B has the same hexagonal close-packed lattice structure as Co which is a main component of the magnetic layer 815. Therefore, Ru has an effect of achieving both improvement in crystal orientation of the magnetic layer 815 and granularity promotion. Furthermore, in order to further improve the crystal orientation of Ru contained in the second underlayer 832B, the first underlayer 832A and the seed layer 831 are provided under the second underlayer 832B. In the magnetic recording medium 830, an effect (function) substantially similar to that of the second underlayer 832B containing Ru is realized by the first underlayer 832A containing inexpensive CoO having a face-centered cubic lattice structure. Therefore, the thickness of the second underlayer 832B can be reduced. Furthermore, in order to enhance the crystal orientation of the first underlayer 832A, a seed layer 831 containing Cr, Ni, and Fe is provided.

4. Examples

Hereinafter, the present technology will be described in detail with reference to Examples, but the present technology is not limited only to these Examples.

In the following Examples and Comparative Examples, the loss modulus of the base layer of the magnetic tape is a value obtained by the measurement method described in the first embodiment.

[Variation in Width]

The variation in width was obtained by the measurement method described in the first embodiment.

Example 1

(Step of Preparing Magnetic Layer Forming Coating Material)

A magnetic layer forming coating material was prepared as follows. First, a first composition having the following formulation was kneaded with an extruder. Next, the kneaded first composition and a second composition having the following formulation were added to a stirring tank equipped with a disperser and premixing was performed. Subsequently, dyno mill mixing was further performed and filter treatment was performed to prepare the magnetic layer forming coating material.

(First Composition)
  barium ferrite ($BaFe_{12}O_{19}$) magnetic powder: 100 parts by mass
  (hexagonal plate shape, average aspect ratio: 3.0, average particle volume: 1600 $nm^3$)
  polyurethane-based resin (number average molecular weight Mn: 25,000, Tg: 110° C.): 52 parts by mass
  (resin solution: resin content 30 mass %, cyclohexanone 70 mass %)
  aluminum oxide powder: 5 parts by mass
  ($\alpha$-$Al_2O_3$, average particle size 0.1 μm)
  carbon black: 2 parts by mass
  (manufactured by Tokai Carbon Co., Ltd., trade name: SEAST TA)

(Second Composition)
  polyurethane-based resin (number average molecular weight Mn: 25,000, Tg: 110° C.): 4.7 parts by mass
  (resin solution: resin content 30 mass %, cyclohexanone 70 mass %)
  n-butyl stearate: 2 parts by mass
  methyl ethyl ketone: 121.3 parts by mass
  toluene: 121.3 parts by mass
  cyclohexanone: 60.7 parts by mass Finally, 3.4 parts by mass of polyisocyanate (trade name: Coronate L, manufactured by Tosoh Corporation) as a curing agent and 2 parts by mass of stearic acid were added to the magnetic layer forming coating material prepared as described above.

(Step of Preparing Underlayer Forming Coating Material)

An underlayer forming coating material was prepared as follows. First, a third composition having the following formulation was kneaded with an extruder. Next, the kneaded third composition and a fourth composition having the following formulation were added to a stirring tank equipped with a disperser and premixing was performed. Subsequently, dyno mill mixing was further performed and filter treatment was performed to prepare the underlayer forming coating material.

(Third Composition)
  acicular iron oxide powder: 100 parts by mass
  ($\alpha$-$Fe_2O_3$, average long axis length 0.12 μm)
  polyurethane-based resin (Tg: 110° C.): 55.6 parts by mass
  (resin solution: resin content 30 mass %, cyclohexanone 70 mass %)
  carbon black: 10 parts by mass
  (average particle size 20 nm)

(Fourth Composition)
  polyurethane-based resin (Tg: 110° C.): 18.5 parts by mass (resin solution: resin content 30 mass %, cyclohexanone 70 mass %)
n-butyl stearate: 2 parts by mass
methyl ethyl ketone: 108.2 parts by mass
toluene: 108.2 parts by mass
cyclohexanone: 18.5 parts by mass Finally, 4.45 parts by mass of polyisocyanate (trade name: Coronate L, manufactured by Tosoh Corporation) as a curing agent and 2 parts by mass of stearic acid were added to the underlayer forming coating material prepared as described above.

(Step of Preparing Back Layer Forming Coating Material)

A back layer forming coating material was prepared as follows. The following raw materials were mixed in a stirring tank equipped with a disperser and subjected to filter treatment to prepare the back layer forming coating material.
carbon black (manufactured by Asahi Carbon Co., Ltd., trade name: #80): 100 parts by mass
polyester polyurethane: 100 parts by mass
(manufactured by Nippon Polyurethane Industry Co., Ltd., trade name: N-2304)
methyl ethyl ketone: 500 parts by mass
toluene: 400 parts by mass
cyclohexanone: 100 parts by mass (Film Forming Step)

Using the coating material prepared as described above, an underlayer (hereinafter, also referred to as "lower layer" in Table 1) was formed on a long polyethylene terephthalate film (hereinafter, referred to as a "PET film".) as a non-magnetic support (base layer) so that the average thickness after the calender treatment was 1.33 μm, and moreover, a magnetic layer (hereinafter, also referred to as "upper layer" in Table 1) was formed as follows so that the total average thickness $t_m$ after the calender treatment was 1.40 μm. First, the underlayer forming coating material was applied onto the film to be dried to form the underlayer on the film. Next, the magnetic layer forming coating material was applied onto the underlayer and dried to form the magnetic layer on the underlayer. Note that when drying the magnetic layer forming coating material, magnetic field orientation of the magnetic powder in the thickness direction of the film was performed by a solenoid coil. Furthermore, application time of the magnetic field to the magnetic layer forming coating material was adjusted, and squareness ratio S2 of the magnetic tape in the thickness direction (perpendicular direction) was set to 65%.

Subsequently, the back layer was applied to the film on which the underlayer and the magnetic layer were formed so that the average thickness $t_b$ after the calender treatment was 0.30 μm, and dried. Then, the film on which the underlayer, the magnetic layer, and the back layer were formed was subjected to a curing treatment. Subsequently, calender treatment was performed to smooth the surface of the magnetic layer. At this time, the condition (temperature) of the calender treatment was adjusted so that an interlayer friction coefficient μ between the magnetic surface and the back surface was about 0.5, and re-curing treatment was performed to obtain a magnetic tape having an average thickness $t_T$ of 5.3 μm.

(Cutting Step)

The magnetic tape obtained as described above was cut into a width of ½ inch (12.65 mm), and wound around a core to obtain a pancake.

The magnetic tape obtained as described above had characteristics shown in Table 1. For example, the loss modulus at 65° C. of the base layer of the magnetic tape was 0.07 GPa.

Figure 28:
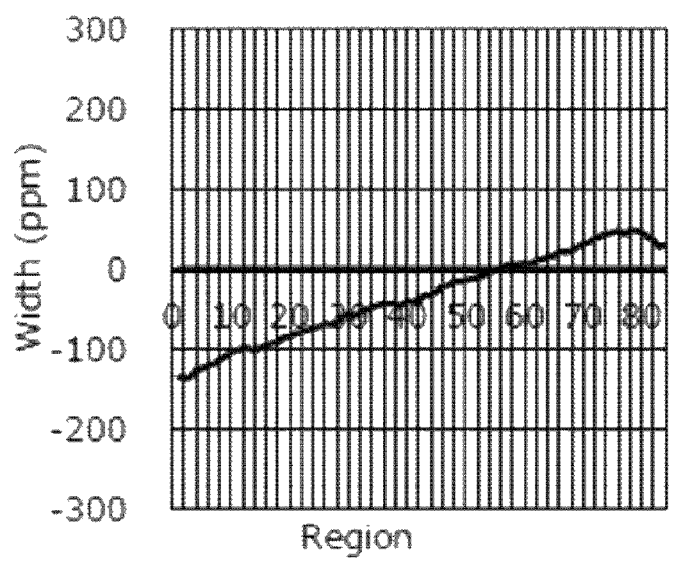
FIG. 28 is a diagram showing a variation in width in a longitudinal direction of a magnetic tape after storage at 65° C. for 360 hours according to Example 1.

The magnetic tape having a width of ½ inches was wound around a reel provided in a cartridge case to obtain a magnetic recording cartridge. A servo pattern was recorded on the magnetic tape. Rows of V-shaped servo frames were included in the servo pattern, and the servo frames were recorded in advance in two or more rows in parallel in the longitudinal direction at known intervals. After storage at 65° C. and 40 RH % for 360 hours in a state where the magnetic tape was wound around the magnetic recording cartridge at a tension of 0.55 N, the servo band pitch was measured while the magnetic tape accommodated in the magnetic recording cartridge was caused to run so as to be wound around the magnetic recording and reproducing apparatus (so-called running in the forward direction). Furthermore, for the magnetic tape accommodated in the magnetic recording cartridge in the initial state before storage, the servo band pitch in the longitudinal direction was similarly measured, and the variation in width represented by a ratio between a servo band pitch after storage and a servo band pitch in the initial state was calculated. The results are illustrated in FIG. 28. In FIG. 28, the horizontal axis represents a position in the longitudinal direction of the magnetic tape. In FIG. 28, a position of an end portion on an outer peripheral side (outer side of winding) (BOT) of the magnetic tape wound around the tape reel was set to 0, a position of an end portion on an inner peripheral side (inner side of winding) (hereinafter, also referred to as EOT) of the magnetic tape wound around the tape reel was set to 84, and an entire length of the magnetic tape was divided into eighty four equal parts. In FIG. 28, the vertical axis represents a variation in width after storage at 65° C. and 40 RH % for 360 hours, and represents width after storage/width before storage. In FIG. 28, in a case where the variation in width indicates a negative value, it means that the width of the magnetic tape is narrower after storage than before storage, and in a case where the variation in width shows a positive value, it means that the width of the magnetic tape is wider after storage than before storage. Note that, also in FIGS. 29 to 39, the description of FIG. 28 applies to the horizontal axis and the vertical axis. As illustrated in FIG. 28, the variations in width on the outer side of winding at positions 0 to 20 were negative values, the variations in width on the inner side of winding at positions 60 to 84 were positive values, and the variations in width were 0 ppm between positions 55 to 56.

Example 2

Figure 29:
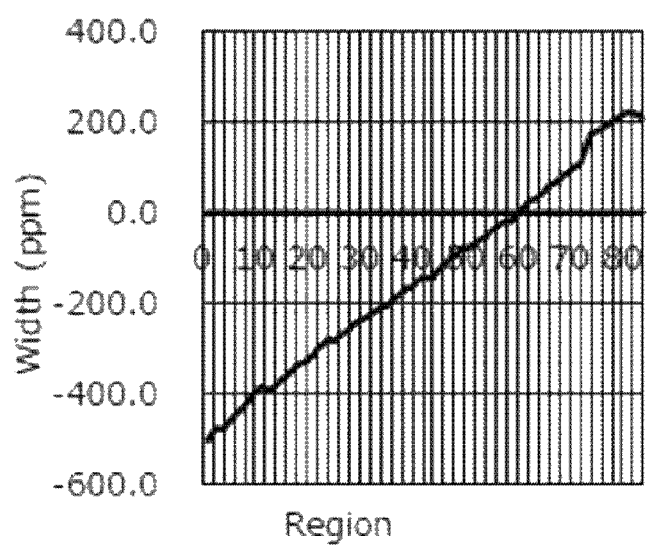
FIG. 29 is a diagram showing a variation in width in a longitudinal direction of a magnetic tape after storage at 65° C. for 360 hours according to Example 2.
Figure 30:
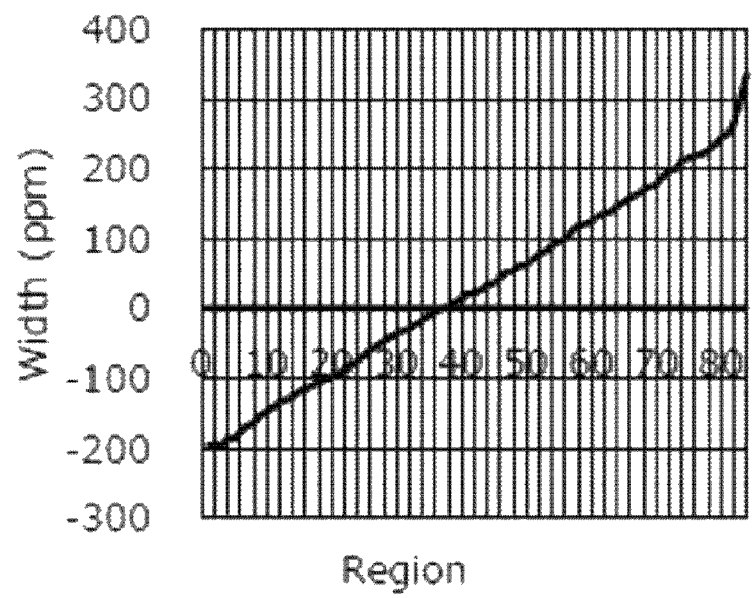
FIG. 30 is a diagram showing a variation in width in a longitudinal direction of a magnetic tape after storage at 65° C. for 360 hours according to Example 3.

A magnetic tape was obtained by the same method as in Example 1 except that a polyethylene naphthalate film (hereinafter, referred to as a "PEN film".) was used as a base layer material. In the same manner as in Example 1, a magnetic recording cartridge was manufactured using the magnetic tape, and then a servo pattern was recorded on the magnetic tape. FIG. 29 illustrates a result of the variations in width in the longitudinal direction of the magnetic tape. As illustrated in FIG. 29, the variations in width on the outer side of winding at positions 0 to 20 were negative values, the variations in width on the inner side of winding at positions 60 to 84 were positive values, and the variations in width were 0 ppm between positions 59 to 60.

Example 3

Figure 31:
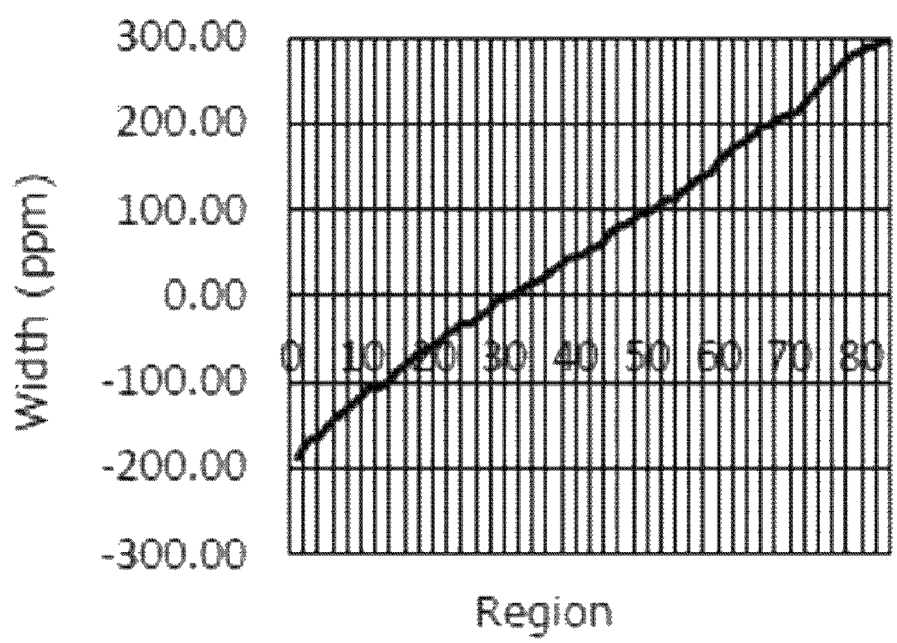
FIG. 31 is a diagram showing a variation in width in a longitudinal direction of a magnetic tape after storage at 65° C. for 360 hours according to Example 4.

A magnetic tape was obtained by the same method as in Example 1 except that a polyether ether ketone film (hereinafter, referred to as a "PEEK film".) was used as a base layer material, the average thickness of the base layer was changed to 4.0 μm, the average thickness of the upper and lower layers was changed to 1.2 μm, the average thickness of the back layer was changed to 0.4 μm, and the average total thickness was changed to 5.6 μm. In the same manner as in Example 1, a magnetic recording cartridge was manufactured using the magnetic tape, and then a servo pattern was recorded on the magnetic tape. FIG. 31 illustrates a result of the variations in width in the longitudinal direction of the magnetic tape. As illustrated in FIG. 31, the variations in width on the outer side of winding at positions 0 to 20 were negative values, the variations in width on the inner side of winding at positions 60 to 84 were positive values, and the variations in width were 0 ppm between positions 37 to 38.

Example 4

(SUL Film Forming Step)

First, under the following film forming conditions, a CoZrNb layer (SUL) having an average thickness of 10 nm was formed on a surface of a long polymer film as a non-magnetic support. Note that a PEN film was used as the polymer film.
 Film forming method: DC magnetron sputtering method
 Target: CoZrNb target
 Gas type: Ar
 Gas pressure: 0.1 Pa
(First Seed Layer Forming Step)

Next, a TiCr layer (first seed layer) having an average thickness of 5 nm was formed on the CoZrNb layer under the following film forming conditions.
 Sputtering method: DC magnetron sputtering method
 Target: TiCr target
 Ultimate degree of vacuum: $5 \times 10^{-5}$ Pa
 Gas type: Ar
 Gas pressure: 0.5 Pa
(Second Seed Layer Forming Step)

Next, a NiW layer (second seed layer) having an average thickness of 10 nm was formed on the TiCr layer under the following film forming conditions.
 Sputtering method: DC magnetron sputtering method
 Target: NiW target
 Ultimate degree of vacuum: $5 \times 10^{-5}$ Pa
 Gas type: Ar
 Gas pressure: 0.5 Pa
(First Underlayer Forming Step)

Next, a Ru layer (first underlayer) having an average thickness of 0.1 μm was formed on the NiW layer under the following film forming conditions.
 Sputtering method: DC magnetron sputtering method
 Target: Ru target
 Gas type: Ar
 Gas pressure: 0.5 Pa
(Second Underlayer Forming Step)

Next, on the Ru layer, a Ru layer (second underlayer) having an average thickness of 0.1 μm was formed under the following film forming conditions.
 Sputtering method: DC magnetron sputtering method
 Target: Ru target
 Gas type: Ar
 Gas pressure: 1.5 Pa
(Magnetic Layer Forming Step)

Next, a (CoCrPt)—(SiO$_2$) layer (magnetic layer) having an average thickness of 12 nm was formed on the Ru layer under the following film forming conditions.
 Film forming method: DC magnetron sputtering method
 Target: (CoCrPt)—(SiO$_2$) target
 Gas type: Ar
 Gas pressure: 1.5 Pa
(Protective Layer Forming Step)

Next, a carbon layer (protective layer) having an average thickness of 5 nm was formed on the magnetic layer under the following film forming conditions.
 Film forming method: DC magnetron sputtering method
 Target: carbon target
 Gas type: Ar
 Gas pressure: 1.0 Pa
(Lubricating Layer Forming Step)

Next, a lubricant was applied onto the protective layer to form a lubricating layer.
(Back Layer Forming Step)

Next, a back layer forming coating material was applied to a plane opposite to the magnetic layer and dried to form a back layer having an average thickness $t_b$ of 0.3 μm. As a result, a magnetic tape having an average thickness $t_T$ of 4.6 μm was obtained.
(Cutting Step)

The magnetic tape obtained as described above was cut into a width of ½ inch (12.65 mm).

A magnetic recording cartridge was manufactured using the magnetic tape obtained as described above in the same manner as in Example 1, and then a servo pattern was recorded on the magnetic tape. FIG. 31 illustrates a result of the variations in width in the longitudinal direction of the magnetic tape. As illustrated in FIG. 31, the variations in width on the outer side of winding at positions 0 to 20 were negative values, the variations in width on the inner side of winding at positions 60 to 84 were positive values, and the variations in width were 0 ppm between positions 31 to 32.

Comparative Example 1

Figure 32:
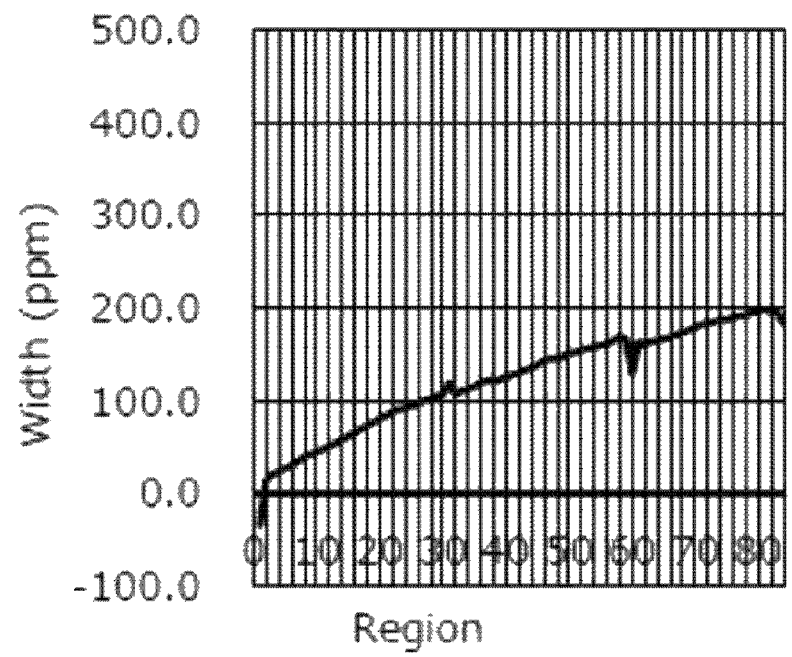
FIG. 32 is a diagram showing a variation in width in a longitudinal direction of a magnetic tape after storage at 65° C. for 360 hours according to Comparative Example 1.

A magnetic tape was obtained by the same method as in Example 2 except that the average thickness of the base layer was changed to 4.0 μm, the average thickness of the upper and lower layers was changed to 1.2 μm, the average thickness of the back layer was changed to 0.4 μm, the average total thickness was changed to 5.6 μm, a polyurethane-based resin having a Tg of 70° C. was used as the polyurethane-based resin to be blended in the magnetic layer forming coating material and the underlayer forming coating material, and polyisocyanate was not added as a curing agent to the underlayer forming coating material. In the same manner as in Example 2, a magnetic recording cartridge was manufactured using the magnetic tape, and a servo pattern was recorded on the magnetic tape. FIG. 32 illustrates a result of the variations in width in the longitudinal direction of the magnetic tape. As illustrated in FIG. 32, the variations in width on the outer side of winding at positions 0 to 20 were positive values, the variations in width on the inner side of winding at positions 60 to 84 were also positive values.

Comparative Example 2

Figure 33:
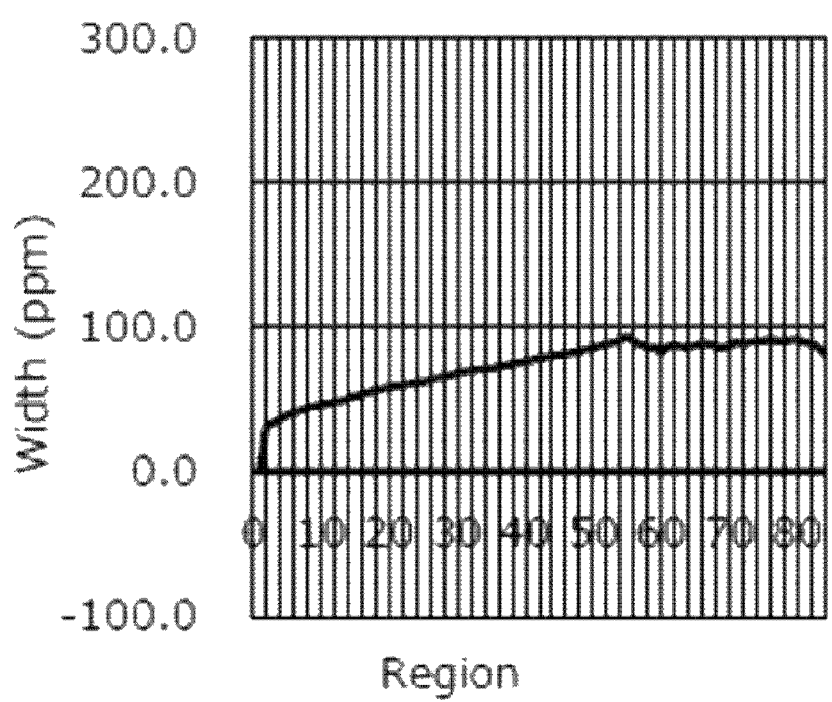
FIG. 33 is a diagram showing a variation in width in a longitudinal direction of a magnetic tape after storage at 65° C. for 360 hours according to Comparative Example 2.

A magnetic tape was obtained by the same method as in Example 1 except that the average thickness of the base layer was changed to 4.0 μm, the average thickness of the upper and lower layers was changed to 1.2 μm, the average thickness of the back layer was changed to 0.4 μm, the average total thickness was changed to 5.6 μm, a polyurethane-based resin having a Tg of 70° C. was used as the polyurethane-based resin to be blended in the magnetic layer forming coating material and the underlayer forming coating material, 1.7 parts by mass of polyisocyanate (trade name: Coronate L, manufactured by Tosoh Corporation) was added as a curing agent to the magnetic layer forming coating material, and 2.23 parts by mass of polyisocyanate (trade name: Coronate L, manufactured by Tosoh Corporation) was added as a curing agent to the underlayer forming coating material. In the same manner as in Example 1, a magnetic recording cartridge was manufactured using the magnetic tape, and then a servo pattern was recorded on the magnetic tape. FIG. 33 illustrates a result of the variations in width in the longitudinal direction of the magnetic tape. As illustrated in FIG. 33, the variations in width on the outer side of winding at positions 0 to 20 were positive values, the variations in width on the inner side of winding at positions 60 to 84 were also positive values.

Comparative Example 3

Figure 34:
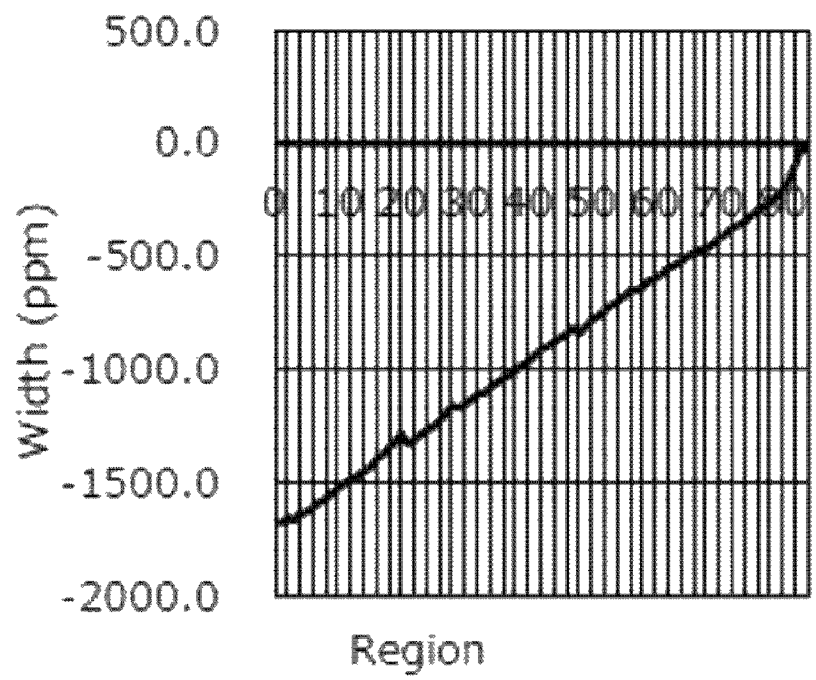
FIG. 34 is a diagram showing a variation in width in a longitudinal direction of a magnetic tape after storage at 65° C. for 360 hours according to Comparative Example 3.

A magnetic tape was obtained by the same method as in Example 2 except that a polyurethane-based resin having a Tg of 70° C. was used as the polyurethane-based resin to be blended in the magnetic layer forming coating material and the underlayer forming coating material, and polyisocyanate was not added as a curing agent to the underlayer forming coating material. In the same manner as in Example 2, a magnetic recording cartridge was manufactured using the magnetic tape, and a servo pattern was recorded on the magnetic tape. FIG. 34 illustrates a result of the variations in width in the longitudinal direction of the magnetic tape. As illustrated in FIG. 34, the variations in width on the outer side of winding at positions 0 to 20 were negative values, the variations in width on the inner side of winding at positions 60 to 84 were also negative values.

Comparative Example 4

Figure 35:
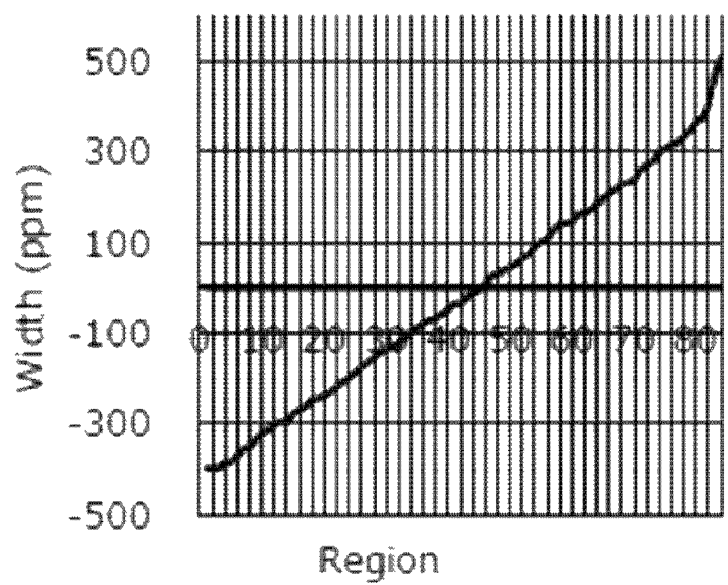
FIG. 35 is a diagram showing a variation in width in a longitudinal direction of a magnetic tape after storage at 65° C. for 360 hours according to Comparative Example 4.

A magnetic tape was obtained by the same method as in Example 2 except that an aramid film (hereinafter, referred to as an "ARAMID film".) was used as the base layer, a polyurethane-based resin having a Tg of 70° C. was used as the polyurethane-based resin to be blended in the magnetic layer forming coating material and the underlayer forming coating material, and polyisocyanate was not added as a curing agent to the underlayer forming coating material. In the same manner as in Example 2, a magnetic recording cartridge was manufactured using the magnetic tape, and a servo pattern was recorded on the magnetic tape. FIG. 35 illustrates a result of the variations in width in the longitudinal direction of the magnetic tape.

[Running Characteristics after Rewinding and Long-Term Storage]

After the magnetic recording cartridge was stored at 65° C. and 40 RH % for 2 weeks, outer winding and inner winding were reversed in a state where the magnetic tape was wound around the winding reel 32 of the magnetic recording and reproducing apparatus 30, and after further storage for 2 weeks, an entire surface of the magnetic tape was recorded and reproduced using the magnetic recording and reproducing apparatus 30, and a determination value was each given for running characteristics on the basis of the following three-stage criteria. Note that evaluations "B, C" indicate undesirable determination results. In a case where the entire surface of the magnetic tape could be recorded and reproduced, the variation in width from before storage in a width direction of a data band at a central portion in a width direction of the magnetic tape was measured, and a difference between a portion where the width was minimized and a portion where the width was maximized was calculated.

A: No abnormality occurs (no Fail occurs).
B: After running several times, the magnetic tape cannot read a servo and stops due to a system error.
C: The magnetic tape cannot read a servo and stops immediately due to a system error.

Table 1 shows the configurations and the evaluation results of the magnetic tapes of Examples 1 to 4 and Comparative Examples 1 to 4. Furthermore, FIGS. 28 to 38 are diagrams showing variations in width in the longitudinal direction of each of the magnetic tapes of Examples 1 to 4 and Comparative Examples 1 to 4.

TABLE 1

| | Base layer material | Base thickness (μm) | Magnetic layer thickness, under layer thickness (μm) | Back thickness (μm) | Total thickness (μm) | Magnetic layer, under layer curing agent Tg (° C.) | Magnetic layer, under layer curing agent | Base layer loss modulus at 65° C. | Variation in width Δ after storage at 65° C. for 360 hours Outer side of winding (minimum width ppm) |
|---|---|---|---|---|---|---|---|---|---|
| Example 1 | PET | 3.6 | 1.4 | 0.3 | 5.3 | 110.0 | 20PHR/20PHR | 0.07 | −136 |
| Example 2 | PEN | 3.6 | 1.4 | 0.3 | 5.3 | 110.0 | 20PHR/20PHR | 0.36 | −486 |
| Example 3 | PEEK | 4.0 | 1.2 | 0.4 | 5.6 | 110.0 | 20PHR/20PHR | 0.04 | −194 |
| Example 4 | PEN | 4.2 | 0.1 | 0.3 | 4.6 | — | — | 0.36 | −189 |
| Comparative Example 1 | PEN | 4.0 | 1.2 | 0.4 | 5.6 | 70.0 | 20PHR/0PHR | 0.36 | −34 |
| Comparative Example 2 | PET | 4.0 | 1.2 | 0.4 | 5.6 | 70.0 | 10PHR/10PHR | 0.07 | −0 |
| Comparative Example 3 | PEN | 3.6 | 1.4 | 0.3 | 5.3 | 70.0 | 20PHR/0PHR | 0.36 | −1657 |
| Comparative Example 4 | ARAMID | 3.6 | 1.4 | 0.3 | 5.3 | 70.0 | 20PHR/0PHR | 0.45 | −397 |

TABLE 1-continued

| | Variation in width Δ after storage at 65° C. for 360 hours | | | Running characteristics after rewinding | Average of ¼ outer winding A region Average of 1 to 21 | B region Average of 22 to 42 | C region Average of 43 to 63 | Average of ¼ inner winding D region Average of 64 to 84 |
|---|---|---|---|---|---|---|---|---|
| | Inner side of winding (maximum width ppm) | Maximum width − minimum width | Variation in width 0 position | and long-term storage Whether or not Fail occurs (maximum − minimum difference) | | | | |
| Example 1 | 49 | 185 | 55-56 | A (98 ppm) | −107 | −56 | −7 | 35 |
| Example 2 | 215 | 701 | 59-60 | A (340 ppm) | −404 | −224 | −59 | 143 |
| Example 3 | 335 | 529 | 37-38 | A (202 ppm) | −146 | −29 | 84 | 211 |
| Example 4 | 296 | 485 | 31-32 | A (245 ppm) | −115 | 5 | 114 | 248 |
| Comparative Example 1 | 196 | 230 | 1-2 | B | 46 | 110 | 153 | 185 |
| Comparative Example 2 | 91 | 91 | None | B | 45 | 69 | 85 | 88 |
| Comparative Example 3 | −26 | 1631 | None | C | −1504 | −1116 | −723 | −323 |
| Comparative Example 4 | 508 | 905 | 45-46 | B | −318 | −121 | 78 | 302 |

Note that each symbol in Table 1 means the following measured value.

$t_T$: average thickness of magnetic tape (unit: μm)

$t_m$: average thickness of magnetic layer (unit: nm)

$t_b$: average thickness of back layer (unit: μm)

The following can be seen from the results shown in Table 1.

All of the magnetic tapes of Examples 1 to 4 were stored in an environment of 65° C. and 40 RH % for 2 weeks, then rewound so as to reverse the outer winding and the inner winding, further stored in the above environment for 2 weeks, and then subjected to entire surface reproduction by the recording and reproducing apparatus. As a result, the evaluation of running characteristics was A, no Fail occurred, and good running characteristics were exhibited. Therefore, it can be seen that the magnetic recording cartridge according to the present technology is suitable for storage and use in a high-temperature environment of 60° C. or more.

From the results of the variations in tape width in the longitudinal direction for Example 1 and Comparative Example 2, it can be seen that since the sign of variation in width Lout on the outer side of winding is different from the sign of variation in width Δin on the inner side of winding, the magnetic recording tape can improve running characteristics due to the rewinding and long-term storage.

From a comparison between Example 2 and Comparative Example 3, it can be seen that when (variation in width Δin on inner side of winding)−(variation in width Lout on outer side of winding) after storage at 65° C. for 360 hours is 800 ppm or less, running characteristics due to the rewinding and long-term storage can be improved.

From a comparison between Example 2 and Comparative Example 1, it can be seen that when the entire length of the magnetic tape in the longitudinal direction is taken as 100%, at 59 to 60 included at a position of 25% to 75% from the outer side end portion of winding, the variation in width Δ of the magnetic recording medium after storage at 65° C. for 360 hours is 0 ppm, whereby running characteristics due to the rewinding and long-term storage can be improved.

From a comparison between Example 2 and Comparative Example 4, it can be seen that the loss modulus at 65° C. of the base layer is 0.40 GPa or less, whereby running characteristics due to the rewinding and long-term storage can be improved.

From a comparison of the results of Example 4 with the results of the other Examples, it can be seen that even a vacuum thin film type (sputter type) magnetic recording tape can obtain the similar evaluation results as those of a coating type magnetic recording tape.

Although the embodiments and the Examples of the present technology are specifically described above, the present technology is not limited to the embodiments and Examples described above and various modifications based on the technical idea of the present technology may be made.

For example, configurations, methods, steps, shapes, materials, numerical values, and the like described in the embodiments and Examples described above are merely examples, and different configurations, methods, steps, shapes, materials, numerical values, and the like may be used as needed. Furthermore, the chemical formulae of compounds and the like are representative and are not limited to the listed valences and the like as long as they are common names of the same compound.

Furthermore, the configurations, methods, steps, shapes, materials, numerical values, and the like of the embodiments and Examples described above can be combined with each other without departing from the gist of the present technology.

Furthermore, in the present specification, a numerical value range indicated by using "to" indicates a range including numerical values described before and after "to" as the minimum value and the maximum value, respectively. In the numerical value range described in stages in the present specification, an upper limit value or a lower limit value of a numerical value range of a certain stage may be replaced with the upper limit value or the lower limit value of the numerical value range of another stage. The materials exemplified in the present specification may be used alone or in combination of two or more thereof unless otherwise specified.

Note that the present technology may also have following configurations.

[1] A magnetic recording cartridge including:
a magnetic recording medium having a base layer; and
a reel,
in which
a loss modulus at 65° C. of the base layer is 0.40 GPa or less,
the magnetic recording medium is wound around the reel, and
when a variation in width is measured over an entire length of the magnetic recording medium after storage at 65° C. for 360 hours,
a sign of variation in width Δout on an outer side of winding is different from a sign of variation in width Δin on an inner side of winding, and
the variation in width is 0 ppm at any position of two portions sandwiching a center line of the entire length of the magnetic recording medium in a case where the entire length of the magnetic recording medium is divided into four portions by dividing into four equal parts.

[2] The magnetic recording cartridge according to [1], in which the variation in width Δin is a positive value, and the variation in width Δout is a negative value.

[3] The magnetic recording cartridge described in [1] or [2], in which when an entire length of the magnetic recording medium in a longitudinal direction is taken as 100%, at a position of 25% to 75% from an outer side end portion of winding, a variation in width Δ of the magnetic recording medium after storage at 65° C. for 360 hours is 0 ppm.

[4] The magnetic recording cartridge according to any one of [1] to [3], in which (the variation in width Δin)−(the variation in width Δout) is 800 ppm or less.

[5] The magnetic recording cartridge according to any one of [1] to [4], in which a storage modulus of the base layer is 8.0 GPa or less.

[6] The magnetic recording cartridge according to any one of [1] to [5], in which the base layer includes polyethylene terephthalate (PET), polyethylene naphthalate (PEN), or polyetheretherketone (PEEK).

[7] The magnetic recording cartridge according to any one of [1] to [6], in which an average thickness $t_T$ of the magnetic recording medium is 5.6 μm or less.

[8] The magnetic recording cartridge according to any one of [1] to [6], in which an average thickness $t_T$ of the magnetic recording medium is 5.4 μm or less.

[9] The magnetic recording cartridge according to any one of [1] to [8], in which an average thickness $t_B$ of the base layer is 5.0 μm or less.

[10] The magnetic recording cartridge according to any one of [1] to [8], in which an average thickness $t_B$ of the base layer is 4.6 μm or less.

[11] The magnetic recording cartridge according to any one of [1] to [10], in which the magnetic recording medium includes a magnetic layer, and
the magnetic layer contains magnetic powder.

[12] The magnetic recording cartridge according to any one of [1] or [10], in which the magnetic recording medium includes a magnetic layer, and
the magnetic layer is a sputtered layer.

[13] A magnetic recording medium, in which
the magnetic recording medium is accommodated in a magnetic recording cartridge in a state of being wound around a reel of the magnetic recording cartridge,
when a variation in width is measured over an entire length after storage at 65° C. for 360 hours in the state of being wound around the reel,
a sign of variation in width Δout on an outer side of winding is different from a sign of variation in width Δin on an inner side of winding, and
the variation in width is 0 ppm at any position of two portions sandwiching a center line of the entire length in a case where the entire length is divided into four portions by dividing into four equal parts, and
the magnetic recording medium has a base layer having a loss modulus at 65° C. of 0.40 GPa or less.

REFERENCE SIGNS LIST

1 Magnetic recording medium
10 Magnetic recording cartridge
13 Tape reel
41 Base layer
42 Underlayer
43 Magnetic layer
44 Back layer

The invention claimed is:

1. A magnetic recording medium comprising:
a base layer having a loss modulus at 65° C. of 0.40 GPa to 0.01 GPa,
wherein the magnetic recording medium is configured to be accommodated in a magnetic recording cartridge in a state of being wound around a reel of the magnetic recording cartridge,
when a variation in width is measured over an entire length after storage at 65° C. for 360 hours in the state of being wound around the reel,
a sign of variation in width Δout on an outer side of winding is a positive sign or a negative sign and a different sign from a sign of variation in width Δin on an inner side of winding, and
the variation in width is 0 ppm at any position of two portions that are positioned opposite each other with respect to a center line of the entire length in a case where the entire length is divided into four portions by dividing into four equal parts.

2. A magnetic recording cartridge comprising:
a magnetic recording medium having a base layer; and
a reel, wherein
a loss modulus at 65° C. of the base layer is 0.40 GPa to 0.01 GPa, the magnetic recording medium is wound around the reel, and
when a variation in width is measured over an entire length of the magnetic recording medium after storage at 65° C. for 360 hours,
a sign of variation in width Δout on an outer side of winding is a positive sign or a negative sign and a different sign from a sign of variation in width Δin on an inner side of winding, and
the variation in width is 0 ppm (parts per million) at any position of two portions that are positioned opposite each other with respect to a center line of the entire length of the magnetic recording medium in a case where the entire length of the magnetic recording medium is divided into four portions by dividing into four equal parts.

3. The magnetic recording cartridge according to claim 2, wherein the variation in width Δin is a positive value, and the variation in width Δout is a negative value.

4. The magnetic recording cartridge according to claim 2, wherein when the entire length of the magnetic recording medium in a longitudinal direction is taken as 100%, at a position of 25% to 75% from an outer side end portion of winding, a variation in width Δ of the magnetic recording medium after storage at 65° C. for 360 hours is 0 ppm (parts per million).

5. The magnetic recording cartridge according to claim 2, wherein (the variation in width Δin)−(the variation in width Δout) is 800 ppm (parts per million) or less.

6. The magnetic recording cartridge according to claim 2, wherein a storage modulus at 65° C. of the base layer is 8.0 GPa to 0.01 GPa.

7. The magnetic recording cartridge according to claim 2, wherein the base layer includes polyethylene terephthalate (PET), polyethylene naphthalate (PEN), or polyetheretherketone (PEEK).

8. The magnetic recording cartridge according to claim 2, wherein an average thickness $t_T$ of the magnetic recording medium is 5.6 μm or less.

9. The magnetic recording cartridge according to claim 2, wherein an average thickness $t_T$ of the magnetic recording medium is 5.4 μm or less.

10. The magnetic recording cartridge according to claim 2, wherein an average thickness $t_B$ of the base layer is 5.0 μm or less.

11. The magnetic recording cartridge according to claim 2, wherein an average thickness $t_B$ of the base layer is 4.6 μm or less.

12. The magnetic recording cartridge according to claim 2, wherein the magnetic recording medium includes a magnetic layer, and
the magnetic layer contains magnetic powder.

13. The magnetic recording cartridge according to claim 2, wherein the magnetic recording medium includes a magnetic layer, and
the magnetic layer is a sputtered layer.

* * * * *